US009729555B2

(12) United States Patent
Ferguson et al.

(10) Patent No.: US 9,729,555 B2
(45) Date of Patent: Aug. 8, 2017

(54) TECHNIQUES FOR MANAGING GROUPS ON A MOBILE PLATFORM

(71) Applicant: Facebook, Inc., Menlo Park, CA (US)

(72) Inventors: David Ross Ferguson, El Dorado Hills, CA (US); Jun Sun, Saratogo, CA (US)

(73) Assignee: FACEBOOK, INC., Menlo Park, CA (US)

( * ) Notice: Subject to any disclaimer, the term of this patent is extended or adjusted under 35 U.S.C. 154(b) by 149 days.

(21) Appl. No.: 14/534,100

(22) Filed: Nov. 5, 2014

(65) Prior Publication Data

US 2016/0057154 A1 Feb. 25, 2016

Related U.S. Application Data

(60) Provisional application No. 62/039,090, filed on Aug. 19, 2014.

(51) Int. Cl.
*H04L 29/06* (2006.01)
*H04L 29/08* (2006.01)
*G06Q 50/00* (2012.01)
*G06F 3/0488* (2013.01)

(52) U.S. Cl.
CPC ............ *H04L 63/104* (2013.01); *H04L 63/08* (2013.01); *H04L 63/101* (2013.01); *H04L 63/102* (2013.01); *H04L 67/306* (2013.01); *G06F 3/04883* (2013.01); *G06Q 50/01* (2013.01)

(58) Field of Classification Search
CPC ..... H04L 63/08; H04L 63/101; H04L 63/102; H04L 63/104; G06Q 50/01; G06F 3/04883
See application file for complete search history.

(56) References Cited

U.S. PATENT DOCUMENTS

| 8,577,166 | B1 | 11/2013 | Ferguson et al. |
| 8,713,441 | B2 | 4/2014 | Appelman |
| D706,300 | S | 6/2014 | Akana et al. |
| D725,665 | S | 3/2015 | Tseng et al. |
| D725,666 | S | 3/2015 | Tseng et al. |
| 9,026,905 | B2 | 5/2015 | Tseng et al. |
| D737,316 | S | 8/2015 | Li et al. |
| D743,985 | S | 11/2015 | Herold et al. |
| D754,717 | S | 4/2016 | Li et al. |
| D755,830 | S | 5/2016 | Chaudhri et al. |

(Continued)

OTHER PUBLICATIONS

Petronzio, Everything You Wanted to Know About Facebook Groups, Jan. 2013.*

(Continued)

*Primary Examiner* — Minh Dinh

(57) ABSTRACT

Techniques for managing groups on a mobile platform, comprising a mobile groups application. The mobile groups application including a groups management component to manage at least one group for a corresponding social networking application of a social networking system; and a groups rendering component to render a groups user interface (UI) view comprising at least one selectable group user interface element representative of the at least one group, the at least one selectable group UI element comprising a first selectable group UI element, wherein the first selectable group UI element is representative of a first group of the at least one group and the first group comprises at least one group member.

20 Claims, 35 Drawing Sheets

(56) References Cited

U.S. PATENT DOCUMENTS

| | | |
|---|---|---|
| D756,401 S | 5/2016 | Soldner et al. |
| D757,714 S | 5/2016 | Akana et al. |
| D762,670 S | 8/2016 | Harvell et al. |
| D762,704 S | 8/2016 | Li et al. |
| D765,710 S | 9/2016 | Anzures et al. |
| D767,585 S | 9/2016 | Qu |
| D769,888 S | 10/2016 | Li et al. |
| D769,930 S | 10/2016 | Agrawal |
| D769,933 S | 10/2016 | Sabia et al. |
| D770,474 S | 11/2016 | Loosli et al. |
| D771,643 S | 11/2016 | Vymenets et al. |
| D772,270 S | 11/2016 | Wang et al. |
| D772,286 S | 11/2016 | Woo |
| D773,523 S | 12/2016 | Kisselev et al. |
| 2009/0315848 A1 | 12/2009 | Ku et al. |
| 2012/0096410 A1 | 4/2012 | Lancaster |
| 2013/0006879 A1* | 1/2013 | Ramanathan .......... G06Q 50/01 705/319 |
| 2014/0068459 A1 | 3/2014 | Graham |
| 2014/0362105 A1 | 12/2014 | Kocienda et al. |
| 2015/0106731 A1 | 4/2015 | Matas et al. |
| 2015/0113381 A1 | 4/2015 | Fu et al. |
| 2015/0149927 A1 | 5/2015 | Walkin et al. |
| 2015/0268826 A1 | 9/2015 | Langholz |
| 2015/0293659 A1 | 10/2015 | Yoo |
| 2016/0057154 A1 | 2/2016 | Ferguson et al. |
| 2016/0134576 A1 | 5/2016 | Ju et al. |
| 2016/0134692 A1 | 5/2016 | Ju et al. |

OTHER PUBLICATIONS

Ayres, How to Create a Facebook Group, Aug. 2, 2013.*

Office Action received for Design U.S. Appl. No. 29/508,403, mailed Aug. 26, 2016, 17 pages.

Office Action received for U.S. Appl. No. 29/508,403, dated Dec. 30, 2016, 9 pages.

"Introducing the Facebook Groups App (on-line)", <http://newsroom.fb.com/news/2014/11/introducing-the-facebook-app/>, dated Nov. 18, 2014, 5 pages.

* cited by examiner

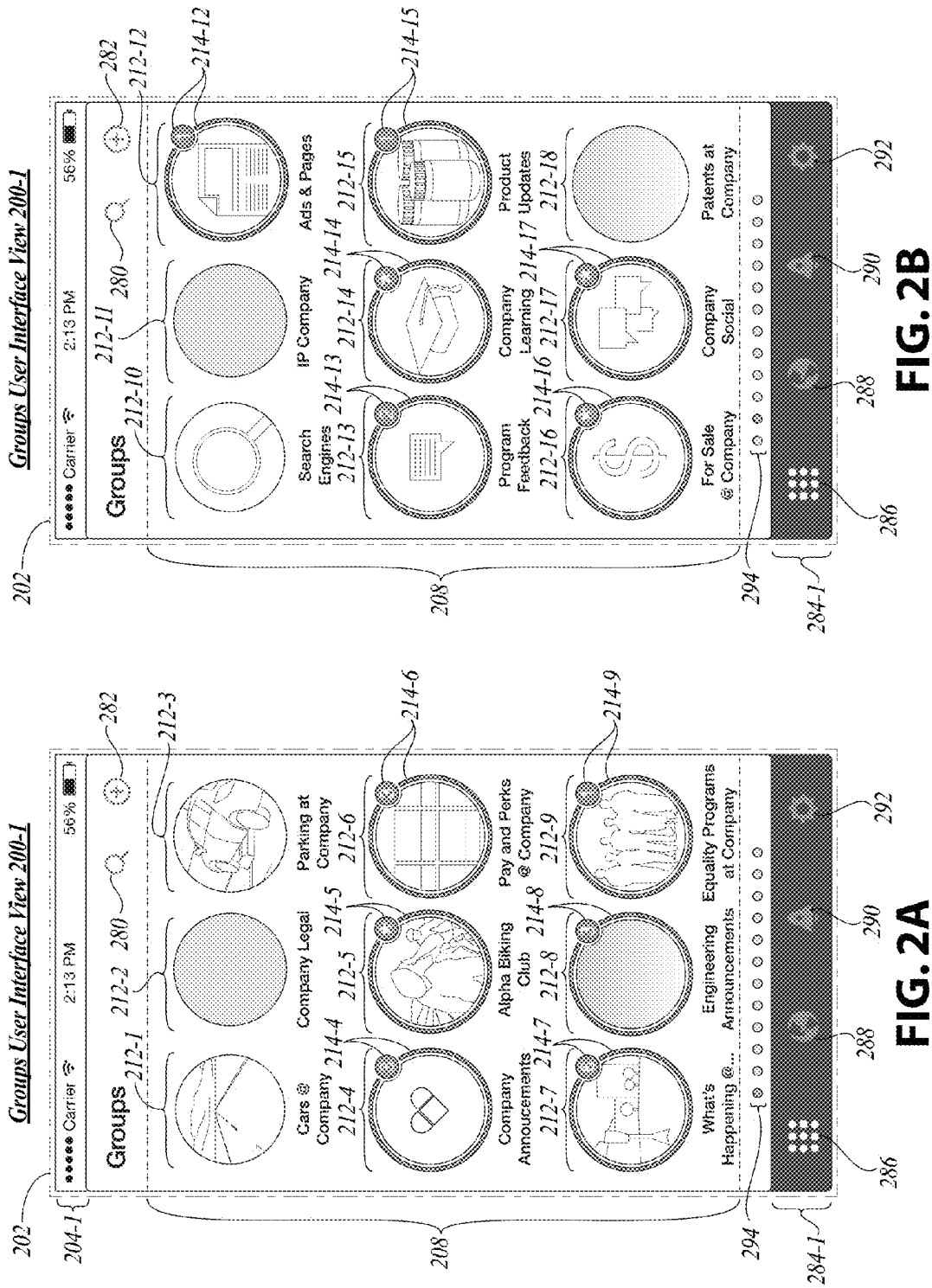

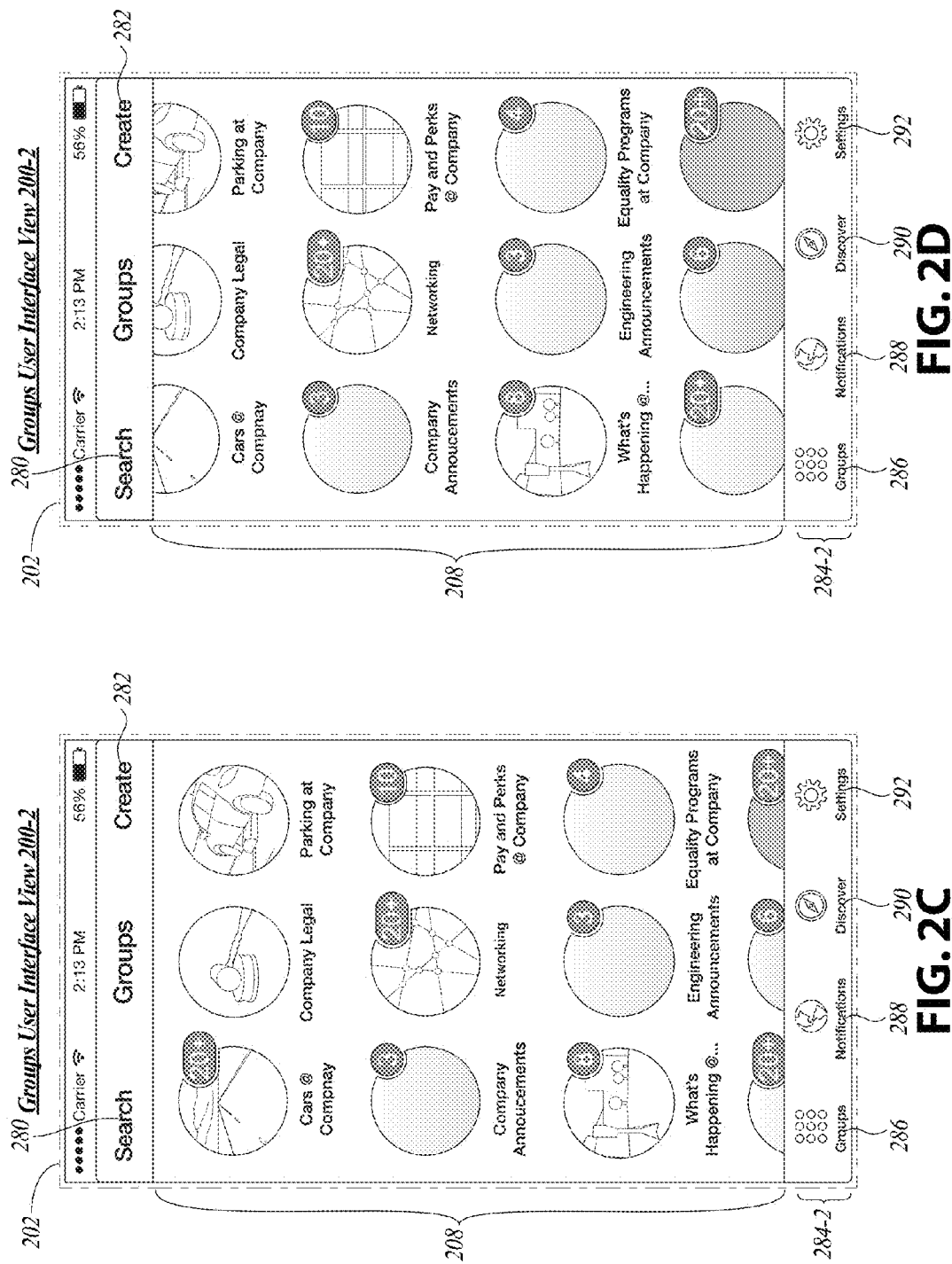

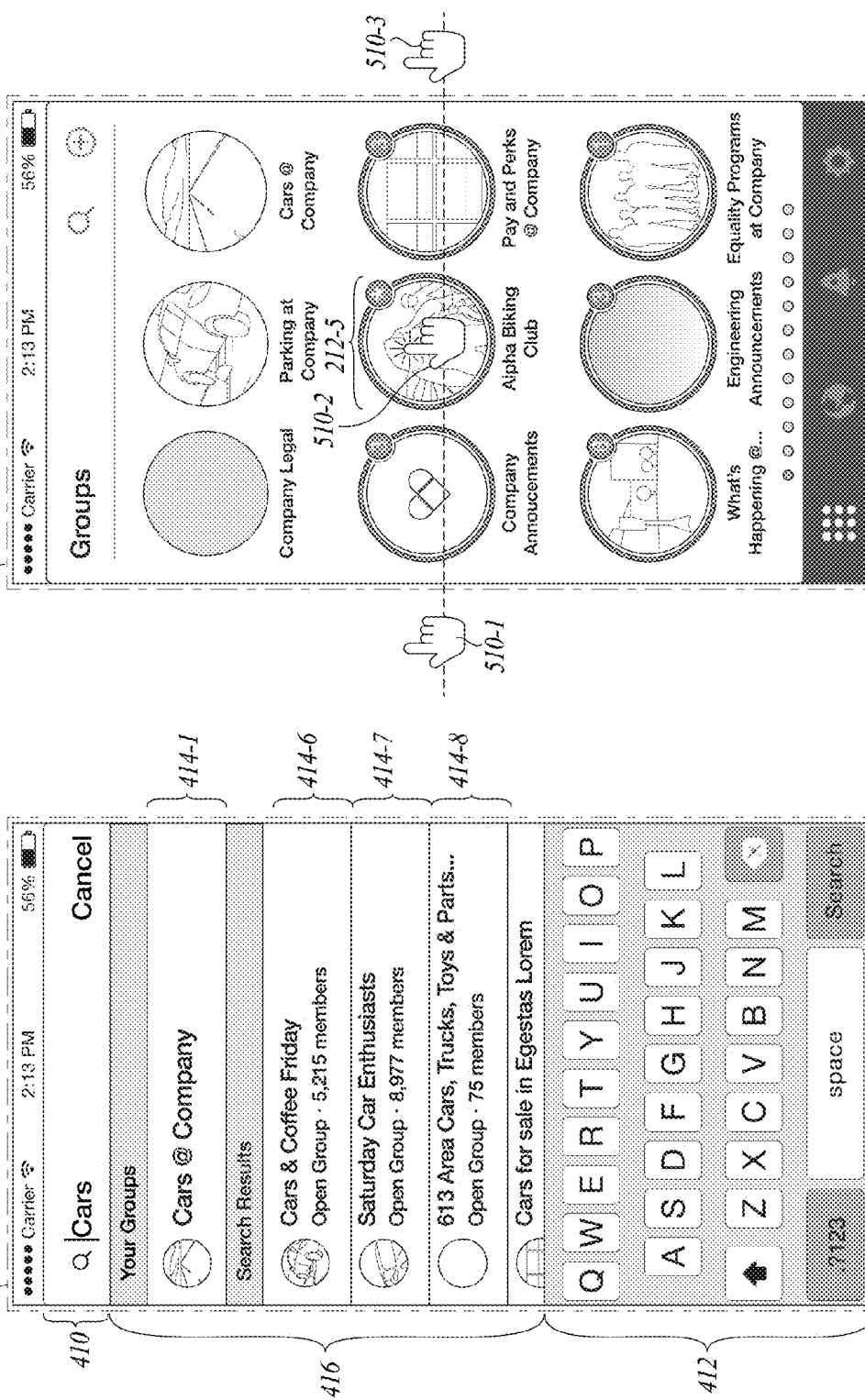

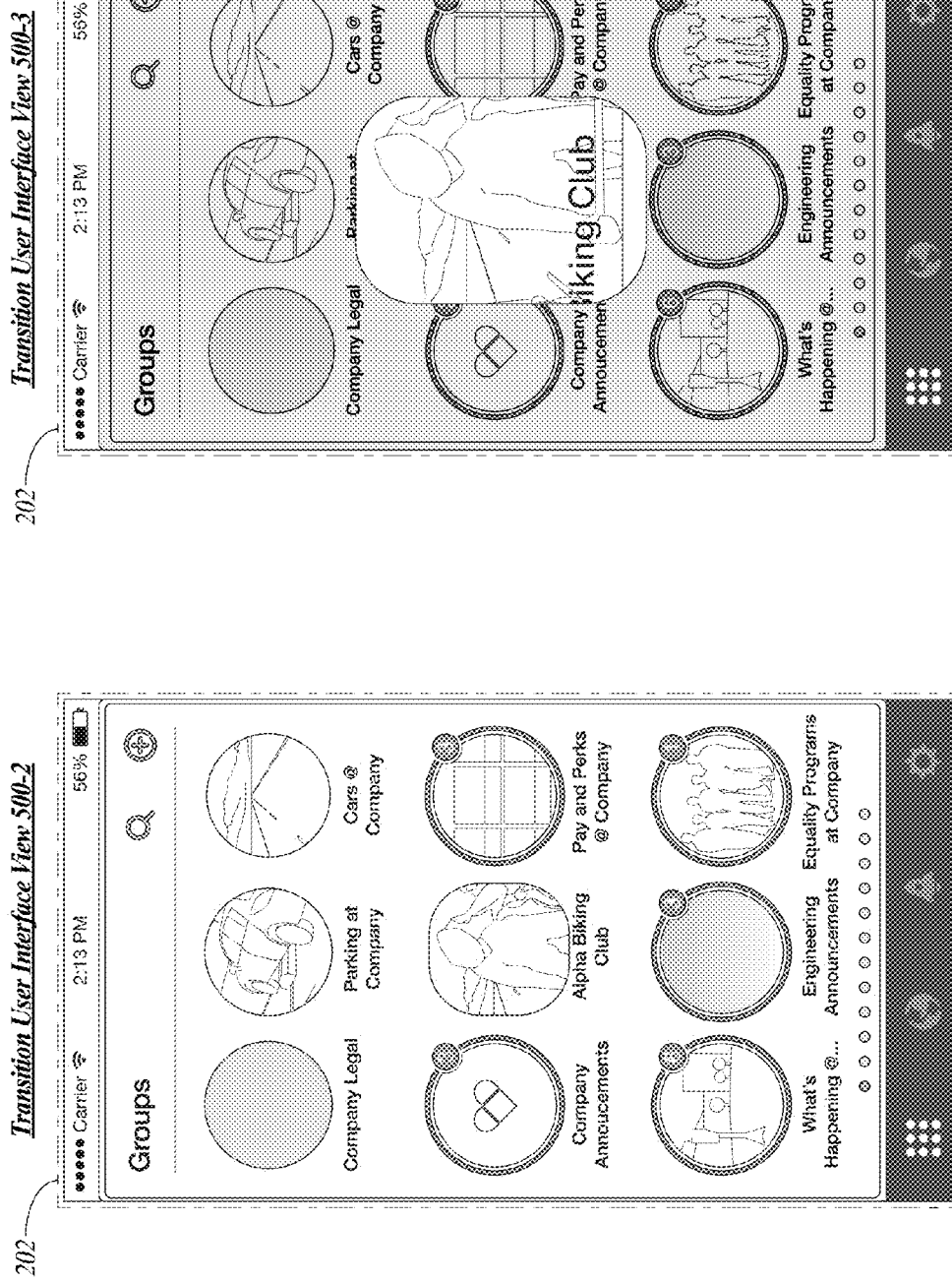

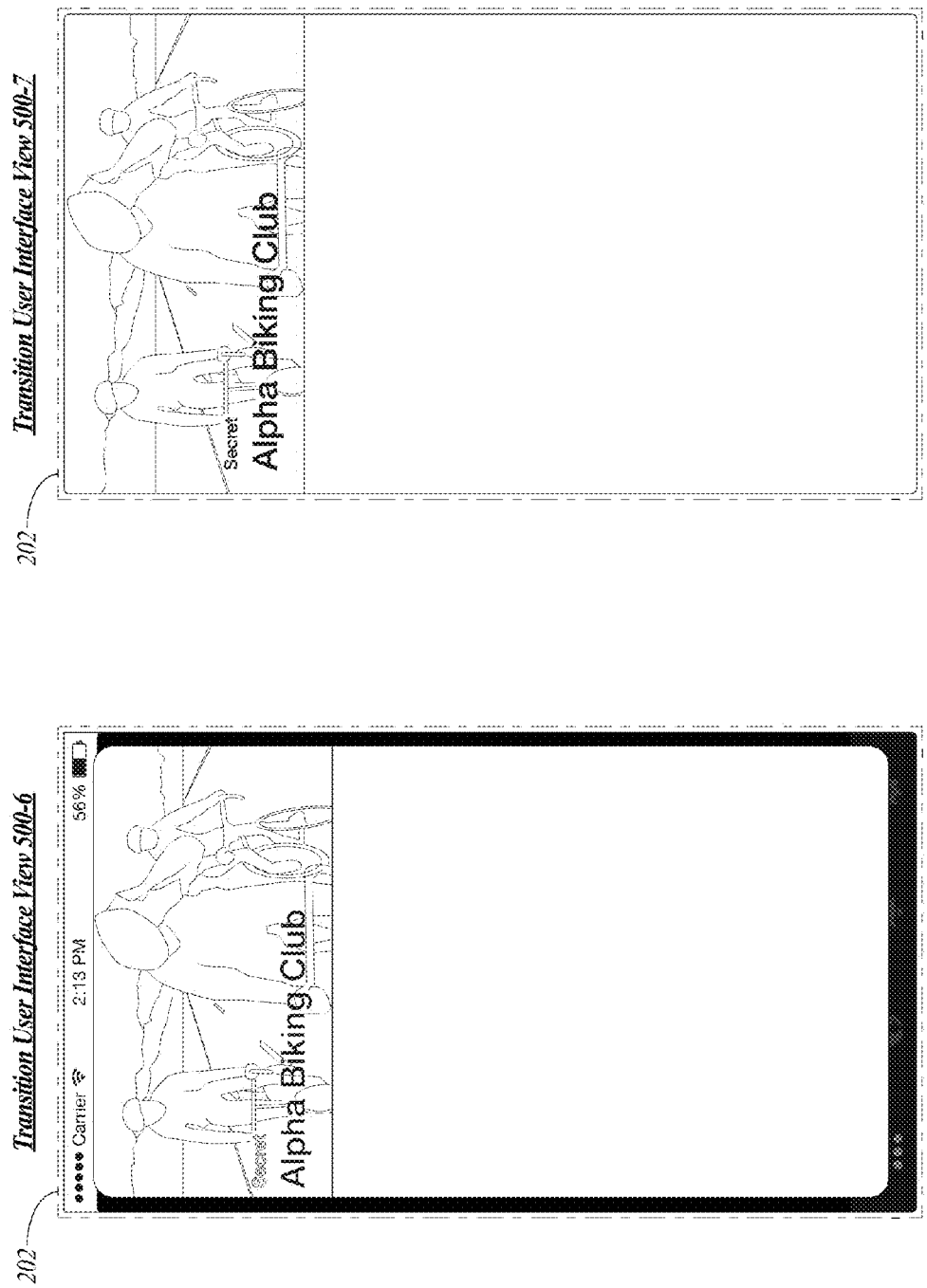

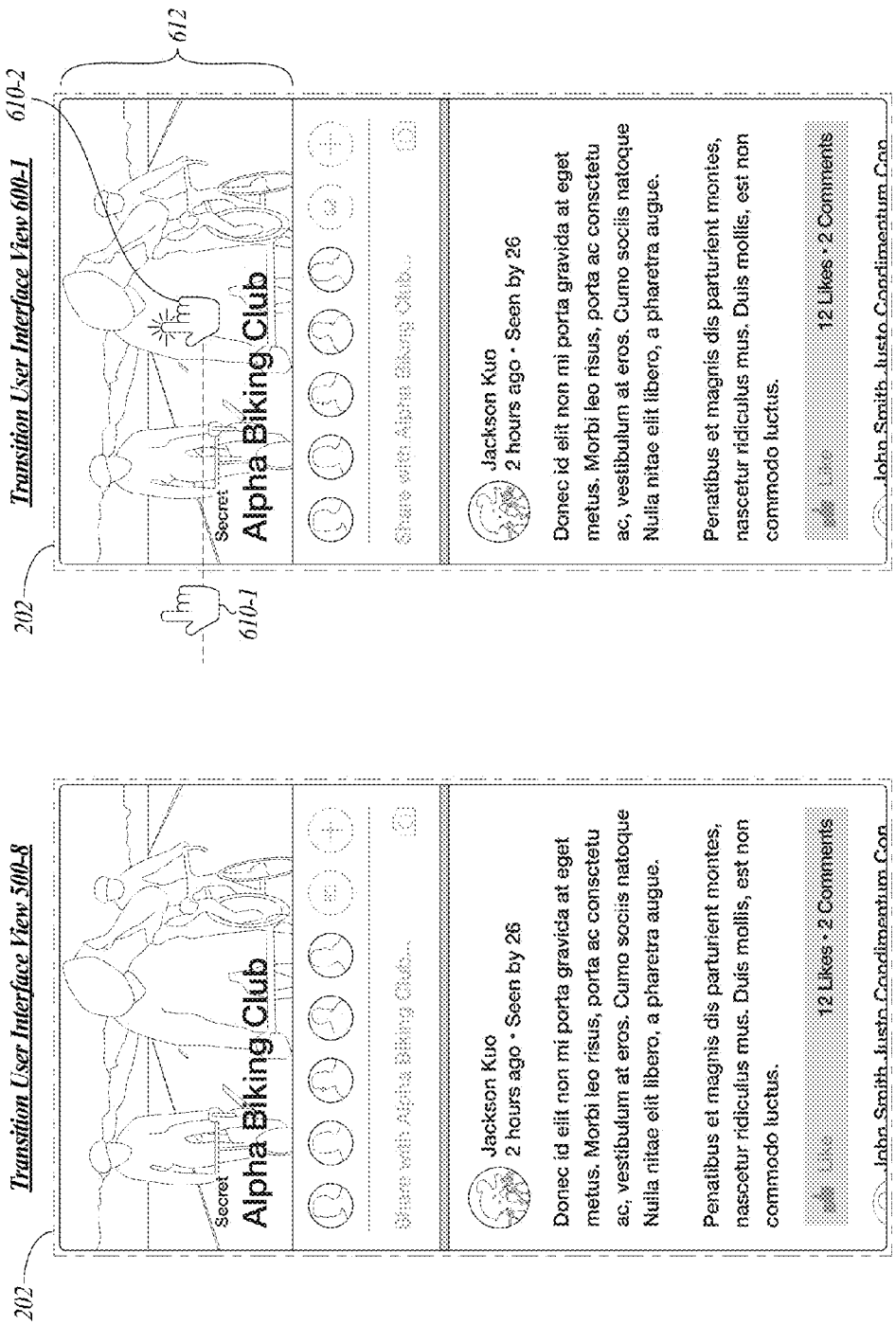

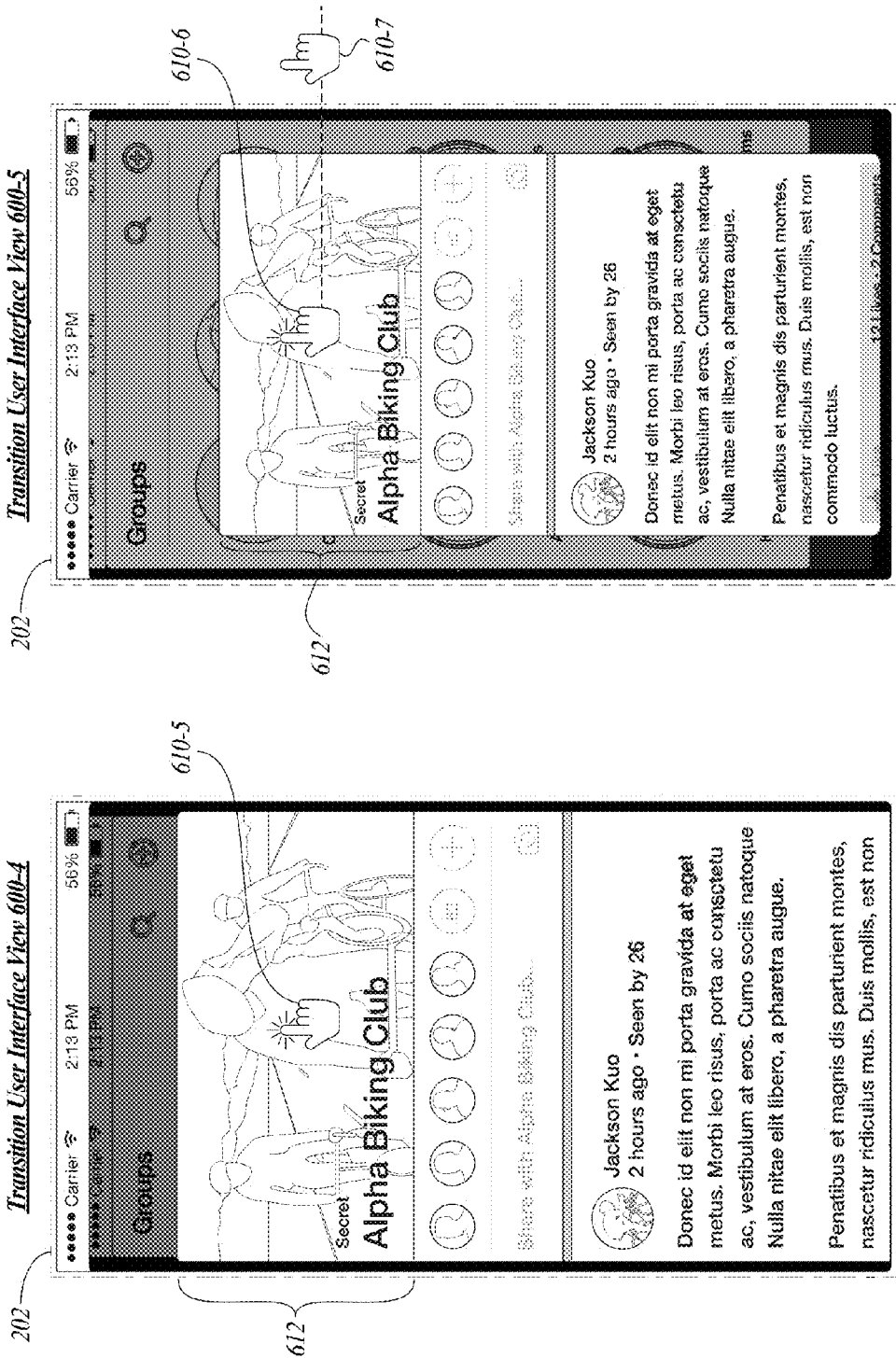

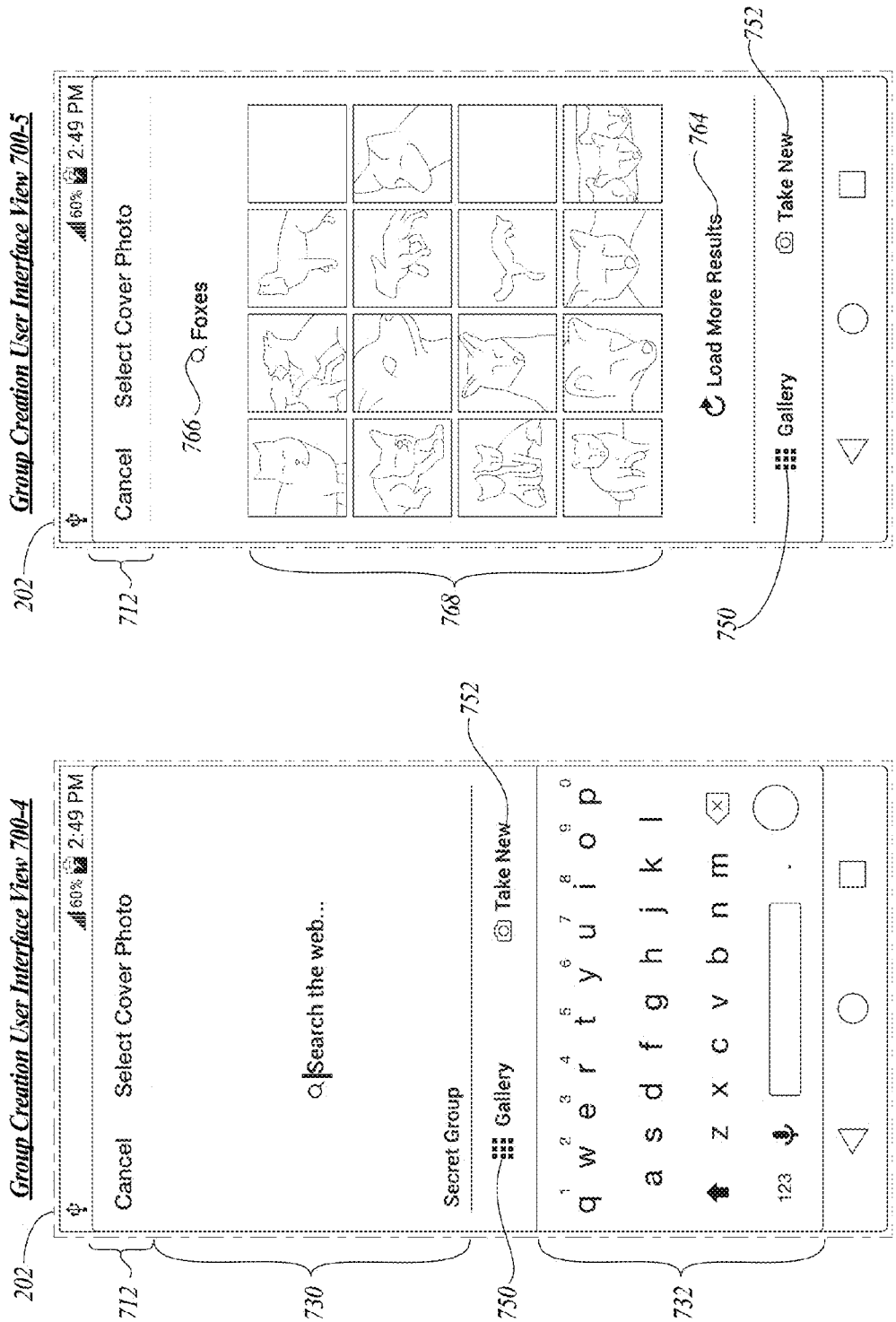

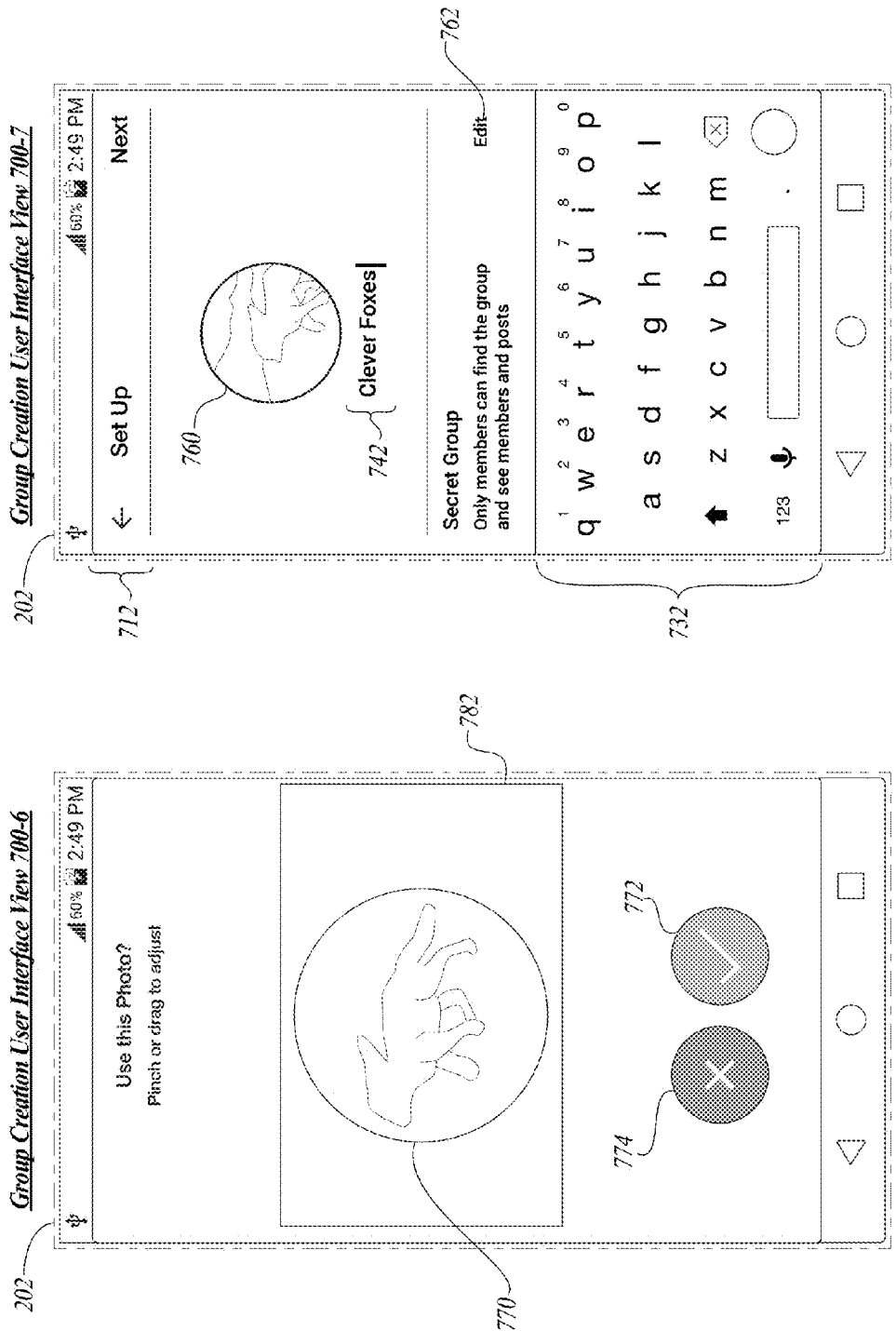

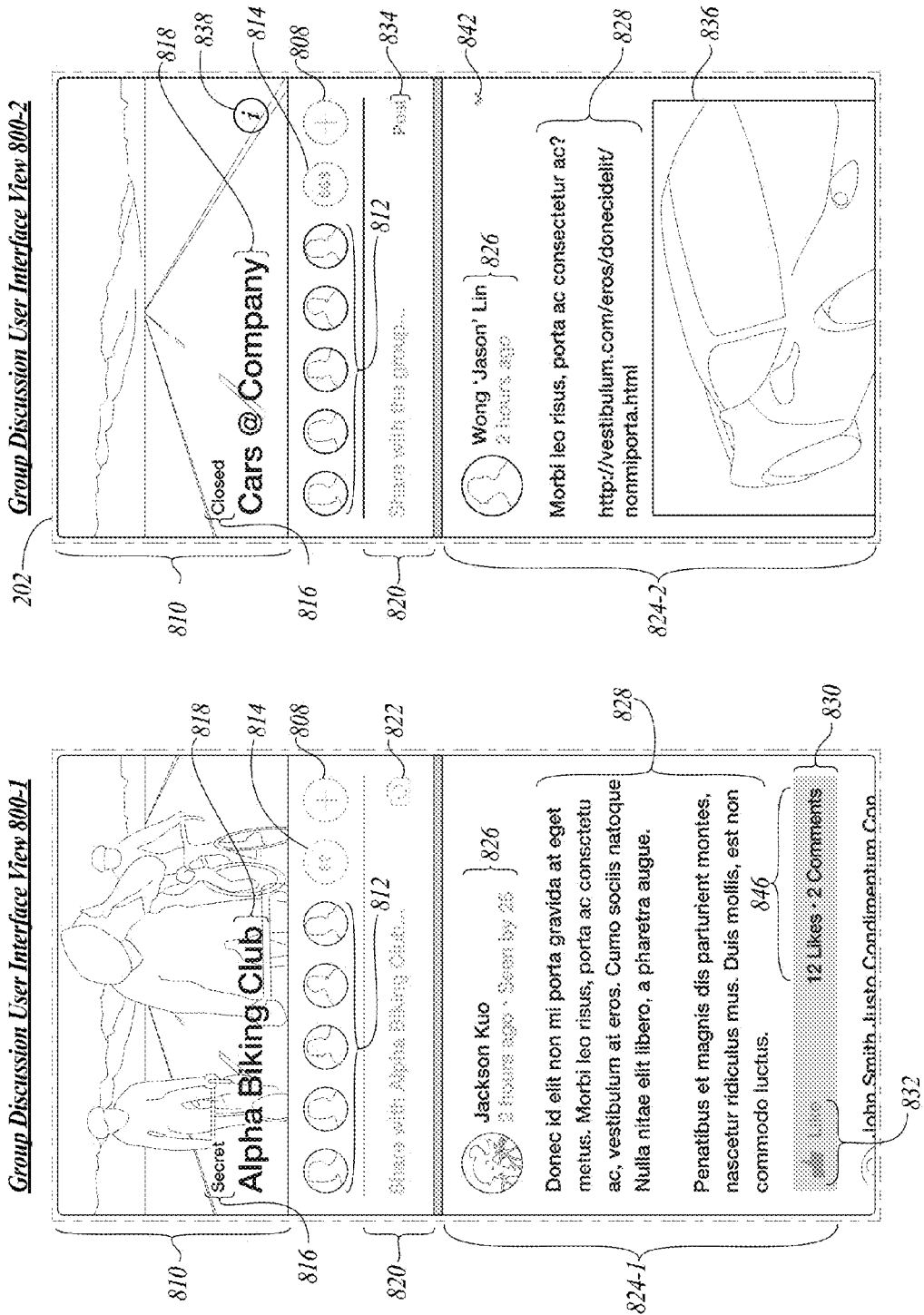

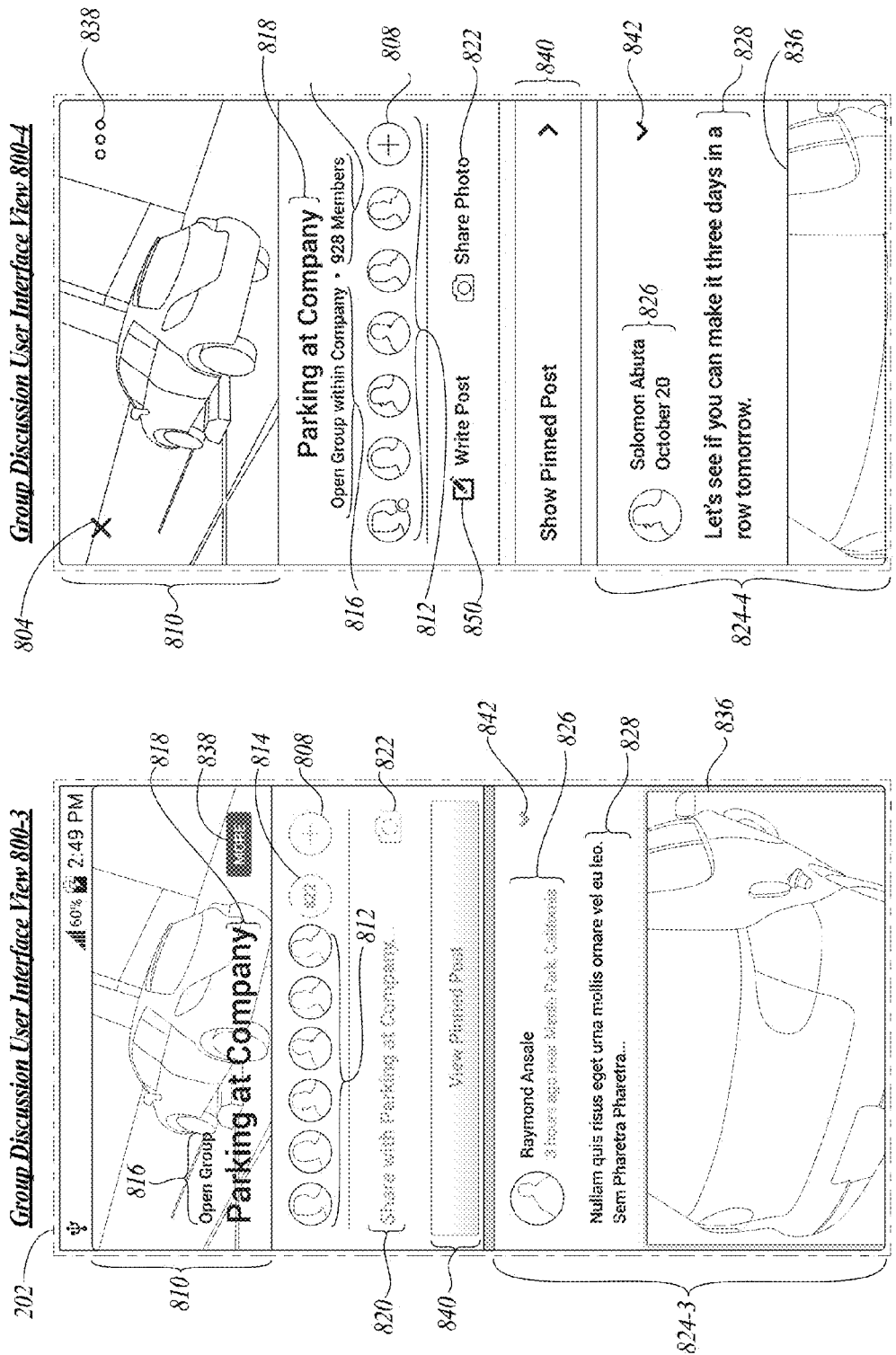

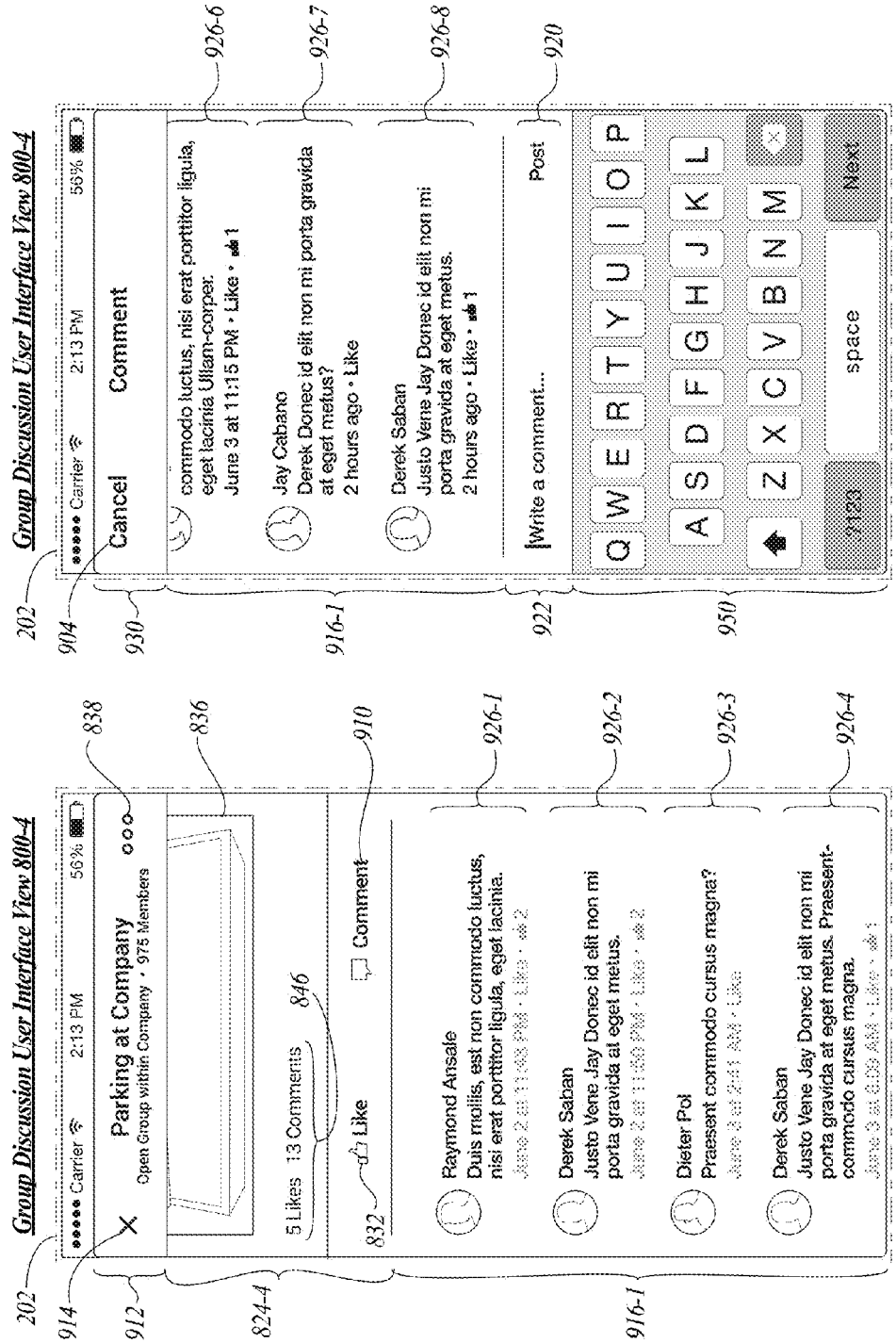

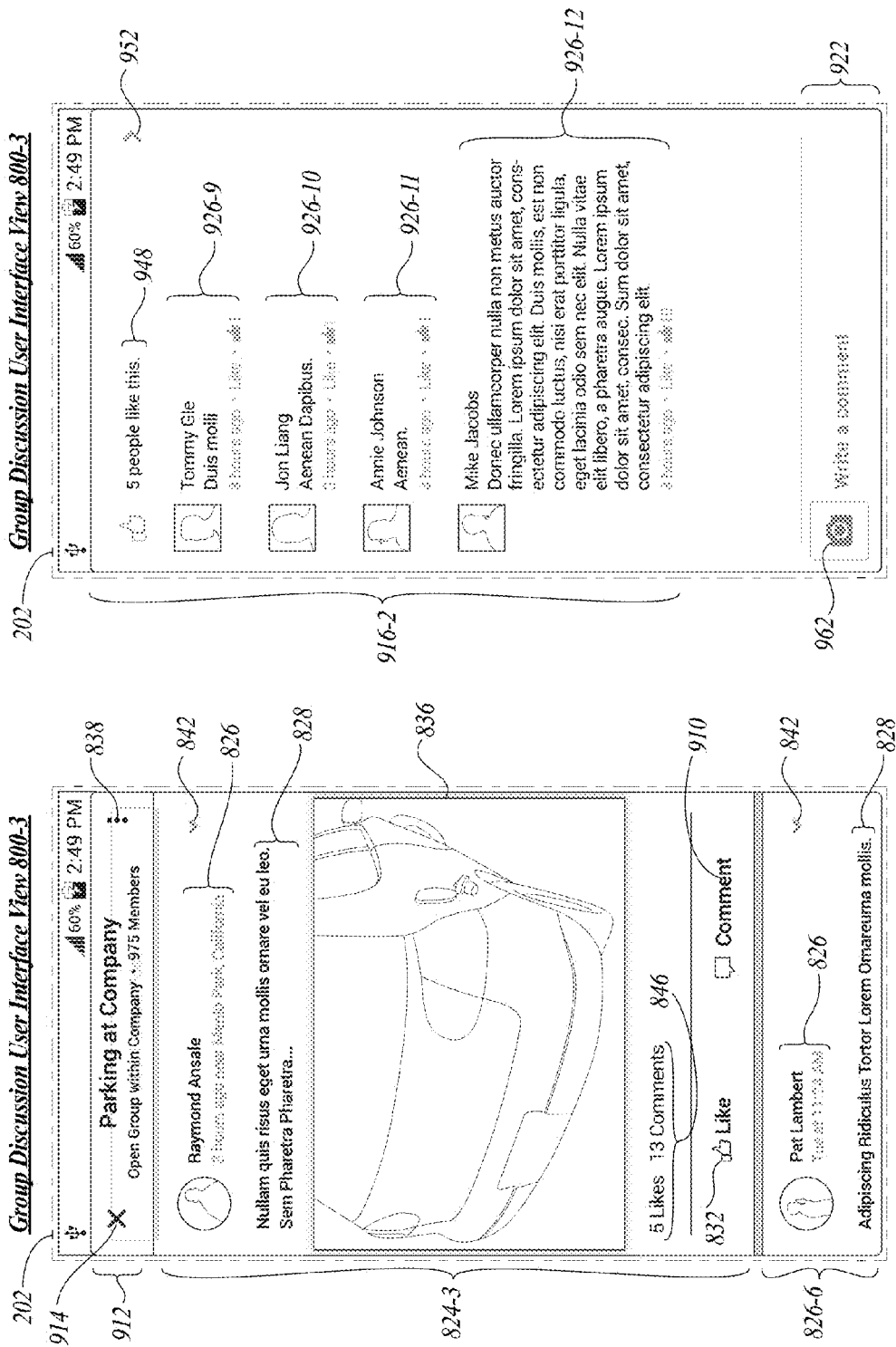

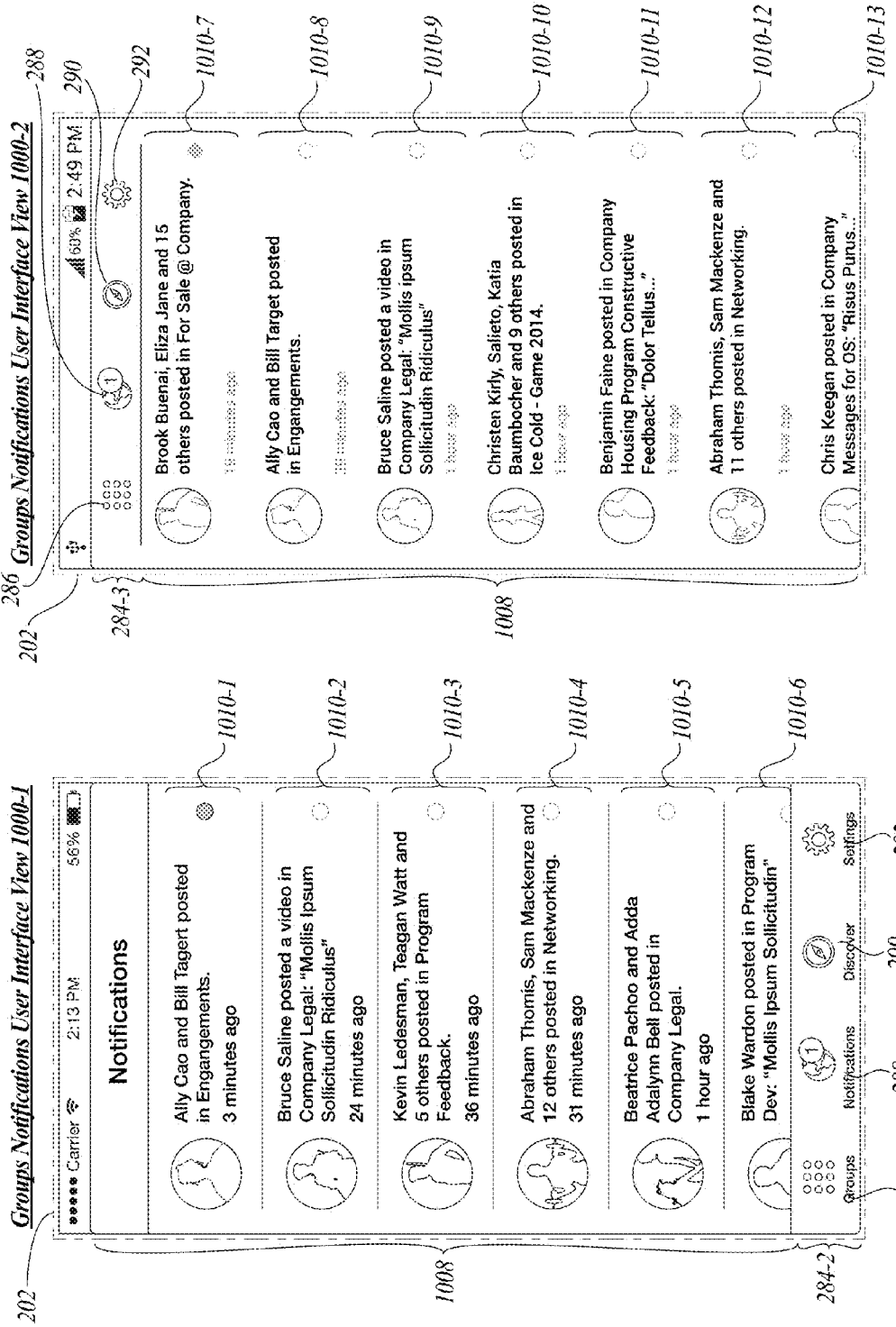

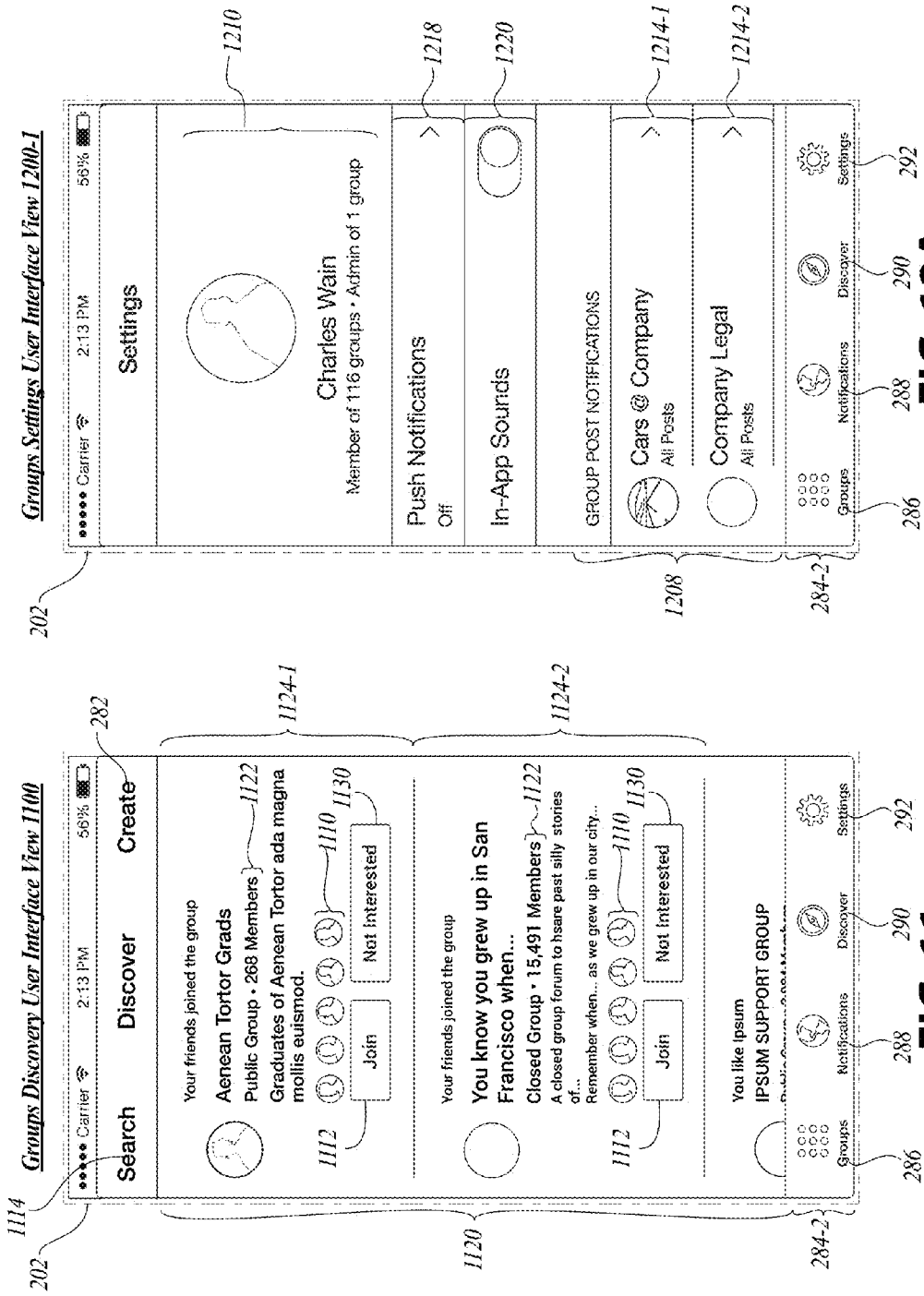

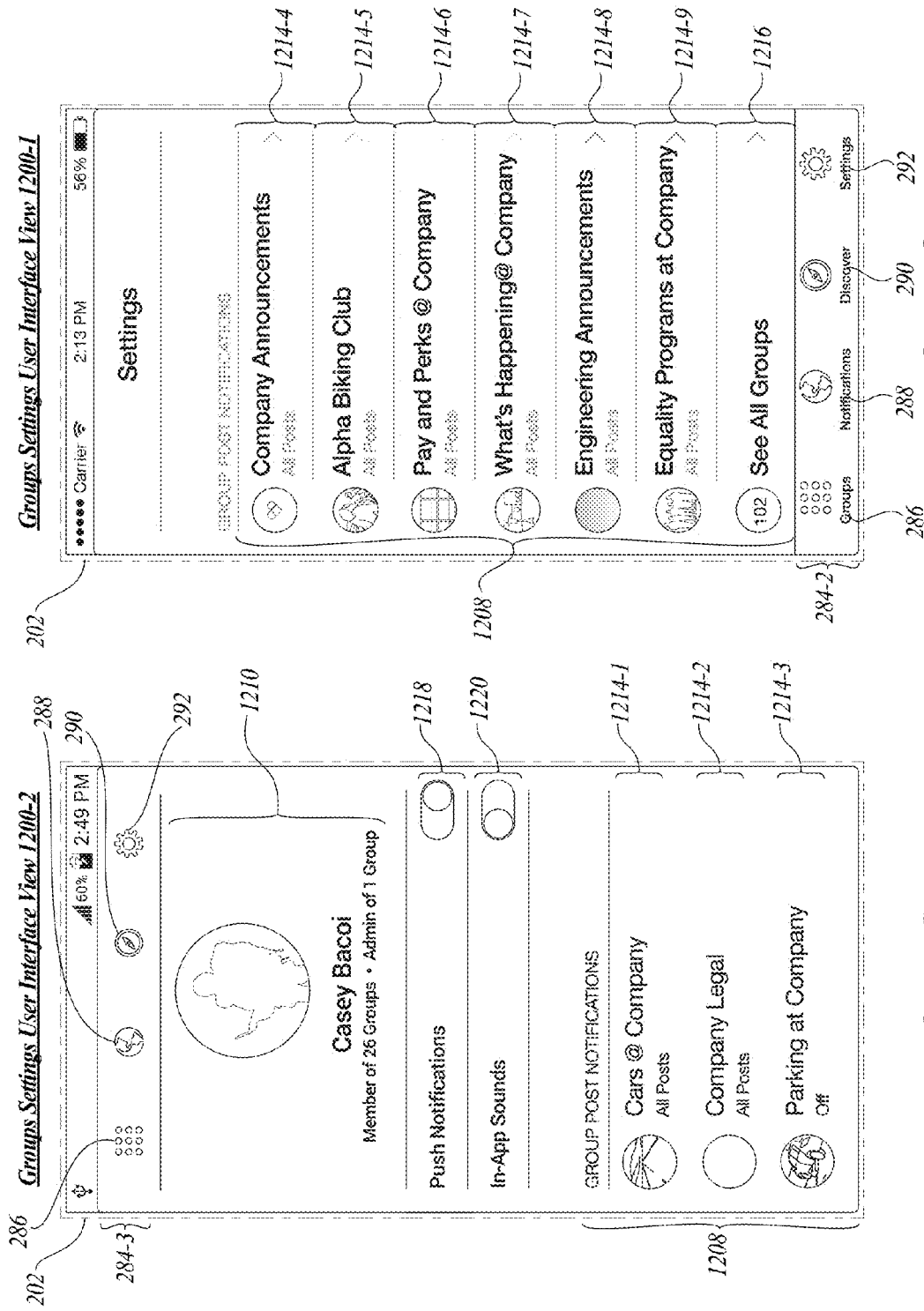

TECHNIQUES FOR MANAGING GROUPS ON A MOBILE PLATFORM

CLAIM OF PRIORITY

This application claims the benefit of U.S. Provisional Application No. 62/039,090, filed Aug. 19, 2014. The patent application identified above is incorporated here by reference in its entirety to provide continuity of disclosure.

BACKGROUND

A social networking system, such as a social networking website, enables one or more users to interact with each other in the social networking system by providing social networking services to the one or more users. With the recent increase in mobile devices, numerous users have also begun using their mobile devices to interact with the one or more users in the social networking system. However, this increase in use of mobile devices to access social networking services has also placed an increased demand for improved mobile integration of the social network services.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to techniques to manage groups on a mobile platform. Some embodiments are particularly directed to techniques for managing one or more groups on a mobile groups application. In one embodiment, for example, an apparatus may include a processor circuit; and memory operatively coupled to the processor circuit. The memory may store a mobile groups application for execution by the processor circuit, where the mobile groups application may include a groups management component to manage at least one group for a corresponding social networking application of a social networking system; and a groups rendering component to render a groups user interface (UI) view comprising at least one selectable group user interface element representative of the at least one group, the at least one selectable group UI element comprising a first selectable group UI element, wherein the first selectable group UI element is representative of a first group of the at least one group and the first group comprises at least one group member. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIGS. 2A-2E illustrate exemplary embodiments of groups user interface (UI) views for managing at least one group.

FIGS. 3A-3B illustrate an exemplary embodiment of reordering a group in a groups UI view.

FIGS. 4A-4B illustrate an exemplary embodiment of a groups search UI view for searching at least one group.

FIGS. 5A-5H illustrate an exemplary embodiment of a first animated sequence to an eighth animated sequence of transitioning from the groups UI views to group discussion UI views.

FIGS. 6A-6H illustrate an exemplary embodiment of a first animated sequence to an eighth animated sequence of transitioning from the group discussion UI views to the groups UI views.

FIGS. 7A-7I illustrate exemplary embodiments of group creation UI views for creating a group.

FIGS. 8A-8D illustrate exemplary embodiments of group discussion UI views for one or more groups.

FIGS. 9A-9D illustrate a continuation of an exemplary embodiment of one of the group discussion UI views for the one or more groups.

FIGS. 9E-9F illustrate a continuation of another exemplary embodiment of one of the group discussion UI views for the one or more groups.

FIGS. 10A-10B illustrate exemplary embodiments of groups notifications UI views for viewing one or more group notifications.

FIG. 11 illustrates an exemplary embodiment of a groups discovery UI view for discovering one or more groups to join.

FIGS. 12A-12D illustrate exemplary embodiments of the groups settings UI views for modifying settings associated with one or more groups and/or mobile group application.

FIGS. 13A-13B illustrates exemplary embodiments of groups notifications UI view for modifying settings associated with at least one group.

FIGS. 15A-14B illustrates exemplary embodiments of a logic flow for a client device requesting associated service accounts and requesting the generation of authentication tokens for the associated service accounts.

DETAILED DESCRIPTION

Figure 1A:
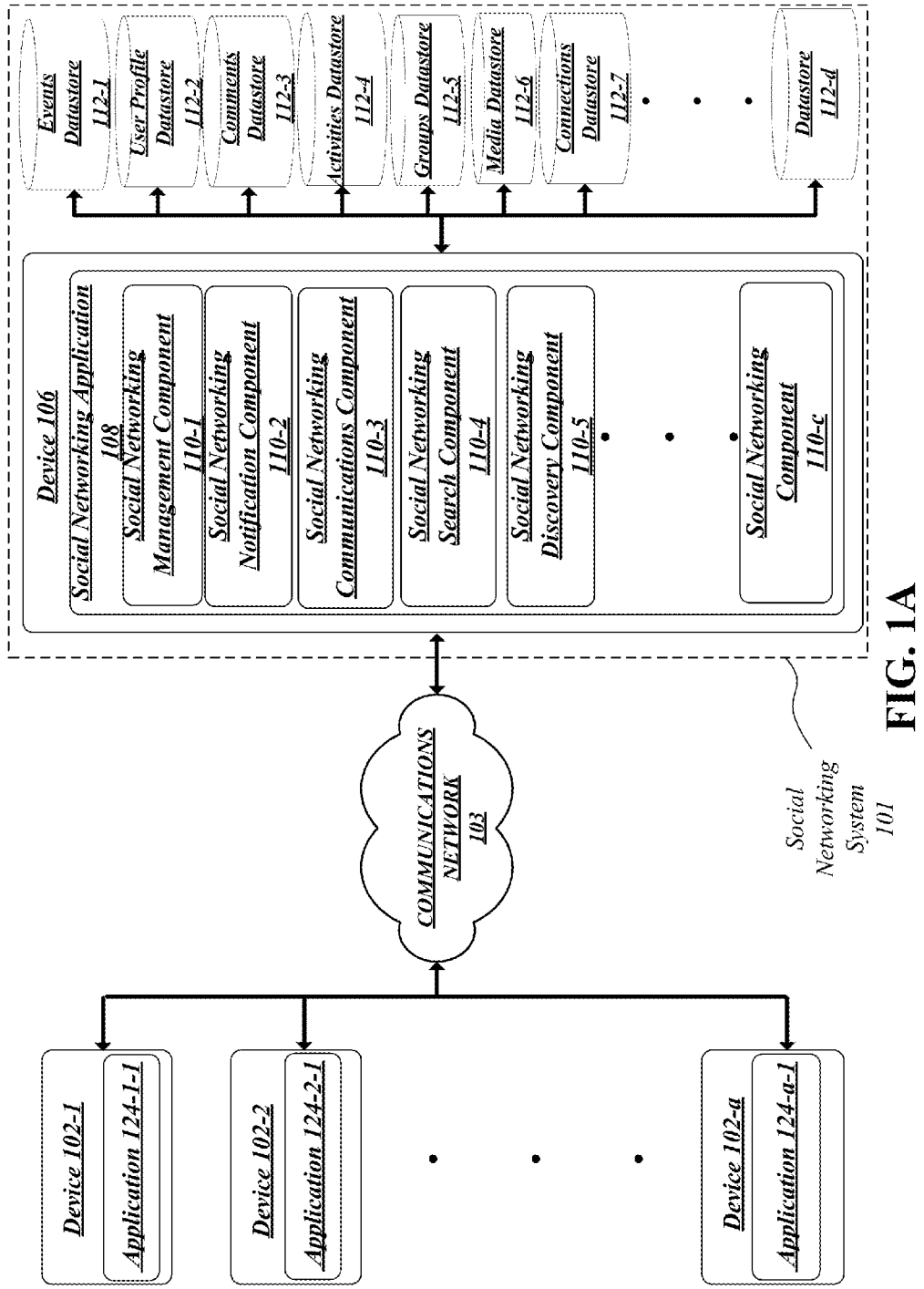
FIG. 1A illustrates an exemplary embodiment of a mobile groups management system.

Various embodiments are generally directed to a mobile groups management system to provide management of one or more groups in a social networking system. By providing a single mobile groups application dedicated to the management of one or more groups in the social networking system, one or more users of the mobile groups application may efficiently interact with a set of users in one or more groups (e.g., group members in one or more groups). To achieve these goals and other improvements, the mobile groups application may be generally arranged to provide groups UI views including one or more group UI elements representative of one or more groups in the social networking system of which a user of the mobile groups application is a group member.

To assist the user of the mobile groups application in quickly identifying one or more groups represented by the one or more group UI elements, each group UI element may include a focused group cover image representative of at least a portion of the group cover image. In instances when the group cover image is not yet available, a unique color or color gradient may be used in place of the focused group cover image.

To substantially focus the user of the mobile groups application on the one or more groups that maybe of most interest to the user, the one or more group UI elements may be further ranked or ordered starting with groups that may be of most interest to the user. Additionally or alternatively, the user may manually modify the rank or order of any of the one or more groups by performing one or more gestures.

To provide the user with one or more notifications regarding one or more group activities within the one or more groups, each group UI element representative of a group the user may be a group member of may be further associated with a notification indicator UI element, which may include a numerical value that indicates a number of unread group activities within the group. Additionally or alternatively, the mobile groups application may also be generally arranged to provide detailed groups notifications in groups notifications UI views.

To further focus the user of the mobile groups application on groups that may be of most interest to the user, the mobile groups application may be arranged to enable the user to archive one or more groups that the user is no longer interested in, so that any group notifications associated with the archived group may no longer visible in one or more UI views.

To assist the user in finding one or more groups the user is a member of, the mobile groups application may be arranged to enable the user to incrementally search, in substantially real-time, for one or more groups. To assist the user in finding and joining new groups, the mobile groups application may be further arranged to enable the user to search for one or more groups in the social networking system based at least partially on one or more search queries. To further assist the user in finding new groups to join, the mobile groups application may be further arranged to enable the user to discover one or more groups based at least partially on user interest information associated with the user.

To enable the user to interact with one or more group members of one or more groups, the mobile groups application may be arranged to provide group discussion UI views. The group discussion UI views may include, among other UI elements, one or more group activities and one or more comments associated with the one or more group activities. Additionally, to reduce the amount of scrolling associated with the group discussion UI views for group activities that may have substantial number of associated comments, the mobile groups application may be further arranged to provide a teaser comments UI element to initially limit the number of visible comments. The mobile groups application may be arranged to expand the teaser comment UI elements, and provide in-place comment to enable a user to input, publish and/or post a comment while the group discussion UI view remains scrollable and the surrounding group activity remains visible.

To enable users to efficiently enter and/or leave a group and transition between the groups UI view and group discussion UI views, the mobile groups application may be arranged to transition from the groups UI views to the group discussion UI views for a group by visually presenting an animated sequence to provide the user with the perception of entering into the group. Similarly, to leave the selected group and transition back to the groups UI views from the group discussion UI views, the mobile groups application may be further arranged to transition from the group discussion UI views to the groups UI views by visually presenting an animated sequence to provide the user with the perception of exiting the group.

To provide efficient integration of with other applications on a mobile device, the mobile groups application may be further configured to provide deep link integration and enable the other applications on the mobile device to directly transition from the other application to a group discussion UI view for a specific group in the mobile groups application.

To enable users to interact with other users that are not part of the social networking system, the mobile groups application may further enable users to invite one or more contacts associated with the mobile device that are not users in the social networking system to join one or more groups.

To enable users to manage one or more groups, the mobile groups application may be further arranged to provide one or more management and/or administrative functions. As a result of these improvements discussed above and elsewhere, the user's interaction with the social networking system on a mobile platform may be greatly improved.

With general reference to notations and nomenclature used herein, the detailed descriptions which follow may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the needed purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the needed method steps. The needed structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

FIG. 1A illustrates an exemplary embodiment of a mobile groups management system 100. In various embodiments, the mobile groups management system 100 may comprise a social networking system 101 (e.g., Facebook, Google+, LinkedIn, etc.) and one or more devices 102-a (e.g., server devices, mobile devices, computing devices, networking devices, etc.) for providing social networking services to enable various users (e.g., persons, businesses, hardware/software components, computing devices, etc.) to communicate and interact between and among each other. To provide the social networking services to various users, the one or more devices 102-a associated with various users may be operatively coupled to the social networking system 101 via communications network 103 (e.g., internet, intranet, cellular network, etc.) utilizing various communications mediums (e.g., wired, wireless, fiber optic, etc.) and/or communications standards (e.g., Ethernet IEEE 802.3, Wireless IEEE 802.11, WiMAX IEEE 802.16, Global Systems for Mobile Communications (GSM), Enhanced Data Rates for GSM Evolution (EDGE), Long Term Evolution (LTE), etc.).

It is worthy to note that "a" and "b" and "c" and similar designators as used herein are intended to be variables representing any positive integer. Thus, for example, if an implementation sets a value for a=2, then a complete set of devices 102-a may include devices 102-1 and 102-2. Similarly, if an implementation sets value for a=2, then a complete set of applications 124-a-1 may include applications 124-1-1 and 124-2-1. Furthermore, if an implementation sets value for b=7, then a complete set of applications 124-1-b may include applications 124-1-1, 124-1-2, 124-1-3, 124-1-4, 124-1-5, 124-1-6, and 124-1-7. The embodiments are not limited in this context.

To utilize the social networking services provided by the social networking system 101, each device of the one or more devices 102-a may be configured to execute at least applications 124-a-1. The applications 124-a-1 may be configured to communicate with the social networking system 101 via communications network 103 to provide the social networking services to the users. To maintain a persistent presence and ensure secure access to the social networking system 101, each user of applications 124-a-1 may be associated with a user account in the social networking system 101. Each user account may be represented by user account information. The user account information for each user may include, but is not limited to, user account identifier (e.g., phone number, email address, etc.), user account authentication token (e.g., user account password, physical and/or virtual security tokens, etc.), and/or any other information relevant to the authentication and authorization of each user. To ensure authorized access of each user, the social networking system 101 may be further configured to authenticate each user based on at least a portion of the user account information (e.g., user account identifier, user account authentication token, etc.) provided by each user and received from one or more devices 102-a. Once a user having the associated user account has been successfully authenticated, the social networking system 101 may provide the application (e.g., application 124-1-1) with one or more time limited access tokens having a set of access permissions associated with the user account of the user to retrieve, store, modify, update, and/or otherwise access information within a specific time period in the social networking system 101 utilizing the application.

Each user account may be further associated with a user profile representative of a user's presence within the social networking system 101. Each user profile associated with each user may be represented by user profile information, which may include, but is not limited to, user identifier information (e.g., a unique identifier that identifies the user and the user profile information), user biographic and/or demographic information, (e.g., user name information which may include, but is not limited to, a first, middle, and/or last name of the user, an entity name associated with the user, contact information of the user, birth date of the user), user profile media information (e.g., profile image(s) of the user, a focused user profile image of the user, etc.), user location information (e.g., the hometown location of the user, the current location of the user), user time zone information (e.g., time zone of the user, etc.), user social connections information (e.g., a list of friends, family members, coworkers, teammates, classmates, business associates, of the user), user groups membership information, user interest information (e.g., the interests listed by the user, movies listed by the user, music listed by the user, books listed by the user, approvals or "likes" of the user, or any other information that may identify the user's interest), user employment history information (e.g., list of current and/or past employers of the user), user social message information (e.g., one or more social networking messages where the user is a recipient), user mobile groups application preferences information (e.g., preferences for application 124-1-1), user discussion information (e.g., one or more profile activities, such as, profile posts in the user profile), user group search information (e.g., one or more group search queries inputted by the user) and/or any other preference/personal information associated with the user.

The user groups membership information for the user may include, but is not limited to, a list of user group information representative of the one or more groups the user is a member of in the social networking system 101. Each user group information may include, but is not limited to, group identifier information (e.g., the group identifier associated with a particular group), user group order information (e.g., the position of the user group information in the list of user group information), user group favorite information (e.g., whether the particular group associated with the user group information is a favorite group), group name information (e.g., the group name of the particular group), user group last visit information (e.g., the last date and time the user visited the particular group), user group unread notifications information (e.g., the number of unread notifications associated with the particular group), and/or any other information associated with groups and/or the user.

The user mobile groups application preferences information may include, but is not limited to, push notification setting information (e.g., whether push notifications services are disabled or enabled), auditory setting information (e.g., whether auditory cues are disabled or enabled), haptic feedback setting information (e.g., whether haptic feedback are disabled or enabled) for the application 124-1-1. The user mobile groups application preferences information may further include, but is not limited to, group preference information associated with each group of the one or more groups. Furthermore, the group preference information associated with each group may include, but is not limited to, push notification setting information, auditory setting information, and haptic feedback setting information for each group. The group preference information may further include, but is not limited to, notification preference information to select whether the updated user notification information received from the social networking system 101 via push and/or pull notification services includes all activities in specific group, friends' activities in the specific group, or no activities in the specific group.

In some embodiments, the social networking system 101 may enable the applications 124-a-1 to retrieve the user profile information associated with the user and display the user profile on one or more display screens operatively coupled to the devices 102-a. To facilitate user interaction between and among users in the social networking system 101, the social networking system 101 may also enable users to search user profile of other users based at least partially on a received search query and at least a portion of the user profile information associated with other users, retrieve at least a portion of the user profile information of the other users, and form one or more social connections with other users by enabling users via the applications 124-a-1 to identify other users as the user's friend, family member (e.g., spouse, cousin, mother, father, grandmother, grandfather, brother, sisters, daughter, son, etc.), coworker, teammate, classmate, business associate, or any other social relationship.

It may be appreciated that the social connections formed between a pair of users may be unidirectional, when only one user in the pair of users identifies and acknowledges the type and existence of social relationship. Alternatively, the social connections formed between the pair of users may be bidirectional when both users in the pair of users identify the same type of social relationship and the existence of social relationship. As such, the social networking system 101 further receive, provide, and/or update user social connections information which may include, but is not limited to, a list of social connection information representative of the social connections of the user (e.g., the user identifier information or other social networking object the user is connected to) and the social connection type information representative of a social connection type (e.g., friend, family member, coworker, teammate, classmate, business associate, and/or any other social relationship) associated with each social connection. Based on the user social connections information of a plurality users, the social networking system 101 may be further configured to determine social proximity information which may include, but is not limited to, the degree of separation between one or more pairs of users.

In some embodiments, the social networking system 101 may further enable users to create, publish, or post one or more profile activities (e.g., group posts, polls, Universal Resource Identifier/Universal Resource Locator (URI/URL) references, etc.), or any other information on the user's own user profile represented by the user profile information. Additionally, in some embodiments, the social networking system 101 may further enable some users to create, publish, post one or more profile activities on user profiles of other users based at least partially on the user social connection information of the other users. The social networking system 101 may also enable users to send and/or receive private social messages to one or more users by communicating the social message information comprising one or more private social messages to and from one or more users.

To provide collaboration between and among a specific set of users, including between and among users that may not have a social connection with other users in the specific set of users, the social networking system 101 may further enable the association and/or management of one or more groups. Each group may be represented by social group information, which may include, but is not limited to, group identifier information (e.g., a unique identifier that identifies a particular group in the social networking system 101), group privacy information (e.g., group privacy type for the particular group which may include, but is not limited to, secret group type, open group type, or closed group type), group cover image information, group description information (e.g., a description associated with the particular group), group name information (e.g., the group name of the particular group), group owner information (e.g., the owner of the particular group), group location information (e.g., the location of the particular group), group membership information (e.g., a list of group members in the particular group), group membership count information (e.g., a total number of group members in the particular group), group administrators information (e.g., a list of group members that are administrators in the particular group), group documents information (e.g., a list of documents shared in the particular group), group files information (e.g., a list of files shared in the particular group), group events information (e.g., a list of events shared in the particular group), group discussion information (e.g., a list of group activity information in the particular group), group tags information (e.g., one or more terms associated with the group), face piles information (e.g., a limited list of profile identifier information representative of one or more group members), group images information (e.g., a list of group images shared or associated with the group), or any other information associated with one or more groups.

The group discussion information may include, but is not limited to, a list of group activity information representative of one or more group activities such as, for example, group posts, group polls, etc. and a number of group activity information in the list of group activity information. Each group activity information may include, but is not limited to, group activity source name information (e.g., the name of the user or any other social networking object that created the group activity), group activity source identifier information (e.g., user identifier information identifying the user or any other social networking object that created the group activity), group activity message information (e.g., the textual portion of the group activity), group activity poll options information (e.g., the one or more poll options for the group activity), group activity media information (e.g., image, video, illustrated graphical object, animated image, etc. associated with the group activity), group activity creation time information (e.g., the time or approximate time when the group activity was posted or created), group activity creation location information (e.g., the location of the user when the group activity was posted or created), group activity visibility information (e.g., the number of group members who viewed the group activity), group activity approval information (e.g., list of users that approve or "like" the group activity and a number of users in the list of users that approve or "like"), group activity comment information (e.g., a list of comments associated with the group activity), and/or any other information that may be associated with a group activity.

The group activity comment information may include, but is not limited to, a list of comment information representative of one or more comments associated with a group activity. The comment information may include, but is not limited to comment source name information (e.g., the name of the user or any other social networking object that created the comment), comment source identifier information (e.g., user identifier information identifying the user or any other social networking object that created the comment), comment message information (e.g., the textual portion of the comment), comment media information (e.g., image, video, illustrated graphical object, animated image, etc. associated with the group activity), comment creation time information (e.g., the time or approximate time when the comment was posted or created), comment creation location information (e.g., the location of the user who posted or created the comment when the comment was posted or created), comment visibility information (e.g., the number of users who viewed the comment), comment approval information (e.g., list of users that approve or "like" the comment and a number of users in the list of users that approve or "like"), and/or any other information that may be associated with a comment.

The comment UI element (e.g., comment UI element 926-1, 926-2, etc. of FIG. 9C) may further include, among other UI elements, a user name information associated with the user that posted the group activity comment, group activity comment creation time information (e.g., the time or approximate time when the group activity was posted or created), group activity comment approval information (e.g., the number of users liking the comment), and a selectable comment approval UI element for expressing approval of the comment (e.g., selectable "Like" text).

In some embodiments, the social networking system 101 may enable users to create one or more groups in the social networking system 101 utilizing the one or more applications 124-a-1. Furthermore, the social networking system 101 may enable users to create one or more groups by receiving at least a portion of the social group information (e.g., group privacy information, group cover image information, group description information, group name information, group owner information, group membership information), and creating a group based at least partially on the received social group information.

In some embodiments, the social networking system 101 may also enable users to search for one or more groups in the social networking system 101 utilizing the one or more applications 124-a-1. Furthermore, the social networking system 101 may enable users to input one or more search queries utilizing the one or more applications 124-a-1 and providing one or more search results to the one or more applications 124-a-1 based at least partially on the one or more received search queries.

In some embodiments, the social networking system 101 may also enable users to discover one or more existing groups in the social networking system 101 utilizing the one or more applications 124-a-1. Furthermore, the social networking system 101 may enable users to discover one or more existing groups by providing an ordered list of groups to the applications 124-a-1 based at least partially on the user's user profile information to assist the users in locating one or more groups that the users may be of interest to the users.

In some embodiments, the users may join or request to join one or more groups as group members to discuss (e.g., publishing group posts and/or group polls in a group discussion and/or publishing comments associated with the group posts and/or group polls), message (e.g., sending and/or receiving one or more private social messages to and/or from one or more group members), and/or otherwise share information (e.g., sharing group events, group files, group documents, group images, etc.) with other group members within the group and/or other users that are not group members of the group (e.g., non-group members).

In some embodiments, the group discussions, messages, and/or shared information, within group may be restricted or otherwise limited to group members of the group based at least partially on group privacy information associated with the group. Stated differently, based at least partially on group privacy information associated with each group, the discussions, messages, and/or shared information, within the group, may only be viewable or otherwise accessible to group members of that group.

In some embodiments, the social networking system 101 may also enable group members of a group to perform one or more group management functions for the group, which may include, but is not limited to, modifying group name information, group description information, group administrators information, group documents information, group files information, group discussion information or otherwise manage the one or more groups in the social networking system 101 utilizing the applications 124-a-1.

In some embodiments, the social networking system 101 may also enable users to perform group management functions which may include, but is not limited to, modify group membership information and/or group administrators information, remove one or more group members, add administrative privileges, remove administrative privileges, or otherwise manage one or more group members in one or more groups in the social networking system 101 utilizing the applications 124-a-1. In some embodiments, at least some modifications of the social group information, such as, for example, modifying group name information, modifying group cover image information, modifying group tags information, modifying group description information, modifying group administrators information, modifying group membership information may be limited to group members to have administrative privileges and/or approval from group members having administrative privileges for that group.

In some embodiments, the social networking system 101, may provide users via applications 124-a-1 with the latest updates regarding the activities of their social connections, groups, or any other aspects of users' online presence. To provide the latest updates, the social networking system 101 may generate and/or provide users with one or more notifications regarding the activities of their friends, family members, coworkers, teammates, classmates, business associates (e.g., user notifications), and one or more notifications regarding the activities within one or more groups where the users may be group members (e.g., user group notifications). Each user notification or user group notification may comprise user notification information, which may include, but is not limited to, notification creation time information (e.g., the time when the notification as created), notification source name information (e.g., the name of the user or any other social networking object that created or caused the creation of the notification), notification source identifier information (e.g., the user identifier information or other social networking object that create the notification or caused the creation of the notification), a notification identifier information (e.g., a unique identifier associated with the notification), a notification message information (e.g., the text associated with the notification), a notification object information (e.g., the group or other social networking object associated with the notification).

To provide users with one or more previously discussed social networking services, the social networking system 101 may comprise server device 106 which may include, among other applications, social networking application 108. The social networking system 101 may further comprise one or more datastores 112-d operatively coupled to the server device 106. The one or more datastores 112-d may reside in physical storage devices operatively coupled to the service 106 and may be configured to store one or more social networking objects representative of the information received and provided by the social networking system 101. Furthermore, the social networking objects of the social networking system 101 may include, but is not limited to, one or more events which may be stored in the events datastore 112-1, one or more user profiles which may be stored in the user profiles datastore 112-2, one or more comments which may be stored in the comments datastore 112-3, one or more activities (e.g., posts, polls, etc.) which may be stored in the activities datastore 112-4, groups datastore 112-5, media (e.g., images, videos, illustrated graphical objects, e.g., "Stickers," animated images, files, applications, etc.) stored in the media datastore 112-6, or any other social networking object that may be received, stored, provided, or otherwise tracked and/or accessed by the social networking system 101.

The one or more datastores 112-d may further store object connections between two or more objects in the object connections datastore 112-7. Furthermore, the object connections may be representative of the relationship or links between the two or more objects. The one or more social networking objects in conjunction with one or more objects connections may form a social graph comprising two or more nodes interconnected via one or more edges, where each node may be representative of a social networking object and each edge may be representative of the object connections between two or more social networking objects in the social networking system 101. To enable the applications 124-a-1 to retrieve, modify, update or otherwise access the various information managed by the social networking system 101 and represented as the social graph, the social networking application 108 may further provide a graph application program interface (API) for access by the applications 124-a-1 utilizing various protocols (e.g., hypertext transfer protocol (HTTP), HTTP secure (HTTPS), etc.).

In some embodiments, the social networking application 108 may include one or more social networking components 110-c. At least some of the one or more social networking components 110-c may be arranged to implement at least a portion of the graph API. The one or more social networking components 110-c may include, but is not limited to, a social networking management component 110-1 generally arranged to the association and management of one or more groups by users, a social networking notification component 110-2 configured to generate one or more notifications based at least partially on users activity in the social networking system 101 and provide the one or more notifications to one or more applications 124-a-1 to notify the one or more users. The social networking application 108 may further include a social networking communications component 110-3 configured to provide communications for the one or more social networking components 110-c and communicate with the one or more applications 124-a-1 via communications network 103.

In some embodiments, the social networking application 108 may further comprise a social networking search component 110-4 generally arranged to search for information in the social networking system 101. In some embodiments, the social networking search component 110-4 may be arranged to receive search query information, the search query information may include, but is not limited to, one or more search queries including one or more search terms from the one or more applications 124-a-1 to search for information associated with social networking objects and/or connections stored in the social networking system 101, determine search results information based at least partially on the received search query information and provide the search results information to the users via applications 124-a-1.

In some embodiments, the social networking search component 110-4 may be configured to receive group search query information one or more search queries including one or more search terms for one or more groups from one or more users, determine the search results including the one or more groups based at least partially on the received search queries and the social group information associated with each group in the social networking system 101, and provide the search results including one or more groups to the users via applications 124-a-1.

Additionally, in instances when search results may include two or more groups, the two or more groups in a search result may be ranked or ordered based at least partially on the user profile information (e.g., user location information) and group location information associated with the one or more groups in the one or more search results, so that the two or more groups may be ranked or ordered starting with groups that may be geographically closest to the hometown location of a user or current location of a user that submitted the search query.

Additionally or alternatively, in instances when a search result may include two or more groups, the two or more groups in the search result may be ranked or ordered based at least partially on the user profile information (e.g., user interest information accumulated and/or determined through "likes," etc.) and group events information associated with each group in the search result, so that the two or more groups in the search result may be ranked or ordered starting with groups having group events that may be of most interest to a user that submitted the search query.

In some embodiments, the social networking application 108, may further comprise a social networking group discovery component 110-5 configured to provide one or more discovered or suggested groups to assist users in finding, joining, and/or requesting to join one or more groups that may be of interest to the user. The social networking group discovery component 110-5 may be configured to receive discovery query information including one or more discovery queries from the one or more applications 124-a-1 for discovery results information. The discovery result information may include, but is not limited to, suggested group results information, suggested friends' group results information, and/or suggested local group results information. The social networking group discovery component 110-5 may be further configured to determine the one or more discovery results based at least partially on user profile information (e.g., user interest information, user social connection information, etc.) and/or social group information (e.g., group tags information, group membership information, etc.) associated with each group in the social networking system 101, and provide the one or more discovery results to the users via applications 124-a-1.

Additionally, in instances when the discovery result information, such as, for example, suggested group result information, suggested friends' group result information, or a suggested local group results information, includes two or more groups, the two or more groups within the discovery result information may be ranked or ordered based at least partially on user interest information, user social connection information, group membership information, group location information, or any other user profile information or social group information, so that the two or more groups in the discovery result information may be ranked or ordered starting with groups that may be of most interest to a user that submitted the discovery query.

Figure 1B:
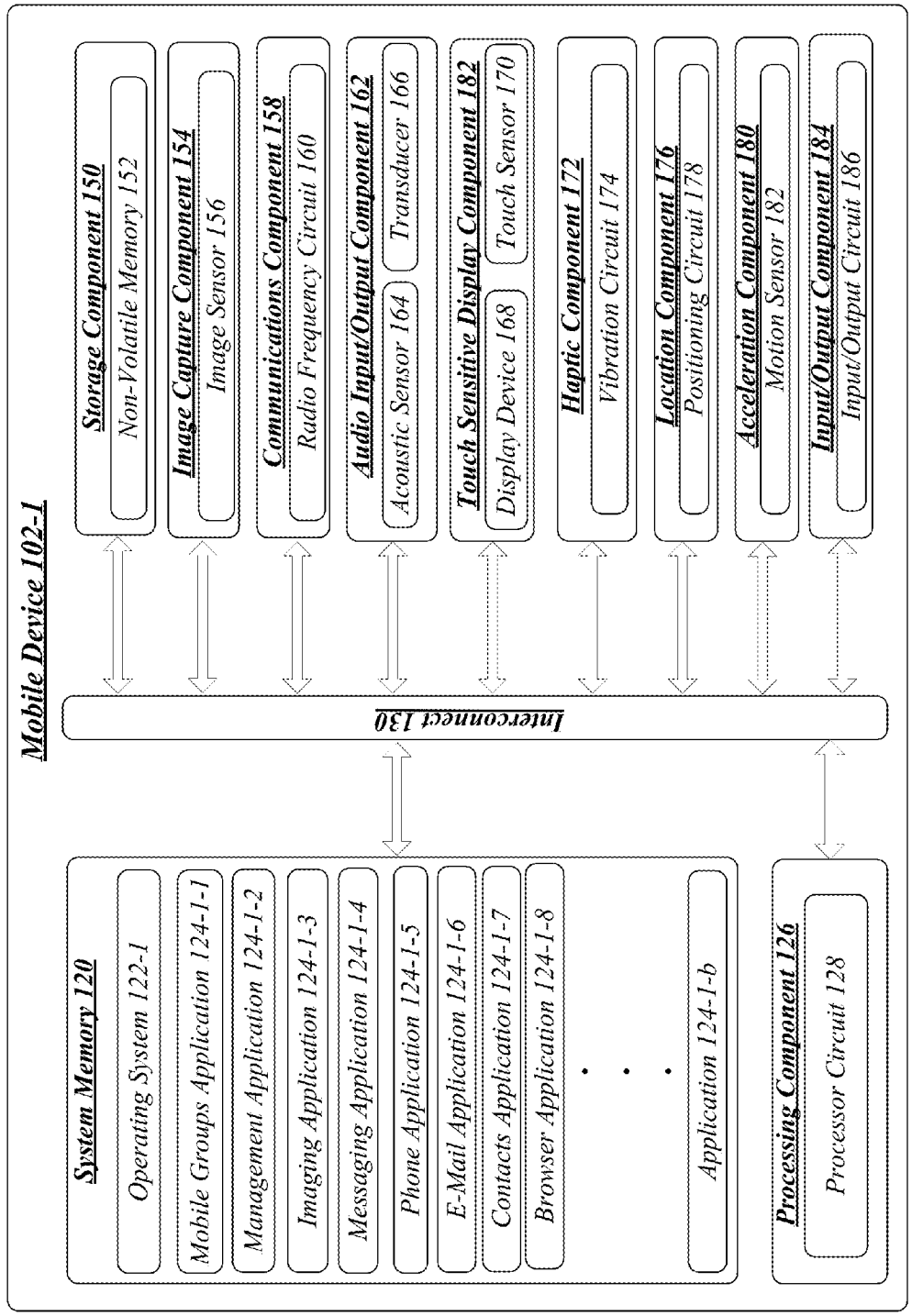
FIG. 1B illustrates an exemplary embodiment of a device, which may be a mobile device, comprising one or more applications.

FIG. 1B illustrates an exemplary embodiment of a device 102-1, which may be a mobile device 102-1 (e.g., a mobile phone or any other a portable computing and/or communications device), comprising one or more applications 124-1-b, in the mobile groups management system 100. The mobile device 102-1 may be generally arranged to provide mobile computing and/or mobile communications and may include, but is not limited to, system memory 120, processing component 126, storage component 150, image capture component 154, communications component 158, acoustic input/output component 162, touch sensitive display component 182, haptic component 172, location component 172, acceleration component 180 and/or input/output component 184, where each of the components and system memory 120 may be operatively connected via interconnect 130 (e.g., I/O Bus, peripheral bus, etc.).

In some embodiments, the processor component 126 may be generally arranged to execute instruction information including one or more instructions. In some embodiments, the processor component 126 may be a mobile processor component 126 or system-on-chip (SoC) processor component which may comprise, among other elements, processor circuit 128. The processor circuit 128 may include, but is not limited to, at least one set of electronic circuits arranged to execute one or more instructions. Exemplary processor components 126 may include, but is not limited to, Qualcomm® Snapdragon®, Nvidia® Tegra®, Intel® Atom®, Samsung® Exynos, Apple® A7®, or any other type of mobile processor(s) arranged to execute the instruction information including the one or more instructions stored in system memory 120 and/or storage component 150.

In some embodiments, the storage component 150 may be generally arranged to store information in volatile and/or nonvolatile memory, which may include, but is not limited to, read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM) flash memory, polymer memory such as ferroelectric polymer memory, ovonic memory, phase change or ferroelectric memory, silicon-oxide-nitride-oxide-silicon (SONOS) memory, solid state memory devices (e.g., USB memory, solid state drives SSD, etc.), and/or any other type of storage media (e.g., non-transitory storage media, etc.) configured for storing information.

In some embodiments, the image capture component 154 may be generally arranged to capture one or more images or a sequence of one or more images (e.g., video, etc.) and provide image information and/or video information. The image capture component 154 may include, among other elements, image sensor 156. Exemplary image sensors 156 may include, but is not limited to, charged-coupled devices (CCD), active-pixel sensors (APS), or any other type of image sensors arranged for converting optical images into electronic signals that may be compressed, encoded, and/or stored as image information and/or video information.

In some embodiments, the communications component 158 may be generally arranged to enable the mobile device 102-1 to communicate with the social networking system 101 via the communication network 103. The communications component 158 may include, among other elements, a radio frequency circuit 160 configured for encoding and/or decoding information and receiving and/or transmitting the encoded information as radio signals in frequencies consistent with the one or more wireless communications standards (e.g., Wireless IEEE 802.11, WiMAX IEEE 802.16, Global Systems for Mobile Communications (GSM), Enhanced Data Rates for GSM Evolution (EDGE), Long Term Evolution (LTE), etc.).

In some embodiments, the acoustic input/output (I/O) component 162 may be generally arranged for converting sound, vibrations, or any other mechanical waves received into electronic signals representative of acoustic input information utilizing an acoustic sensor 164 (e.g., a microphone, etc.). Additionally, the acoustic I/O component 162 may be further arranged to convert electronic signals representative of acoustic output information utilizing an electroacoustic transducer 166 (e.g., a speaker, etc.) to output sound, vibrations, or any other mechanical waves.

In some embodiments, the touch sensitive display component 182 may be generally arranged to receive and present visual display information, and provide touch input information based on detected touch based or contact based input. Furthermore, the touch sensitive display component 182 may include, among other elements, a display device 168 (e.g., liquid-crystal display, light-emitting diode display, organic light-emitting diode display, etc.) for presenting visual information and touch sensor 170 (e.g., resistive touch sensor, capacitive touch sensor, etc.) associated with the display device 168 to detect and/or receive touch or contact based input via associated with the display device 168. Additionally, in some embodiments, the touch sensor 170 may be integrated with the surface of the display device 168, so that a user's touch or contact input may substantially correspond to the presented visual display information on the display device 168.

In some embodiments, the haptic component 172 may be generally arranged to provide tactile feedback through the housing, case, or enclosure of the mobile device 102-1. Furthermore, the haptic component 172 may include, among other elements, a vibration circuit 174 (e.g., an oscillating motor, vibrating motor, etc.) arranged to convert haptic information to mechanical vibrations representative of tactile feedback.

In some embodiments, the location component 176 may be generally arranged to receive positioning signals representative of positioning information and provide location information (e.g., approximate physical location of the current mobile device 102-1) based at least partially on the received positioning information. Furthermore, the location component 176 may include, among other elements, a positioning circuit 178 (e.g., a global positioning system (GPS) receiver, etc.) arranged to determine the physical location of the mobile device 102-1. In some embodiments, the location component 176 may be further arranged to communicate and/or interface with the communications component 158 and communicate with the communications network 103 in order to provide greater accuracy and/or faster location acquisition of the location information.

In some embodiments, the acceleration component 180 may be generally arranged to detect acceleration of the mobile device 102-1 in one or more axes. The acceleration component 180 may include, among other elements motion sensor 182 (e.g., accelerometer, etc.) to convert physical motions applied the mobile device 102-1 into motion information.

In some embodiments, the input/output component 184 may be generally arranged to provide signal I/O and may include, among other elements, input/output circuit 186. Exemplary input/output components 184 may include, but is not limited to, microphone input component, headphone output component, universal serial bus (USB) component, or any other signal input/output component.

In some embodiments, the system memory 120 may be generally arranged to store information in volatile and/or nonvolatile high speed memory similar to those discussed with respect to storage component 150. In some embodiments, at least a portion of the stored information in the system memory 120 may comprise instruction information arranged for execution by the processing component 126. In those embodiments, the instruction information may be representative of at least one operating system 122-1, one or more applications 124-1-b, and/or any other programs and/or modules.

In some embodiments, the operating system 122-1 may comprise a mobile operations system 122-1 (e.g., Apple®, iOS®, Google® Android®, HP® WebOS®, Microsoft® Windows Phone®, Microsoft® Windows®, etc.) general arranged to manage hardware resources (e.g., one or more components of the mobile device 102-1) and/or software resources (e.g., one or more applications 124-1-b of the mobile device 102-1).

In some embodiments, the one or more applications 124-1-b may include, but is not limited to, a management application 124-1-2 generally arranged to manage the execution of the one or more applications 124-1-b of the mobile device 102-1. In some embodiments, the management application 124-1-2 may be visually presented as a home screen UI view comprising a plurality of UI elements representative of applications 124-1-b and may be arranged to receive touch input information from the touch sensitive display component 182 and launch or initiate the execution of one or more applications 124-1-b of mobile device 102-1 based at least partially on the received touch input information.

In some embodiments, the one or more applications 124-1-b may include, but is not limited to, imaging application 124-1-3, generally arranged to receive, store, display and/or otherwise manage image information and/or video information via the image capture component 154. The one or more applications 124-1-b may further include, but is not limited to, message application 124-1-4, generally arranged to receive, transmit, display, and/or otherwise manage one or more messages utilizing one or more cellular and/or internet messaging services via one or more components of the mobile device 102-1. The one or more applications 124-1-b may further include, but is not limited to, phone application 124-1-5 generally arranged to receive, make, display, and/or otherwise manage one or more audio and/or video phone calls utilizing one or more cellular and/or internet phone services via one or more components of the mobile device 102-1. The one or more applications 124-1-b may further include, but is not limited to, e-mail application 124-1-6 generally arranged to receive, compose, display, and/or otherwise manage one or more one or more e-mails messages utilizing one or more components of the mobile device 102-1. The one or more applications 124-1-b may further include, but is not limited to a browser application 124-1-8 generally arranged to access one or more web pages utilizing one or more utilizing one or more components of the mobile device 102-1.

In some embodiments, the one or more applications 124-1-b may further include, but is not limited to, contacts application 14-1-7 generally arranged to add, remove, store, and/or otherwise manage mobile device contact information associated with one or more applications 124-1-b (e.g., messaging application 124-1-4, phone application 124-1-5, email application 124-1-6, etc.) used to identify one or more users and communicate between and among the identified one or more users of the one or more mobile devices 102-a utilizing the one or more applications 124-1-b and/or one or more components of the mobile device 102-1. The mobile device contact information may include, but is not limited to, a list of individual contact information representative of one or more contacts. The individual contact information may include, but is not limited to contact name information (e.g., first, last, and middle name of a contact), contact phone number information (e.g., phone number of the contact), contact email address information (e.g., email address of the contact), or any other information associated with a contact.

In some embodiments, the one or more applications 124-1-b may further include, but is not limited to, mobile groups application 124-1-1 generally arranged to enable one or more users of the mobile device 102-1 to associate with or manage one or more groups in the social networking system 101. In some embodiments, the mobile groups application 124-1-1 may be generally launched or initiated by the management application 124-1-2 based at least partially on touched input information received from the touch sensitive display component 182. In some embodiments, the mobile groups application 124-1-1 may be configured to request access and/or obtain access to the mobile device contact information.

Additionally or alternatively, in some embodiments, the mobile groups application 124-1-1 may be configured to enable mobile deep linking utilizing a deep link reference (e.g., a universal resource identifier (URI), universal resource locator (URL), etc.) associated with the mobile groups application 124-1-1. The deep link reference associated with the mobile groups application 124-1-1 may include, but is not limited to, application identification information (e.g., a unique identifier associated with the mobile groups application 124-1-1) and application location information (e.g., an identifier associated with a specific location within the groups application 124-1-1, such as, group identifier information) configured to enable a non-mobile groups application (e.g., home screen UI view of the management application 124-1-2, imaging application 124-1-3, messaging application 124-1-3, phone application 124-1-5, e-mail-application 124-1-6, contacts application 124-1-7, browser application 124-1-8, or any other application 124-1-b) to directly launch or transition to a specific location (e.g., a group discussion user interface (UI) view for a specific group identified by application location information) within the mobile groups application 124-1-1 from the non-mobile groups application based at least partially on touch input information received from the touch sensitive display component 182.

Figure 1C:
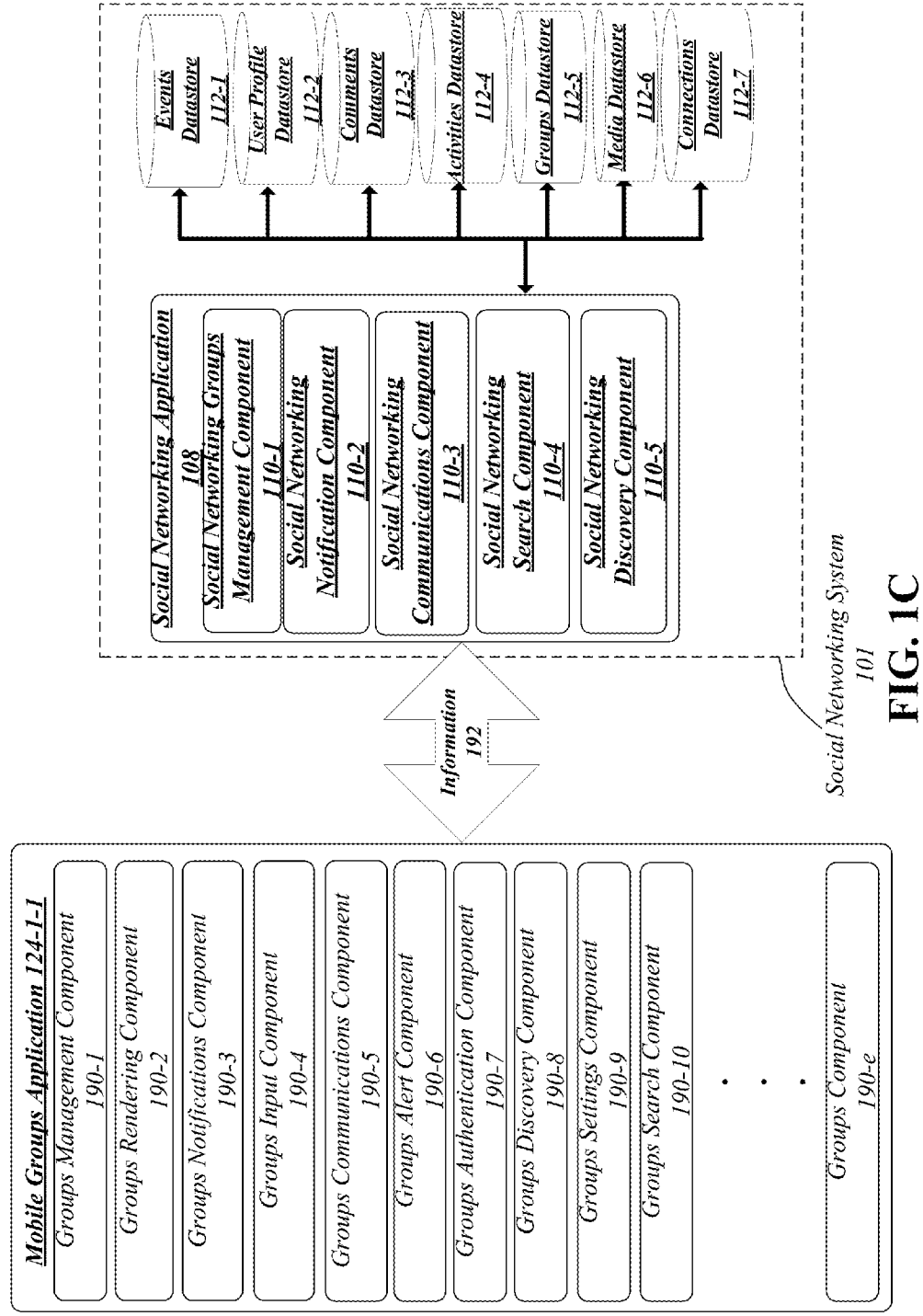
FIG. 1C illustrates an exemplary embodiment of the mobile groups application for managing at least one group.

FIG. 1C illustrates an exemplary embodiment of the mobile groups application 124-1-1 for managing at least one group. The mobile groups application 124-1-1 may include one or more groups components 190-*e*. The one or more groups components 190-*e* may include, but is not limited to, groups management component 190-1, groups rendering component 190-2, groups notifications component 190-3, groups input component 190-4, groups communications component 190-5, groups alert component 190-6, groups authentication component 190-7, groups discovery component 190-8, groups settings component 190-9, and/or groups search component 190-10.

The groups authentication component 190-7 may be generally arranged to authenticate a user having an associated user account based on at least a portion of the user account information (e.g., user account identifier and user account authentication token) inputted or provided by the user utilizing an on-screen virtual keyboard. Once the user having the associated user account has been authenticated, the groups authentication component 190-7 may be configured to receive one or more time limited access tokens from the social networking application 108, and store the one or more time limited access tokens in the storage component 150 and/or system memory 120 of the mobile device 102-1 for use by the one or more groups components 190-*e* to access information in the social networking system 101 via the groups communications component 190-5.

The groups communications component 190-5 may be generally arranged to receive, transmit, and/or otherwise facilitate communications of information between the one or more groups components 190-*e* and the one or more social networking components 110-*c* (e.g., social networking communications component 110-3) and, utilizing one or more APIs (e.g., graph API), the received, stored, and/or cached one or more time limited access tokens, one or more components of the mobile device 103 (e.g., the communications component 158), and/or communications network 103.

The groups rendering component 190-2 may be generally arranged to provide visual display information comprising to the touch sensitive display component 182 to render one or more UI views comprising one or more UI elements for visual presentation on the display device 168. In some embodiments, the groups rendering component 190-2 may be further arranged to provide visual display information to the touch sensitive display component 182 to render one or more animated transitions between the one or more views and/or one or more animated UI elements for visual presentation on the display device 168.

The groups input component 190-4 may be generally arranged to provide user input information which may include, but is not limited to, one or more gestures and provide character input information utilizing one or more components of the mobile device 102-1 (e.g., touch sensitive display component 182). In some embodiments, the groups input component 190-4 may be configured to receive touch input information from the touch sensitive display component 182 and determine one or more finger gestures based at least partially on the received touch input information. In some embodiments, the groups input component 190-4 may be configured to provide user input information including the character input information to the one or more groups components 190-*e* (e.g., groups search component 190-10, groups management component 190-1, etc.) based on one or more characters inputted by a user utilizing an on-screen virtual keyboard visually presented on at least a portion of the display device 168. Furthermore, the character input information may be determined based at least partially on one or more contacts detected in a pre-defined region associated with the on-screen virtual keyboard.

In some embodiments, the groups input component 190-4 may be further configured to detect a selection finger gesture to select a UI element based at least partially on the received touch input information, the received touched input information may include, but is not limited to, finger contact at a first location in a predefined region associated with the UI element visually presented on the display device 168 for a predefined time period (e.g., less than one second), and termination of the finger contact at the first location of the predefined region.

In some embodiments, the groups input component 190-4 may be also configured to detect a scroll finger gesture to scroll a scrollable UI element and/or scrollable UI view based at least partially on the received touch input information, the received touched input information may include, but is not limited to, finger contact at a first location in a predefined region associated with the scrollable UI element and/or scrollable UI view visually presented on the display device 168, initiating movement of the finger contact within a predefined time period after the finger contact (e.g., less than one second), continuous movement of the finger contact from the first location to a second location in at least one direction (e.g., up direction, down direction, left direction, right direction, or any combination thereof), and termination of the finger contact at the second location.

In some embodiments, the groups input component 190-4 may be further configured to detect a movement finger gesture to move a moveable UI element from a first position to a second position based at least partially on the received touch input information. Furthermore, detecting the movement finger gesture may include, but is not limited to detecting a starting movement finger gesture to begin the movement of a moveable UI element and an ending movement finger gesture to end the movement of the moveable UI element.

In some embodiments, the groups input component 190-4 may be also configured to detect the starting movement finger gesture based on the received touch input information which may include, but is not limited to, finger contact at the first location in a predefined region associated with the moveable UI element visually presented on the display device 168 for a predefined time period (e.g., two seconds, three seconds, etc.). The groups input component 190-4 may be configured to detect the ending movement finger gesture based on the received touch input information which may include, but is not limited to, finger contact from the first location to the second location in one direction, and termination of the finger contact at the second location after movement of the finger contact.

In some embodiments, the groups input component 190-4 may be also configured to detect a transition finger gesture to transition from scrollable group discussion UI views to groups UI views based at least partially on the received touch input information. The received touched input information may include, but is not limited to, finger contact substantially in or near a predetermined region that may correspond to a group cover UI element visually presented by the display device 168, initiating the downward movement of the finger contact within a predefined time period (e.g., less than one second), continuous downward movement of the finger contact, and termination of the finger contact.

It may be appreciated that in some embodiments, one or more UI elements and/or UI views may be selectable, moveable, and/or scrollable, and the groups input component 190-4 may be configured to determine the respective finger gestured based at least partially on the received touch input information.

The groups settings component 190-9 may be generally arranged to manage the settings associated with the mobile groups application 124-1-1 utilizing one or more components of the mobile device 102-1 (e.g., touch sensitive display component 182, storage component 150, etc.). In some embodiments, the groups settings component 190-9 may be configured to modify and/or update user mobile groups application preferences information stored or cached in storage component 150 and system memory 120, based at least partially on user input information provided by the groups input component 190-4.

In some embodiments, the groups settings component 190-9 may be configured to archive one or more groups identified by the group identifier information by modifying the group preference information to disable push notifications, disable auditory cues, disable haptic feedback, and set the group preferences information to no activities in the specific group. It may be appreciated that once a group is archived, the user may remain as a member of the archived group and the archived group remains searchable but any notifications associated with the group may not be received and/or visually presented in one or more UI views (e.g., groups UI view, group notifications UI view) by the groups rendering component 190-2.

In some embodiments, the groups settings component 190-9 may be configured to modify, update, and/or otherwise synchronize the user mobile groups application preferences information stored or cached in storage component 150 and/or system memory 120 with the user mobile groups application preferences information stored in the social networking system 101, so that any instance of the mobile groups applications 124-a-1 for a user having an associated user account and user profile information may share and/or utilize the latest user mobile groups application preferences information.

The groups notifications component 190-3 may be generally arranged to manage one or more notifications received from the social networking system 101 and provide user group unread notifications information (e.g., number of unread notifications for an associated group) and user notification information (e.g., one or more notifications for one or more groups) to the groups rendering component 190-2 for visual presentation in one or more UI views (e.g., groups UI view, group notifications UI view, etc.). In some embodiments, the groups notifications component 190-3 may be configured to provide pull notification services, by requesting, at a predefined time interval (e.g., every 15 minutes, every 30 minutes, every 45 minutes, every hour, etc.), updated user notification information from the social networking notification component 110-2 and/or requesting updated user notification information, when the mobile groups application 124-1-1 is launched or executed. In some embodiments, the groups notifications component 190-3 may be configured to provide push notification services, by receiving a request from the social networking notification component 110-3 to provide updated user notification information, and receiving the updated user notification from the social networking communication component 110-3.

In some embodiments, the groups notifications component 190-3 may be configured to provide push notification services and/or pull notification services based at least partially on the user mobile groups application preferences information stored or cached in system memory 120 or storage component 150. The group notification component 190-3 may be configured to enable the request for and/or receipt of notification for all activities in a specific group, when group preference information associated with the specific group indicates the user notification includes all activities in specific group. The group notification component 190-3 may be configured to enable request for and/or receipt of notification for friends' activities in a specific group, when group preference information associated with the specific group indicates the user notification includes friends' activities in the specific group. The group notification component 190-3 may be configured to disable the request for and/or receipt of all activities in a specific group, when group preference information associated with the specific group indicates the user notification includes no user activities in the specific group.

It may be appreciated that in some embodiments, group notification component 190-3 may be configured to update or reset the user group unread notifications information indicating the number of unread notifications for a specific group to zero to indicate that the user has read the notifications in the specific group, after the group discussion UI view for the specific group is visually presented by the touch sensitive display component 182.

The groups alert component 190-6 may be generally arranged to manage the output of auditory cues (e.g., click sound, pop sounds, etc.) and/or haptic feedback (e.g., vibrations at one or more frequencies, etc.) utilizing one or more components of the mobile device 102-1 (e.g., audio I/O component 162 and/or haptic component 172). In some embodiments, the groups alert component 190-6 may be configured to output one or more auditory cues and/or to indicate the selection of a selectable UI element, in response to detecting a selection finger gesture to select a UI element. In some embodiments, the groups alert component 190-6 may be configured to output one or more auditory cues and/or haptic feedback, in response to detecting a selection finger gesture to select a selectable UI element. In some embodiments, the groups alert component 190-6 may also be configured to output at least a first auditory cue and/or first haptic feedback to indicate the starting movement of a movable UI element, in response to detecting a starting movement finger gesture to begin movement of the UI element from a first position to a second position. In some embodiments, the groups alert component 190-6 may also be configured to output at least a second auditory cue and/or a second haptic feedback to indicate the ending movement of a movable UI element, in response to detecting the ending movement finger gesture to end the movement of the UI element from the first position to the second position. It may be appreciated that in some embodiments, at least the first auditory cue and/or the first haptic feedback may be distinct from at least the second auditory cue and/or second haptic feedback to enable users to distinguish the gestures.

In some embodiments, the groups alert component 190-6 may be further configured to output auditory cues and/or haptic feedback associated with receipt of one or more notifications by the groups notifications component 190-3. In some embodiments, the groups alert component 190-6 may configured to disable or enable one or more auditory cues and/or haptic feedbacks associated with receipt of one or more notifications and detection of one or more gestures based at least partially on user mobile groups application settings information stored or cached in system memory 120 and/or storage component 150.

The groups management component 190-1 may be generally arranged to enable the association and management of one or more groups in the social networking system 101 by a user having an associated user account. To provide the association and management of one or more groups in the social networking system 101, the groups management component 190-1 may be further arranged to request at least a portion of information (e.g., at least a portion of user profile information, social groups information, etc.) from the social networking application 108, receive the requested portion of information from the social networking application 108, store or cache the received portion of information in system memory 120 and/or storage component 150, provide the stored or cached information to the groups rendering component 190-2 for visual presentation on one or more UI views, receive user input information to add, remove, append, and/or otherwise modify at least a portion of the cached or stored information, and provide at least a portion updated stored or cached information to the social networking application 108.

In some embodiments, after the successful authentication of the user by the groups authentication component 190-7 and receiving the one or more time limited access tokens from the social networking application 108, the groups management component 190-1 may initiate one or more requests for information 192, including, but is not limited to, information associated with the user having the associated user account via the groups communications component 190-5.

In some embodiments, the groups management component 190-1 may be configured to request for user groups membership information associated with the user having the associated user account and receive the requested user groups membership information from the social networking management component 110-1 associated with the user. The group management component 190-1 may be further configured to provide, among other information, the received user groups membership information for the user to the groups rendering component 190-2 for visual presentation in one or more UI views (e.g., groups UI view, groups search UI view, groups settings UI view, etc.).

In some embodiments, the user group order information associated with each of the groups in the list of groups may be representative of the ranking or ordering of the list of group. The list of group may be ranked or ordered from groups of most interest to the user to the groups of least interest to the user based at least partially on group interest information associated with each group in the list of groups the user is a group member of. In some embodiments, the social networking management component 110-1 may be configured to determine the group interest information (e.g., a normalized numerical value) associated with each group based at least partially on a comparison of user group favorite information associated with each group, group discussion information associated with each group, user group last visit information associated with each group, the user profile information (e.g., user location information, etc.) associated with the user, the social group information (e.g., group location information, etc.) associated with each group, user group search information, and/or any other information that may be used to determine group interest information.

By way of example, the groups that are favorites as indicated by the user group favorite information for each group, groups with the most activity as indicated by the group discussion information for each group, the groups that were the most recently visited by the user as indicated by user group last visit information for each group, the groups that are closest to the hometown location and/or current location of the user as indicated by the user location information and group location information, and/or the groups that have group names matching a frequently searched term, may have group interest information that includes a higher normalized numerical value than compared to the group interest information associated with groups that were not indicated as favorites, not the group with the most activity, not most recently visited by the user, and/or not geographically close compared to other groups. The example is not limited in this context.

In some embodiments, the social networking management component 110-1 may be configured to order the groups starting with the groups that may be of most interest (e.g., highest normalized numerical value) to the groups of least interest (e.g., lowest normalized numerical value) provide user groups membership information including a ranked or ordered list determined based on the group interest information associated with each group.

It may be appreciated that in some embodiments, the groups may be ordered dynamically (e.g., from the groups of most interest to the user to the least interest to the user) every time the user accesses the mobile groups application 124-1-1 from a non-mobile groups application (e.g., from the home screen UI view of the management application 124-1-2). In other embodiments, the groups may be ordered dynamically, when the user accesses the mobile groups application 124-1-1 for only the first time or by explicit request from the user. In embodiments where the groups may be ordered dynamically, it may be appreciated that any group that was manually reordered by the user may remain static or immutable in their ordering and may not be dynamically ordered. However, other groups that have not been manually reordered may still be dynamically ordered in accordance with the embodiments discussed above. Still in other embodiments, all groups may be ordered manually without any dynamic ordering, and the groups management component 190-1 may be configured to notify the social networking management component 110-1 by providing manual group ordering information (e.g., the fixed or manual order of one or more groups) to the social networking management component 110-1, in response to manual ordering of one or more groups.

In some embodiments, the groups management component 190-1 may be configured to request for at least a portion of the social group information for each group the user is a member of in the social networking system 101 based on the group identifier information of each group. The groups management component 190-1 may then receive the at least a portion of the social group information for each group the user is a member of from the social networking management component 110-1. The at least a portion of the social group information may include but is not limited to group cover image information.

In some embodiments, the group cover image information may include, but is not limited to, a focused group cover image having a predefined geometric shape (e.g., circular shape, polygon shape, etc.) and a predefined size (e.g., a radius of 50 pixels, etc.) representative of a group. The focused group cover image may be determined based at least partially on image analysis of the group cover image associated with the group. In some embodiments, the focused group cover image analysis may be configured to detect one or more social networking objects (e.g., faces, cars, animals, locations, etc.) in the group cover image and identify a main focus of the group cover image including the one or more detected social networking objects. The focused group cover image analysis may be further configured to image crop and/or resize the main focus of the group cover image to a predefined geometric shape of a predefined size (e.g., a circular shape having a radius of 25 pixels, a polygon shape having a radius of 25 pixels, etc.).

It may be appreciated that in some embodiments, the social networking management component 110-1 may be configured to perform the focused group cover image analysis and create the focused group cover image, when a group cover image is provide by a user to the social networking system 101. Additionally or alternatively, the groups management component 190-1 of the mobile groups application 124-1-1 may be configured to perform the focused group cover image analysis and provide the group cover image information including the focused group cover image to the social networking management component 110-1. In other embodiments, users may crop and/or resize an image as a group cover image utilizing for example, one or more UI views (e.g., group creation UI view 700-6 illustrated in FIG. 7F).

In some embodiments, the group cover image information may further include, but is not limited to, a group color and/or a group color gradient representative of the group. In some embodiments, the social networking management component 110-1 of the social networking system 101 may be configured to generate the group color and/or group color gradient selected from a range of colors within a color range of a red-green-blue (RGB) color space. Additionally or alternatively, the groups management component 190-1 of the mobile groups application 124-1-1 may generate the group color and/or group color gradient selected from a range of colors within a color range of a RGB color space and provide the group cover image information including the generated group color and/or group color gradient to the social networking management component 110-1. The color range may include the entire RGB color space or at least a portion of the RGB color space.

In some embodiments, when the group cover image associated with a group is available, the social networking management component 110-1 and/or the groups management component 190-1, may be configured to determine group cover color range by performing image analysis on the group cover image to determine the color range associated with the group cover image and generate the group color and/or group color gradient selected from the determined group cover color range.

In some embodiments, when the group cover image associated with a group has not been selected, not been determined, and/or otherwise not yet available, the focused group cover image having the predefined geometric shape and the predefined size may be replaced with a group color and/or a group color gradient having substantially the same or similar predefined geometric shape and predefined size.

It may be appreciated that in some embodiments, the social networking management component 110-1 and/or the groups management component 190-1 may be configured to generate a group color and/or a group color gradient to be globally unique for each group in the social networking system 101 or locally unique for the groups identified in the user groups membership information associated with a user. It may be further appreciated that the group color and/or the group color gradient may be encoded as a numeral value, or a range of numerical values, such as, for example, a color code or a range of color codes in hexadecimal format (e.g., "0xFF0000", "0xFF0000" to "0xFF9999", etc.) associated with a particular color space (e.g., RGB color space, etc.) to enable the mobile groups application 124-1-1 to quickly and efficiency receive at least the group color and/or the group color gradient of the group cover image information from the social networking system 101 during a wide variety of network conditions (e.g., network congestion, etc.) associated with the communications network 103.

In some embodiments, when the groups management component 190-1 receives the group color and/or the group color gradient for a group from the social networking management component 110-1 before the group cover image associated with the group is received, the groups management component 190-1 may be configured to provide, among other information, the group color and/or group color gradient associated with the group to the groups rendering component 190-2 for visual presentation while the groups management component 190-1 begins to receive or continues to receive (e.g., as a result of network delay in communications network 103) the group cover image associated with the group from the social networking management component 110-1. Once the group cover image is received, the groups management component 190-1 may be configured to provide, among other information, the group cover image associated with the group for visual presentation. At least one technical advantage of using group color and/or group color gradients may include, but is not limited to, enabling a user to quickly identify a specific group based on the group color and/or group color gradient visually presented by the touch sensitive display component 182, when the group cover image may be otherwise not available, or not yet available for visual presentation.

In some embodiments, the groups management component 190-1 may be configured to request for at least a portion of social group information (e.g., group cover image information, group name information, group privacy information, face piles information, etc.) for a group based at least partially on a group identifier information identifying the group and at least a portion of group discussion information associated with the group, and store or cache the received portion of social group information and group discussion information. The group management component 190-1 may be further configured to provide, among other information, the received social group information for the group to the groups rendering component 190-2 for visual presentation in one or more UI views (e.g., group discussion UI view, etc.).

In some embodiments, the group management component 190-1 may be configured to request for at least a portion of social group information based at least partially on a group identifier information and provide the received social group information for one or more groups to the groups rendering component 190-2 for visual presentation, in response to a user receiving a deep link reference notification information from a non-mobile groups application, the deep link reference notification information may include, but is not limited to, application identification information comprising the group identifier information.

In some embodiments, the received face piles information from social networking application 108 for a group may include a ranked list of user identifier information representative of group members that are most active in the group based on the number of group activities users have posted or created in group, which may be determined by the social networking application 108 based at least partially on group discussion information and the user identifier information of all users or group members in the group. In other embodiments, the received face piles information may include a random list of user identifier information representative of at least some of the group members of the group. Still in some embodiments, the received face piles information may include a list of user identifier information representative of group members that are also socially connected (e.g., friends, family members, coworkers, etc.) with a user accessing the group.

In some embodiments, the received group discussion information from social networking application 108, including a list of group activity information representative of one or more group activities, may be ordered in reverse chronological order based at least partially on the group activity creation time information of each group activity information, so that groups rendering component 190-2 may visually present the newest group activity first in one or more UI views (e.g., group discussion UI view, etc.). Alternatively, the received group discussion information may be ordered in chronological order starting with the oldest group activity.

In some embodiments, the received group discussion information may further include one or more pinned group activities where the group activity information for a pinned group activity becomes fixed to the first position in the list of group activity information, so that groups rendering component 190-2 may visually present the pinned group activity first in one or more UI views (e.g., group discussion UI view, etc.). It may be appreciated that a pinned group activity may be excluded from any chronological ordering so that the ordering of the pinned group activity may become immutable and fixed at the first position. Additionally or alternatively, in some embodiments, the pinned group activities may be visually presented a separate UI view.

In some embodiments, the groups management component 190-1 may be configured to provide one or more group management functions, which may include, but is not limited to, creating one or more groups, suggesting the creation of one or more groups, archiving one or more groups, sharing one or more groups, leaving one or more groups, joining one or more groups, inviting one or more users to join as group members.

In some embodiments, the groups management component 190-1 may be configured to create one or more groups in the social networking system 101 by receiving user input information during the visual presentation of one or more UI views (e.g., groups UI views, group discussion UI views, group discovery UI view, etc.) to create a new group, and receiving user input information comprising group creation configuration information, which may include, but is not limited to, at least a portion of the social group information (e.g., group privacy information, group name information, group description information, group cover image information), during the visual presentation of one or more UI views (e.g., group creation UI views, etc.), and requesting the social networking application 108 to create of the new group based on the group creation configuration information and user identifier information associated with the user creating the new group.

In some embodiments, the groups management component 190-1 and/or the social networking management component 110-1 may be configured to suggest the creation of a group in the social networking system 101 by determining a list of user identifier information of one or more users (e.g., family members, friends, coworkers, classmates, neighbors, etc.) having a specified social connection type and social proximity that a user is socially connected to, based on the user social connections information of the one or more users. The social networking management component 110-1 may be further configured to determine suggested creation group information based at least partially on the social connection type and the list of user identifier information. The suggested creation group information, may include, but is not limited to, suggested group privacy information (e.g., the suggested group privacy type), suggested group name information (e.g., suggested group name), suggested group description information (e.g., suggested group name), and suggested group membership information (e.g., a list of suggested group members).

By way of example, the groups management component 190-1 and/or the social networking management component 110-1 may determine a list of user identifier information for all family members that have a first degree connection to a user named "Charles Wain." The groups management component 190-1 and/or the social networking management component 110-1 may then determine the suggested group privacy information as closed group type, the suggested group name information as "Family Members", the suggested group description information as "Family Members of Charles Waine," suggested group membership information including the list of user identifier information representative of first degree family members connected to "Charles Wain."

It may be appreciated that the groups management component 190-1 may receive the suggested creation group information and/or provide the suggested creation group information for visual presentation on one or more UI views as suggested groups to be created. The groups management component 190-1 may further provide the suggested creation group information to the group creation UI views for visual presentation when the user selects a suggested group for creation, so that the user may quickly create, with minimal additional input, a group having a group name, group description, group privacy type, and/or groups members as provided in the suggested creation group information.

In some embodiments, the groups management component 190-1 may further enable a user, who may or may not be a group member of a group, to share of the group with others by composing a share group message including, but is not limited to, a rendered image including at least a portion of a group discussion UI view for the group. The at least a portion of a group discussion UI view may further include, among other visual elements, group cover image information including the group image, group name information including the group name, group privacy information including whether the group is open, closed, or secret, face piles information including a plurality of focused user profile images. The share group message may include, among other visual elements, a selectable reference (e.g., a URI/URL, deep link reference, etc.) to enable the message recipient to navigate to the group discussion UI view associated with the group via a browser application 124-1-8 and/or a different instance of the mobile groups application 124-2-1. In some embodiments, the share group message may further include share group message information (e.g., customized text message, etc.) and/or share group media information (e.g., images, video, animated gifs, illustrated graphical objects, e.g., "Stickers", animated gifs, etc.)

In some embodiments, the groups management component 190-1 may be further configured to transmit the shared group message via the email application 124-1-6 as an email, messaging application 124-1-4 as a multimedia message or social message, or any other application 124-1-b for sending and/or receiving messages to one or more share message recipients. In some embodiments, one or more share message recipients may be a contact in the mobile device contact information that is not a user within the social networking system 101 e.g., a non-social networking system contact or user. Additionally, in some embodiments, the one or more share message recipients may include one or more users in the social networking system 101 but not socially connected to the user sharing the group. In other embodiments, the groups management component 190-1 may be further configured to transmit the shared group message as a group activity in specified group in the social networking system, or as a user profile activity of a user in the social networking system 101.

In some embodiments, the groups management component 190-1 may further enable a user, who may be a group member, to invite one or more users that are socially connected to the user to join as group members of the group. The groups management component 190-1 may send one or more invitation messages which may include, among other elements, a rendered image including at least a portion of a group discussion UI view for the group. The at least a portion of a group discussion UI view may further include, among other visual elements, group cover image information including the group image, group name information including the group name, group privacy information including whether the group is open, closed or secret, face piles information including a plurality of focused user profile images. The invitation message may further include a selectable reference (e.g., a URI/URL, deep link reference, etc.) to enable the invitation message recipient to navigate to the group discussion UI view associated with the group via a browser application 124-1-8 and/or a different instance of the mobile groups application 124-2-1 to join the group. In some embodiments, the invitation message may further include invitation message information (e.g., customized text message, etc.) and/or share invitation media information (e.g., images, video, animated gifs, illustrated graphical objects, e.g., "Stickers", animated gifs, etc.).

In some embodiments, the groups management component 190-1 may be further configured to transmit the invitation group message via the email application 124-1-6 as an email, messaging application 124-1-4 as a multimedia message or social message, or any other application 124-1-$b$ for sending and/or receiving messages to one or more invitation message recipients. In some embodiments, one or more invitation message recipients may be a contact in the mobile device contact information that is not a user within the social networking system 101, e.g., a non-social networking system contact or user. In those embodiments, the selectable reference may also enable the invitation message recipient to create a user account in the social networking system 101 and join the group.

In some embodiments, the groups management component 190-1 may leave one or more groups by receiving user input information in one or more UI views (e.g., group discussion UI views, etc.) to leave a group, and requesting the social networking application 108 to remove the user from the group based on the group identifier information associated with the group and the user identifier information associated with the user. The groups management component 190-1 may also join one or more groups by receiving user input information in one or more UI views (e.g., group discovery UI view, etc.) to join a group, and requesting the social networking application 108 to join (or request to join) the user group based on the group identifier information associated with the group and user identifier information associated with the user.

In some embodiments, the groups management component 190-1 may further archive one or more groups by providing the group identifier information representative of a group to be archived to the groups settings component 190-1 for archival. It may be appreciated that in embodiments where a group is archived, the user may remain as a group member in the archived group and the archived group remains searchable by the group search component 190-10.

In some embodiments, the groups management component 190-1 may also be configured to provide one or more group administrative functions, which require administrative privileges. Furthermore, the administrative functions may include but is not limited to, deleting one or more groups, modifying one or more groups, removing one or more group members, approving one or more group members, removing one or more group activities, and/or approving one or more group activities.

The groups search component 190-10 may be generally arranged to search for one or more groups based at least partially on group search query information including one or more group search queries. In some embodiments, the groups search component 190-10 may be configured to receive group search query information from the groups input component 190-4, determine the search results information including one or more search result groups based at least partially on the search query information, group name information, group tags information, and/or any other social group information associated with each group in the list of groups contained in the user groups membership information. The groups search component 190-10 may be configured to determine the search results information by matching one or more search terms in the search query information with the group name information, group tags information, and/or any other social group information. The groups search component 190-10 may be configured to provide the determined search results information including one or more search result groups based at least partially on the matches to the groups rendering component 190-2 for visual presentation by the touch sensitive display component 182.

In some embodiments, the groups search component 190-10 may be configured to provide incremental search of the one or more groups listed in the user groups membership information, by receiving one or more characters representative of a portion of a search term, determine the search results information in substantially real-time based at least partially on the one or more characters representative of the portion of the search term and the group name information, group tags information, and/or any other social group information associated with the one or more groups, and providing determined search results information including one or more search result groups in substantially real-time to the groups rendering component 190-2 for visual presentation by the touch sensitive display component 182, so that the search results may be updated in substantially real-time with each additional character input.

In some embodiments, when the search results information initially determined by the groups search component 190-10 contains no search results groups for one or more groups listed in the user groups membership information, the groups search component 190-10 may be further configured to transmit the group search query information to the social networking search component 110-4 to search for one or more groups in the social networking system 101, receive search results information including one or more search result groups determined based at least partially on the groups search query information, and provide the received search results information to the groups rendering component 190-2 for visual presentation by the touch sensitive display component 182.

In some embodiments, the search results information including two or more search result groups may be ranked or ordered based at least partially on the user profile information (e.g., user location information, etc.) and group location information associated with the one or more groups in the one or more search results, so that the two or more groups may be ranked or ordered starting with groups that may be geographically closest to the hometown location of a user or current location of a user that submitted the search query.

Additionally or alternatively, search results information including two or more search result groups may be ranked or ordered based at least partially on the user profile information (e.g., user interest information) and group events information associated with each group in the search result, so that the two or more groups in the search result may be ranked or ordered starting with groups having group events that may be of most interest to a user that submitted the search query.

In some embodiments, the groups search component 190-10 may be configured to store or cache user group search information and provide the stored or cached user group search information to the social networking application 108.

The groups discovery component 190-8 may be generally arranged to manage and/or assist users in finding one or more discovered or suggested groups. In some embodiments, the groups discovery component 190-8 may be configured to submit discovery query information to the social networking discovery component 110-5, receive discovery results information from the social networking discovery component 110-5, where the discovery result information is determined based at least partially on user profile information and/or social group information associated with each group in the social networking system 101.

Included herein are a set of UI views representative of exemplary user interfaces for performing at least a portion of the novel aspects of the disclosed architecture. The one or more UI views may be displayed or visually presented on the touch sensitive display screen 202 of the display device 168. At least some of the one or more UI views may comprise mobile device status UI elements 204-1 and 204-2 representative of status information (e.g., wireless/cellular signal strength, battery life, current time, etc.) associated with one or more components (e.g., communications component 158, etc.) of the mobile device of the mobile device 102-1. While, for purposes of simplicity of explanation, the one or more UI views shown herein, for example, may comprise one or more UI elements generally arranged as shown in each of the UI views, it may be appreciated that the existence, type, position, font, text, size, color, images, shading, gradient, and/or any other attribute of the one or more UI elements may vary for each UI view of the one or more UI views. Furthermore, not all UI views and/or UI elements illustrated herein may be needed for a novel implementation.

FIGS. 2A-2E illustrate exemplary embodiments of one or more groups UI views 200-1 200-2, and/or 200-3 for managing at least one group. The groups UI views 200-1 and/or 200-2 may be visually presented by the groups rendering component 190-2 on the touch sensitive display screen 202 based at least partially on user groups membership information associated with a user. In some embodiments, the groups UI views 200-1, 200-2, and/or 200-3 may include, among other UI elements, a selectable search UI element 280 for navigating to the groups UI search view 400 and searching for one or more groups further discussed with respect to FIGS. 4A-4B, a selectable group creation UI element 282 for creating one or more groups as previously discussed. The groups UI views 200-1, 200-2, and/or 200-3 may further include, among other UI elements, one or more navigation tab UI elements **284-*h* (e.g., navigation tab UI elements 284-1, 284-2, 284-3**, etc.) for navigating between and among the one or more UI views.

In some embodiments, the navigation tab UI elements **284-*h* may include, among other UI elements, a selectable groups view UI element 286 for navigating to the groups UI views 200-1, 200-2, and/or 200-3, a selectable group notifications view UI element 288 for navigating to the group notifications UI views 1000-1 and/or 1000-2 further discussed with respect to FIGS. 10A-10B, a selectable group discovery view UI element 290 for navigating to the group discovery UI view 1100 further discussed with respect to FIG. 11, and a groups settings view UI element for navigating to the groups settings UI views 1200-1 and/or 1200-2 further discussed with respect to FIGS. 12A-12D**.

In some embodiments, the groups UI views 200-1, 200-2, and/or 200-3 may further include, among other UI elements, a scrollable groups collection UI element 208 including one or more pages as indicated by a page indicator UI element 294. In other embodiments the scrollable groups collection UI element 208 may be a scrollable continuous single page. It may be appreciated that the scrollable groups collection UI element 208 may be scrolled between the one or more pages based at least partially on one or more scroll finger gestures detected in a predefined region (e.g., substantially in or near the scrollable groups collection UI element 208) associated with the scrollable groups collection UI element 208. Additionally or alternatively, in embodiments where the scrollable groups collection UI element 208 comprises a continuous single page, the scrollable groups collection UI element 208 may be scrolled up and/or down or left and/or right based at least partially on one or more scroll finger gestures detected in a predefined region associated with the scrollable groups collection UI element 208.

The scrollable groups collection UI element 208 may include, among other UI elements, one or more selectable and movable group UI elements **212-*k* representative of the one or more groups of which a user may be a group member. Each selectable and movable group UI element (e.g., selectable and movable group UI element 212-1) of the selectable and movable group UI elements 212-*k* may include, among other UI elements, a focused group cover UI element which may be visually presented as a circular shape, a square shape, or any other polygon shape having a predetermined size (e.g., radius of 50 pixels) and a group name in proximity with the focused group cover UI element. It may be appreciated that the of each of the selectable and movable group UI elements 212-*k* may be selected based at least partially on selection finger gestures detected in a predefined region (e.g., substantially in or near the focused group cover UI element) associated with each of the selectable and movable group UI elements 212-*k*. Furthermore once selected, the groups UI views 200-1, 200-2, and/or 200-3 may transition to the group discussion UI views 800-1, 800-2, 800-3, and/or 800-4 further discussed with respect to FIGS. 8A-8D and FIGS. 9A-9F via transition UI views 500-*n* further discussed with respect to FIGS. 5A-5H**.

In some embodiments, the focused group cover UI element of the selectable and movable group UI elements **212-*k* (e.g., selectable and movable group UI elements 212-1, 212-3, etc.) may include a focused group cover image. Additionally, in some other selectable and movable group UI elements 212-*k* (e.g., selectable and movable group UI elements 212-2), the focused group cover UI element may include a group color as previously discussed. Furthermore, in still some other selectable and movable group UI elements 212-*k*** (e.g., selectable and movable group UI elements 212-3), the focused group cover UI element may include a group color gradient as previously discussed.

Furthermore, the selectable and movable group UI elements 212-$k$ may also include, among other UI elements, notification indicator UI elements 214-$k$ to indicate the number of unread notifications associated with the groups represented by the selectable and movable group UI elements 212-$k$. Furthermore, to indicate the number of unread notifications, the group notification indicator UI elements 214-$k$ may include notification number UI elements having a circular shape, a square shape, or any other polygon shape surrounding a numerical value indicating the number of unread notifications. The notification number UI elements may be configured as any color (e.g., blue, red, green, etc.) or color gradient (e.g., blue to red gradient, etc.) to provide contrast with respect to the surrounding UI elements. Additionally, the notification number UI elements may be located in substantially in proximity to the focused group cover UI elements of the selectable and movable group UI elements 212-$k$. For example, the selectable and movable group UI element 214-4 may include notification indicator UI element 214-4 indicating that the selectable and movable group UI element 214-4 representative of a group with the group name "Company Announcements" has three unread notifications.

It may be appreciated that notification indicator UI elements 214-$k$ of selectable and movable group UI elements 212-$k$ representative of groups with zero unread notifications (e.g., no unread notifications) may not be visually presented (e.g., selectable and movable group UI elements 212-1, 212-2, and 212-3, etc.). It may also be appreciated that notification indicator UI elements 214-$k$ of selectable and movable group UI elements 212-$k$ representative of groups with more than a predetermined number of unread notifications (e.g., nine unread notifications, twenty unread notifications, etc.) may be replaced with a symbol (e.g., "*", "!", etc.) instead of the actual numerical value (e.g., selectable and movable group UI elements 212-5 and 212-14). Alternatively, the notification indicator UI elements 214-$k$ with more than a predetermined number of unread notifications may also be replaced with the maximum number followed by a symbol (e.g., "9+", "20+", etc.) instead of the actual numerical value.

It may be further appreciated that in some embodiments, the group notification indicator UI elements 214-$k$ may optionally further include a circular shape, a square shape, or any other polygon shape substantially surrounding or enclosing the focused group cover UI element and may be configured as any color (e.g., blue, red, green, etc.) or color gradient (e.g., blue to red gradient, etc.) to further provide contrast with respect to the surrounding UI elements and indicate unread notifications associated with a group.

In some embodiments, the selectable and movable group UI elements 212-$k$ may be arranged as a grid of a predetermined size (e.g., a three rows and three columns grid, or four rows and four columns grid, etc.). The grid having the predetermined size may further comprise a single page of the one or more pages in the scrollable groups collection UI element 208. In embodiments, where the scrollable groups collection UI element 208 is a continuous scrollable single page, the grid may have a predetermined maximum number of columns (e.g., four columns maximum, etc.) and a predetermined number of rows based on the number of selectable and movable group UI elements 212-$k$.

In some embodiments, the grid may be ordered starting with the selectable and movable group UI element 212-1 located at the first position of the grid in the first row and first column, followed by the selectable and movable group UI element 212-2 located at the second position of the grid in the first row and second column, the selectable and movable group UI element 212-3 located at the third position of the grid in the first row and third column, the selectable and movable group UI element 212-4 located at the fourth position of the grid in the second row and first column, and so forth.

In some embodiments, the grid may be also ordered starting with the selectable and movable group UI element 212-1 located at the first position of the grid in the first row and first column, followed by the selectable and movable group UI element 212-2 located at the second position of the grid in the second row and first column, the selectable and movable group UI element 212-3 located at the third position of the grid in the third row and first column, the selectable and movable group UI element 212-4 located at the fourth position of the grid in the first row and second column, and so forth.

It may be appreciated that the selectable and movable group UI elements 212-$k$ may be ranked or ordered based at least partially on the group order information associated with one or more groups the user is a group member of as previous discussed, and visually presented as selectable and movable group UI elements 212-$k$.

In some embodiments and as previously discussed, the groups UI views 200-1, 200-2, and/or 200-3 may further include a page indicator UI element 294 to indicate the current page and the total number of pages of the scrollable groups collection UI element 208. In some embodiments, the page indicator UI element 294 may include, among other UI elements, a row of shaded circles with the position of each circle corresponding to a page of the scrollable groups collection UI element 208. Additionally, a darker shaded circle compared to the remaining row of circles may represent a current page of the scrollable groups collection UI element 208, and a total number of shaded circles may represent a total number of pages of the scrollable groups collection UI element 208. Thus, the page indicator UI element 294 of FIG. 2A having a darker shaded circle as the first circle in the row of circles may indicate that the first page of the scrollable groups collection UI element 208 is currently being visually presented while the page indicator UI element 294 of FIG. 2B may indicate that the second page of the scrollable groups collection UI element 208 is currently visually presented. It may be appreciated that in instances when the total number of pages of the scrollable group collection UI element 208 exceeds a predefined number of pages (e.g., ten pages) the page indicator UI element 294 may not be visually presented in the groups UI views 200-1, 200-2, and/or 200-3.

Figures 2E, 3A:
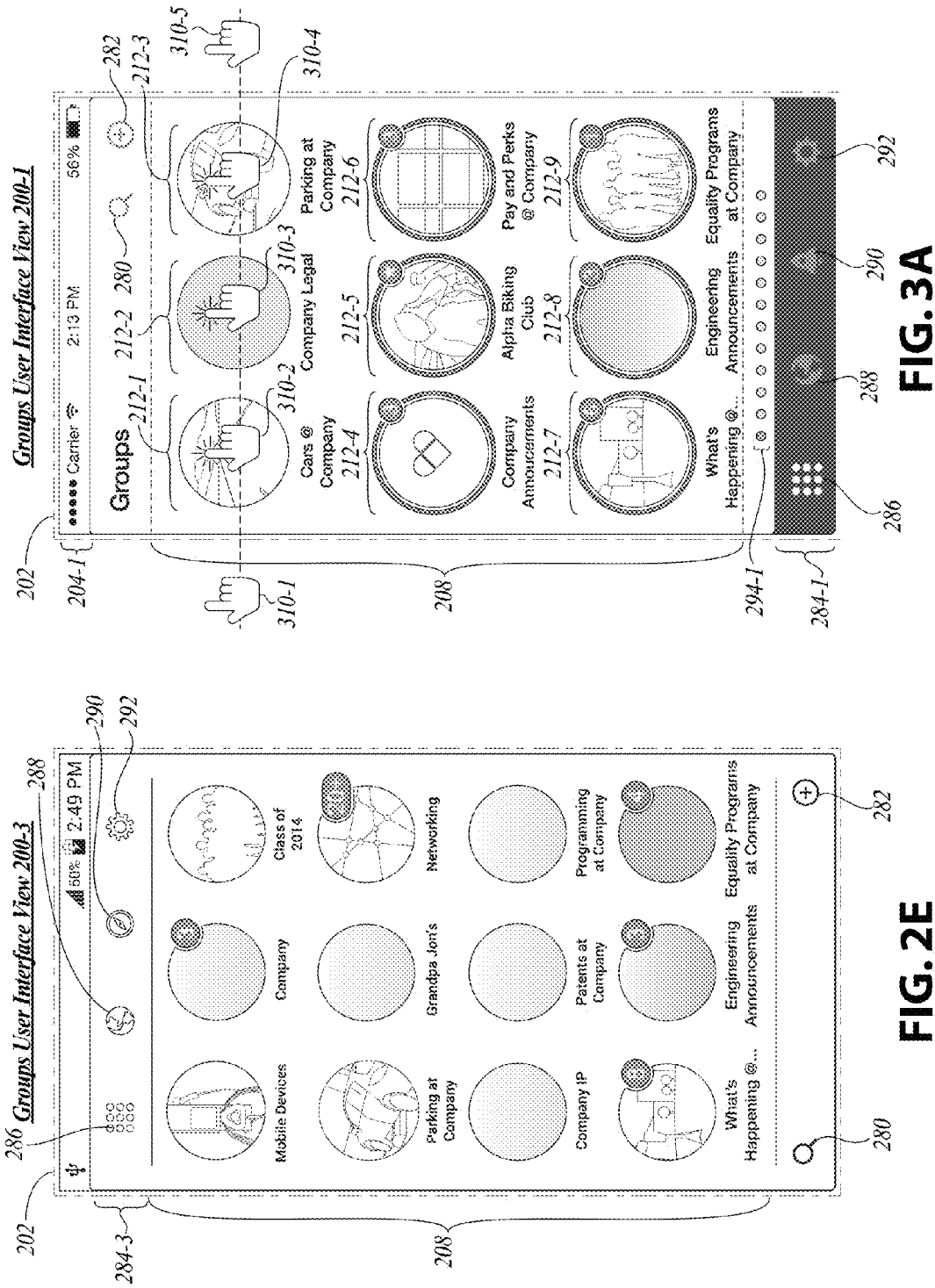
Figure 3B:
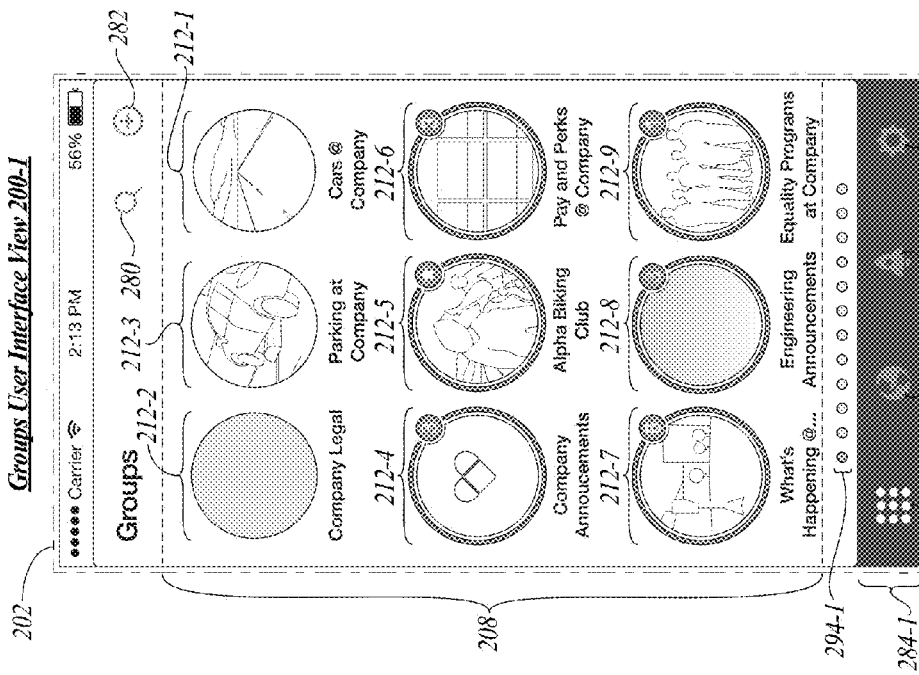

FIGS. 3A-3B illustrate an exemplary embodiment of manually reordering a group in the groups UI view 200-1. Manually reordering of one or more selectable and movable group UI elements 212-$k$ representative of one or more groups and consequently, the reordering of the one or more groups may be determined based at least partially on movement finger gestures detected in a predefined region (e.g., substantially in or near the focused group cover UI elements of the selectable and movable group UI elements 212-$k$) associated with each of the selectable and movable group UI elements 212-$k$.

As illustrated in FIG. 3A, in some embodiments, a user may move the selectable and movable group UI element 212-1 representative of the group having a group name of "Cars @ Company" from first position of the grid at the first row and first column to a third position of the grid at the first row and third column on the first page of the scrollable groups collection UI element 208 by performing a sequence of steps 310-1 to 310-5. It may be appreciated that the sequence of steps may be representative of some or all sequences to move the selectable and movable group UI elements 212-k.

In some embodiments, the sequence of steps to move the selectable and movable group UI element 212-1 may begin at step 310-1, where the user maintains no finger contact with the touch sensitive display screen 202. The user then makes finger contact in a predefined region associated with the selectable and movable group UI element 212-1 (e.g., substantially in or near the focused group cover UI element of the selectable and movable group UI elements 212-1) for a predefined time period (e.g., two seconds, three seconds, etc.) at step 310-2. The user then moves towards the third position of the grid at the first row and third column while maintaining finger contact at step 310-3. The user then moves to the third position of the grid at the first row and third column while maintaining finger contact at step 310-3. The user then terminates the finger contact on the touch sensitive display screen 202 at step 310-5. Based on the finger contacts, movement of the finger contacts, and the termination of the finger contacts in steps 310-1 to 310-5, the touch sensitive display component 182 may generate and provide touch input information for each step in the sequence of steps 310-1 to 310-5, and the groups input component 190-4 may detect the movement finger gesture based on the touch input information.

As illustrated in FIG. 3B, in some embodiments, once the selectable and movable group UI element 212-1 has been moved from first position of the grid at the first row and first column to a third position of the grid at the first row and third column on the first page of the scrollable groups collection UI element 208, the selectable and movable group UI elements 212-2, may be reordered to the first position of the grid at the first row and first column, and the selectable and movable group UI elements 212-3 may be reordered to the first position of the grid at the first row and second column and the groups represented by the selectable and movable group UI elements 212-2 and 212-3 may also be appropriately reordered. As previously discussed, once a selectable and movable group UI element has been manually ordered (e.g., the selectable and movable group UI element 212-1), the order of that selectable and movable group UI element becomes static or immutable, e.g., fixed in the new portion. However, it may be appreciated that in some embodiments, any selectable and movable group UI element that has not been manually reordered (e.g., selectable and movable group UI element 212-2, 212-3, 212-4, 212-5, 212-6, 212-7, 212-8, 212-9) may be dynamically reordered.

Figure 4A:
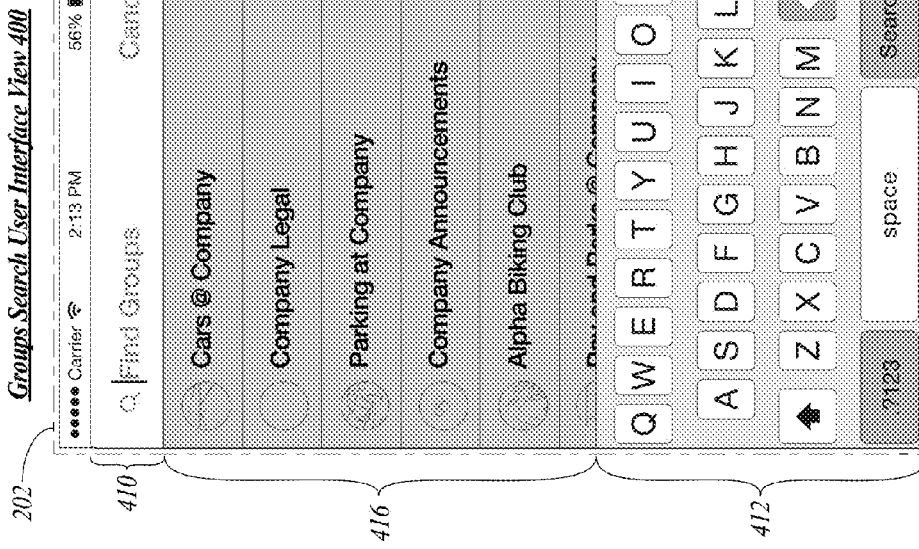

FIGS. 4A-4B illustrate an exemplary embodiment of a groups search UI view 400 for searching at least one group. The group search UI view 400 may include, among other UI elements a search query input UI element 410 to enable a user to input search query information including one or more search queries, which may further include, one or more search terms via on-screen keyboard UI element 412 including an on-screen keyboard. The groups search UI view 400 may further include a scrollable search results UI element 416 including, among other UI elements, one or more selectable search result UI elements 414-o for visually presenting search results information including one or more search results. Each selectable search result UI element of the one or more selectable search result UI elements 414-o may include, among other UI elements, a focused group cover UI element including a focused group cover image and a group name in proximity with the focused group cover UI element. It may be appreciated that the focused group cover UI element may be visually presented as a circular shape, a square shape, or any other polygon shape having a predetermined size (e.g., a radius of 25 pixels).

In some embodiments and as previously discussed, the group search UI view 400 may include, among other UI elements, one or more selectable search result UI elements 414-o which may be representative of one or more groups the user is a member of contained in the user groups membership information, before any search query is received. Additionally, selectable search result UI elements 414-o may be ranked or ordered based on group order information as similarly discussed with respect to groups UI views 200-1, 200-2, and/or 200-3 illustrated in FIGS. 2A-2E and FIGS. 3A-3B.

In some embodiments as illustrated in groups search UI view 400 of FIG. 4B, once the search query (e.g., search query "Cars", etc.) is received in the search query input UI element 410 and search results information is determined and/or received, the search results information represented by one or more selectable search result UI elements 414-o for one or more groups the user is a member of (e.g., selectable search result UI element 414-1) or otherwise added to the groups collection UI element 208 may be visually presented in a first section (e.g., "Your Groups" section, etc.) while search results information represented by one or more selectable search result UI elements 414-o the user is not a member of (e.g., selectable search result UI element 414-6, 414-7, 414-8) may be visually presented in a second section (e.g., "search results" section, etc.).

In some embodiments, the focused group cover UI element of some of the selectable search result UI elements 414-o (e.g., selectable search result UI element 414-1, 414-3, 414-4, 414-5, etc.) may include a focused group cover image. Additionally, in other selectable search result UI elements 414-o (e.g., selectable search result UI element 414-2, etc.), the focused group cover UI element may include a group color as previously discussed. Furthermore, in still some other selectable and movable group UI elements 212-k (not shown), the focused group cover UI element may include a group color gradient as previously discussed.

In some embodiments and as previously discussed, search results UI element 416 may be updated in real-time, in response to each character input in the search query input UI element 410, in order to provide incremental search of one or more groups the user is a group member of.

FIGS. 5A-5H illustrates an exemplary embodiment of transition UI views 500-q starting from first animated sequence to an eighth animated sequence of transitioning from the groups UI views 200-1, 200-2, and/or 200-3 to group discussion UI views 800-1, 800-2, 800-3, and/or 800-4. It may be appreciated that selection hand, reference numbers, dashed lines, callouts, and lead lines are for illustration purposes only and form no part of the transition UI views 500-q illustrated in FIGS. 5A-5H. It may also be appreciated that while eight animated sequences are illustrated in FIGS. 5A-5H, the actual number of animated sequences may vary by implementation and are not limited in this context. It may be further appreciated that in some embodiments, the group discussion UI views 800-1, 800-2, 800-3, and/or 800-4 may be scrollable (e.g., scrollable group discussion UI views 800-1, 800-2, 800-3, and/or 800-4) to enable a user to scroll through the group discussion UI views 800-1, 800-2, 800-3, and/or 800-4.

As illustrated in FIGS. 5A-H and as previously discussed, in some embodiments, a user may select the selectable and movable group UI elements 212-k (e.g., selectable and movable group UI element 212-5) to transition from groups UI views 200-1, 200-2, and/or 200-3 to group discussion UI views 800-1, 800-2, 800-3, and/or 800-4 by performing a sequence of steps 510-1, 510-2, and 510-3. It may be appreciated that the sequence of steps may be representative of some or all sequences to transition from groups UI views 200-1, 200-2, and/or 200-3 to group discussion UI views 800-1, 800-2, 800-3, and/or 800-4.

The sequence of steps to select the selectable and movable group UI element 212-5 and initiate the transition may begin in FIG. 5A at step 510-1, where the user initially makes no finger contact with the touch sensitive display screen 202. The user then makes finger contact in a predefined region associated with the selectable and movable group UI element 212-5 (e.g., substantially in or near the focused group cover UI element of the selectable and movable group UI element 212-5) representative of the group having the group name of "Alpha Biking Club" for a predefined time period (e.g., less than one second) at step 510-2. The user then terminates the finger contact on the touch sensitive display screen 202 at step 510-3. Based on the finger contacts and the termination of the finger contacts in steps 510-1 to 510-3, the touch sensitive display component 182 may generate and provide touch input information for each step in the sequence of steps 310-1 to 310-5, and the groups input component 190-4 may detect the selection finger gesture based on the touch input information.

It may be appreciated that before, during, and after detecting the selection finger gesture to select the selectable and movable group UI element 212-5, the groups rendering component 190-2 may be configured to visually present the transition UI views 500-1 to 500-8 in sequence beginning with transition UI view 500-1 and ending with transition UI views 500-8. Furthermore, the transition UI view 500-1 illustrated in FIG. 5A may be representative of the first animated sequence of transitioning to the group discussion UI view 800-1 for the group having the group name "Alpha Biking Club." Transition UI view 500-2 illustrated in FIG. 5B may be representative of the second animated sequence of transitioning to the group discussion UI view 800-1, where the selectable and movable group UI element 212-5 may expand and may visually present at least a portion of the group discussion UI view 800-1.

Transition UI views 500-3 to 500-7 illustrated in FIGS. 5C to 5G, respectively, may be representative of the third, fourth, fifth, sixth, and seventh animated sequences, respectively, of transitioning to the group discussion UI view 800-1, where the selectable and movable group UI element 212-5 including at least a portion of the group discussion UI view 800-1 may continue to expand in size to fill the entire touch sensitive display screen 212 and may visually present at least a portion of the group discussion UI view 800-1.

Figures 5D, 5E:
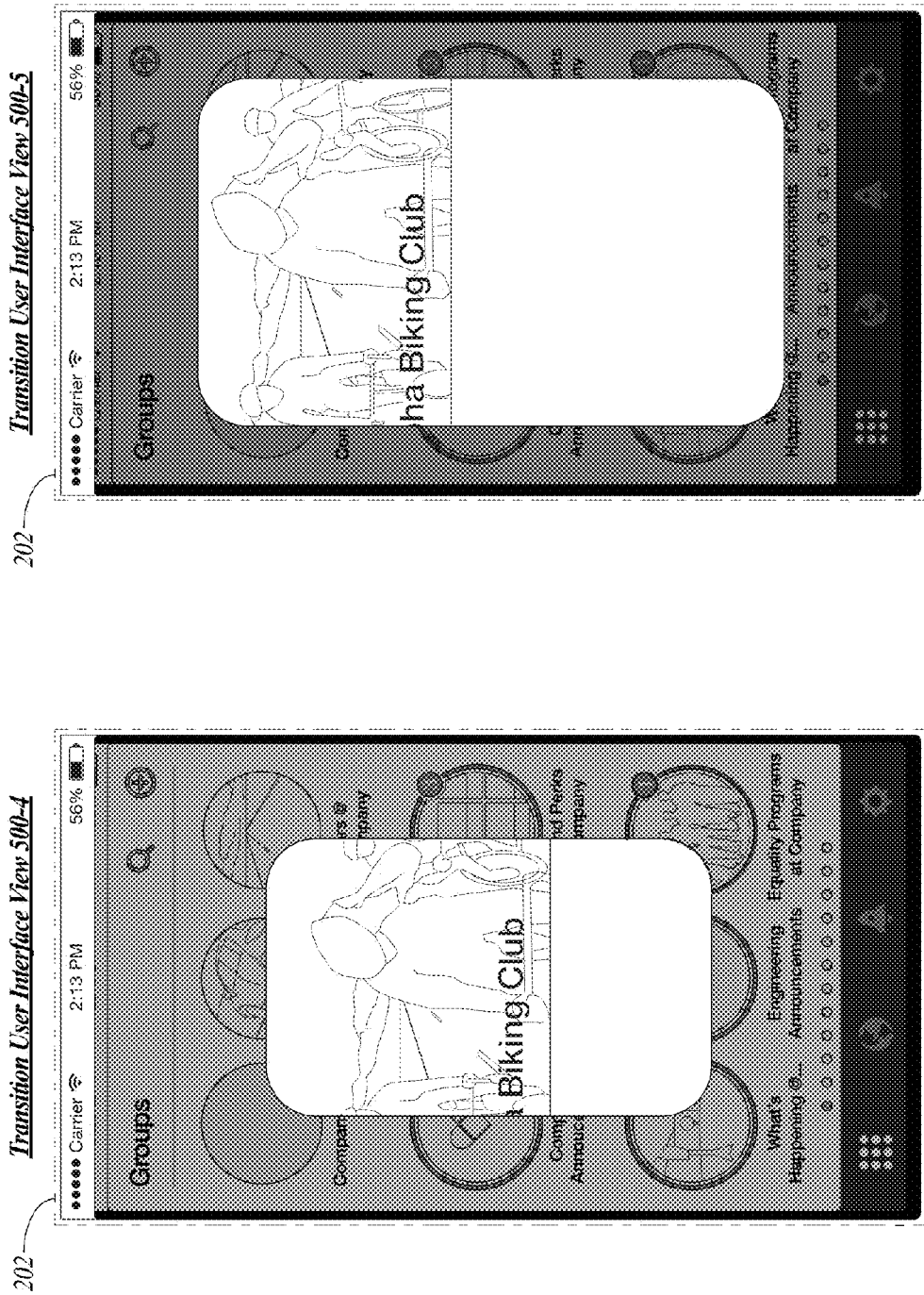

Transition UI view 500-8 illustrated in FIG. 5H may be representative of the eighth animated sequence of transitioning to the group discussion UI view 800-1, where the group discussion UI view 800-1 is entirely visually presented. It may be appreciated that in some embodiments, when a deep link reference is used to navigate to the group discussion UI view 800-1, 800-2, and/or 800-3, the animated sequence illustrated in FIG. 5A-5H may not be visually presented. At least one technical advantage that may be realized is that the Transition UI views 500-1 to 500-8, may provide the user with a visual presentation of entering into a group having the group name "Alpha Biking Club" and viewing the group discussion UI view 800-1 after the user selects the selectable and movable group UI elements 212-5.

FIGS. 6A-6H illustrate an exemplary embodiment of transition UI views 600-r starting from first animated sequence to an eighth animated sequence of transitioning from the group discussion UI views 800-1, 800-2, 800-3, and/or 800-4 to the groups UI views 200-1, 200-2, and/or 200-3. It may be appreciated that selection hand, reference numbers, dashed lines, callouts, and lead lines are for illustration purposes only and form no part of the transition UI views 600-r illustrated in FIGS. 6A-6H. It may also be appreciated that while eight animated sequences are illustrated in FIGS. 6A-6H, the actual number of animated sequences may vary by implementation and are not limited in this context. It may be further appreciated that in some embodiments, the group discussion UI views 800-1, 800-2, 800-3, and/or 800-4 may be scrollable group discussion UI views 800-1, 800-2, 800-3, and/or 800-4.

As illustrated in FIGS. 6A-6H, in some embodiments, a user may transition from scrollable group discussion UI views 800-1, 800-2, 800-3, and/or 800-4 to the groups UI views 200-1, 200-2, and/or 200-3 by performing a sequence of steps 610-1, 610-2, 610-3, 610-4, 610-5, 610-6, and 610-7. It may be appreciated that the sequence of steps may be representative of some or all sequences to transition from scrollable group discussion UI views 800-1, 800-2, 800-3, and/or 800-4 to groups UI views 200-1 and/or 200-2.

The sequence of steps to transition from group discussion UI view 800-1 for group having the group name of "Alpha Biking Club" and represented by selectable and movable group UI element 212-5 may begin in FIG. 6A at step 610-1, where the user initially makes no finger contact with the touch sensitive display screen 202. The user may then make a finger contact substantially in or near the predefined region 612 of the group discussion UI view 800-1 at step 610-2, which may correspond to group cover UI element 810 further discussed with respect to FIGS. 8A-8D.

Figures 6B, 6C:
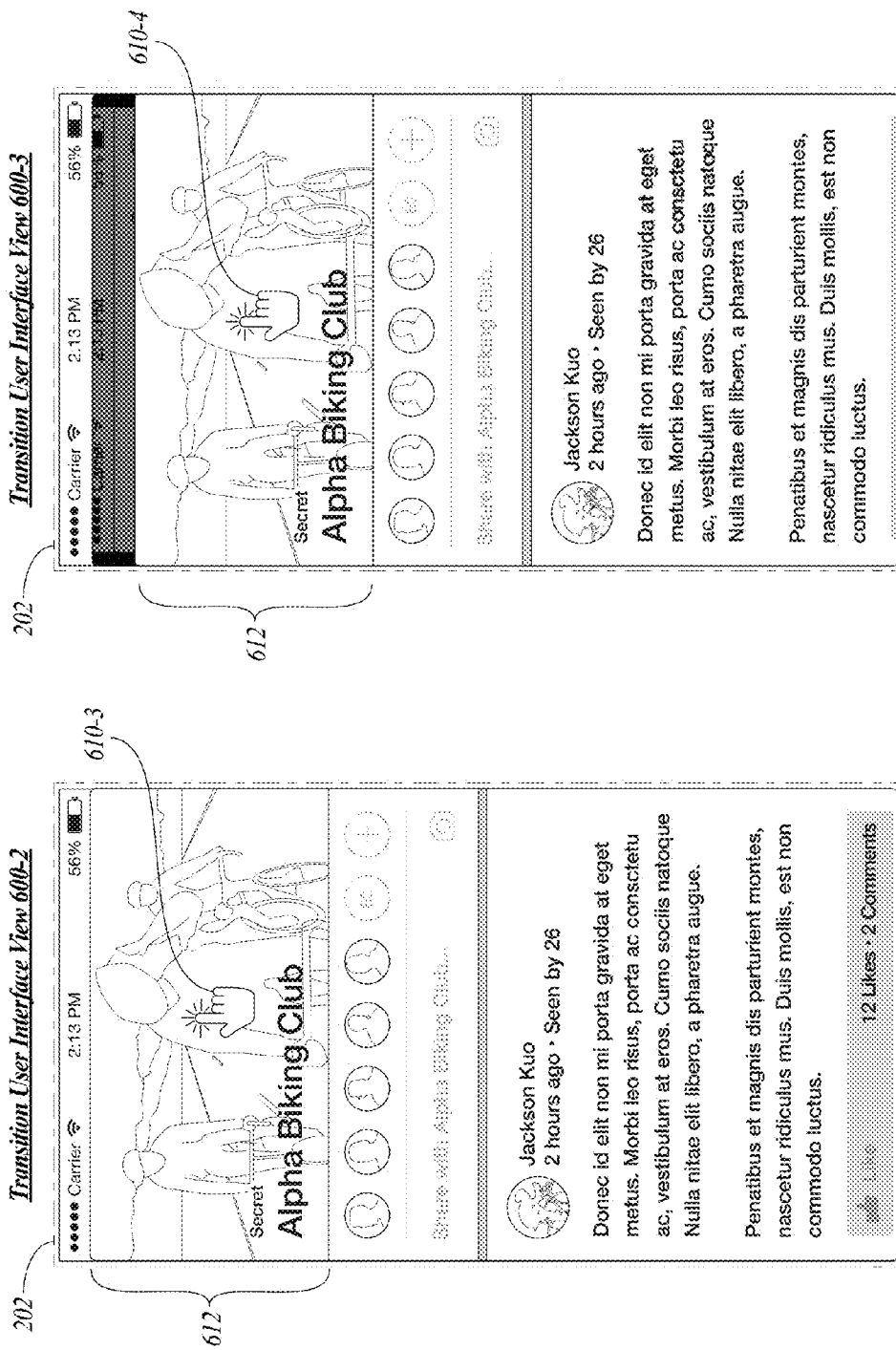
Figures 6F, 6G:
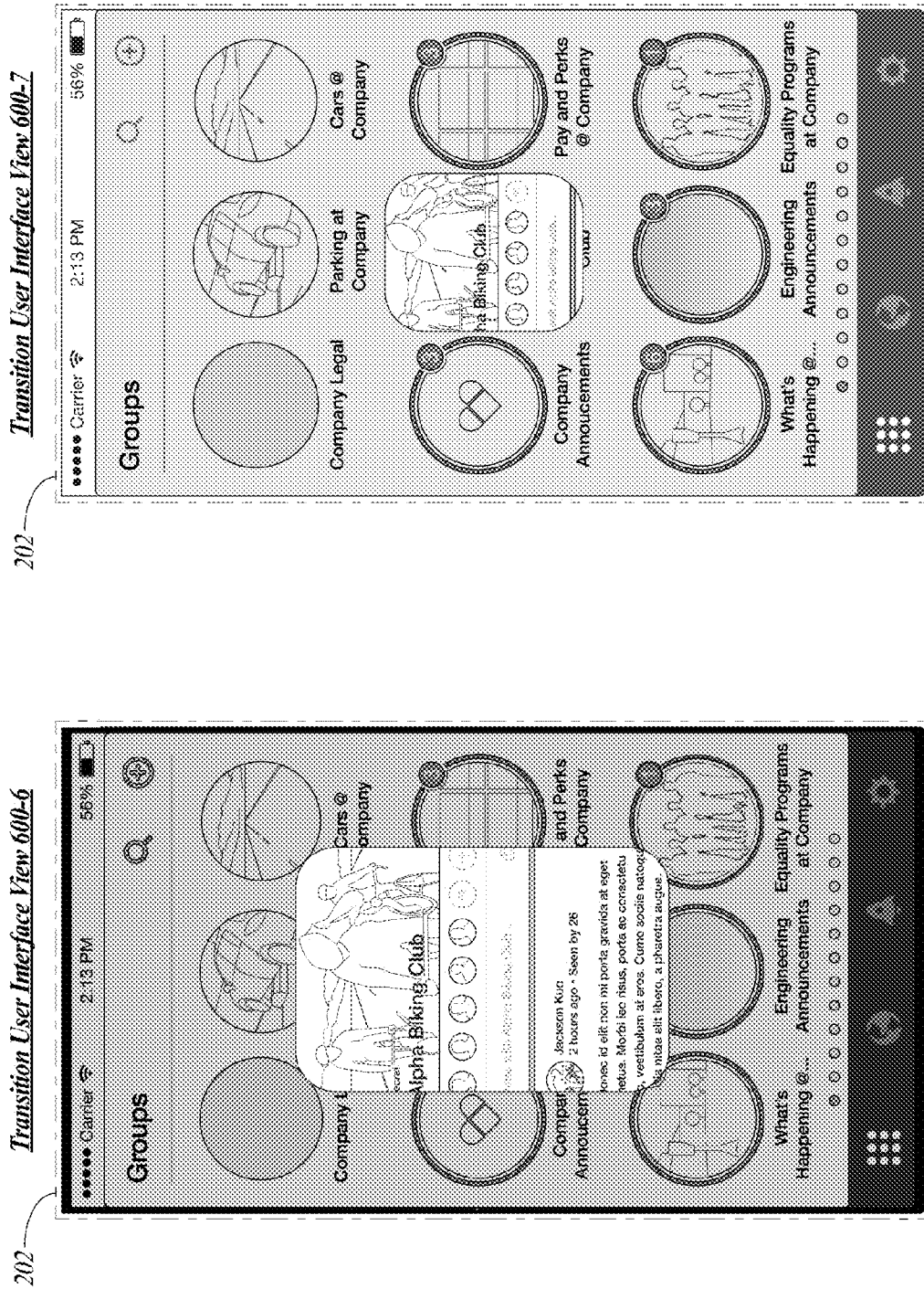

The user may then move the finger contact in a downward direction towards the bottom of the touch sensitive display screen 202 in FIGS. 6B-6D at steps 610-3, 610-4, 610-5. The user may then terminate the finger contact on the touch sensitive display screen 202 in FIG. 6E at step 610-7. Based on the finger contacts, the movement of the finger contacts, and the termination of the finger contacts in steps 610-1 to 610-7, the touch sensitive display component 182 may generate and provide touch input information for each step in the sequence of steps 610-1 to 610-7, and the groups input component 190-4 may detect the transition finger gesture based on the touch input information.

It may be appreciated that before, during, and after the detection of the transition finger gesture to transition to the groups UI view 200-1, the groups rendering component 190-2 may visually present the transition UI views 600-1 to 600-8 in sequence beginning with transition UI view 600-1 and ending with transition UI view 600-8. Furthermore, the transition UI view 600-1 illustrated in FIG. 6A may be representative of the first animated sequence of transitioning to the groups UI view 200-1 for the group having the group name "Alpha Biking Club." Transition UI view 600-2 illustrated in FIG. 6B may be representative of the second animated sequence of transitioning to the groups UI view 200-1, where the group discussion UI view 800-1 may shift downwards, in response to the movement of the finger gesture at step 610-3 in the downward direction, where at least a portion of the mobile device status UI element 204-1 may begin to be visually presented during the transition UI view 600-2.

Transition UI views 600-3 to 600-4 illustrated in FIGS. 6C to 6D, respectively, may be representative of the third, fourth, animated sequences, respectively, of transitioning to the groups UI view 200-1. Furthermore, in the transition UI views 600-3 to 600-4, the group discussion UI view 800-1 may continue to shift in a downward direction and begin to shrink in size in response to the continued movement of the finger gesture at steps 610-4 and 610-5 in the downward direction, where at least a portion of the groups UI view 200-1 is visually presented behind the group discussion UI view 800-1.

Transition UI views 600-5 to 600-7 illustrated in FIGS. 6E to 5G, respectively, may be representative of the fifth, sixth, and seventh animated sequences, respectively, of transitioning to the groups UI view 200-1. Furthermore, in the transition UI views 600-5 to 600-7 where the group discussion UI view 800-1 may continue to shrink in size. It may be appreciated that in some implementations, the animated sequence, may continue regardless of whether the finger contact at step 610-6 continues to be maintained until transition UI view 600-8 illustrated in FIG. 6H or is terminated at step 610-7.

Transition UI view 500-8 illustrated in FIG. 5H may be representative of the eighth animated sequence of transitioning to the group discussion UI view 800-1, where the group discussion UI view 800-1 is entirely visually presented. At least one technical advantage that may be realized is that the Transition UI views 600-1 to 600-8, may provide the user with a visual presentation of leaving the group discussion UI view 800-1 having the group name "Alpha Biking Club" and returning to the groups UI view 200-1, after the user performs the sequence of steps 610-1 to 610-7.

FIGS. 7A-7I illustrate exemplary embodiments of group creation UI views 700-*s* for creating a new group and inputting group creation configuration information. It may be appreciated that the group creation UI views 700-*s* illustrated in FIGS. 7A-7I may be representative of some or all of the group creation UI views 700-*s* and additional group creation UI views 700-*s* may exist for inputting other social group information (e.g., group location information) depending on a particular implementation. It may be appreciated that the groups UI views 200-1, 200-2, and/or 200-3, group discussion UI views 800-1, 800-2, 800-3, and/or 800-4, group creation UI views 700-*s* illustrated in FIGS. 7A-7I may also not be navigationally interconnected or ordered as discussed and may vary depending on the particular implementation.

Figure 7A:
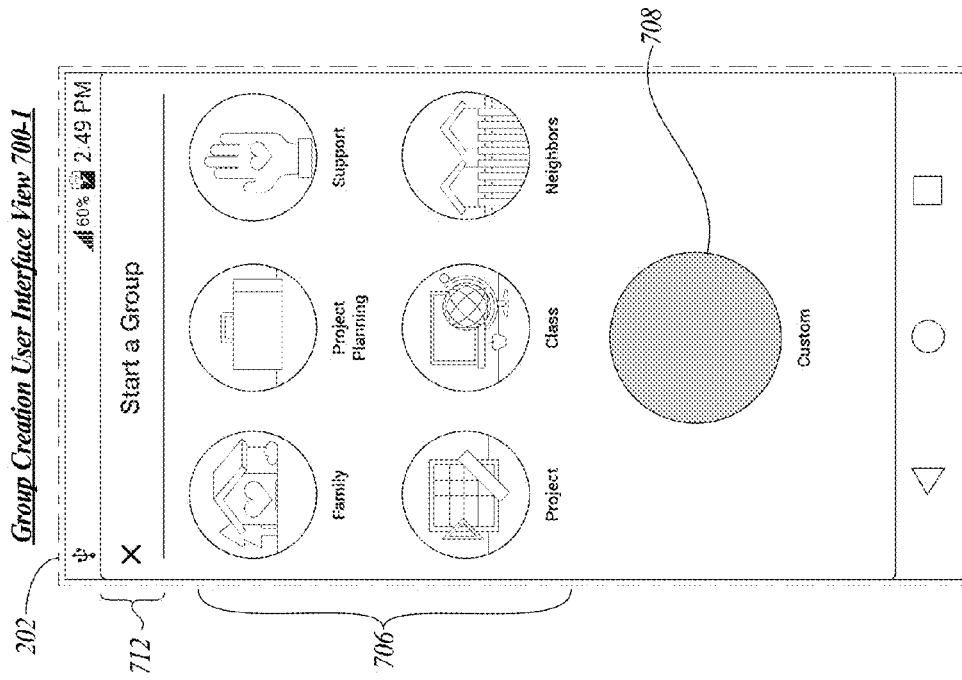
Figure 6H:
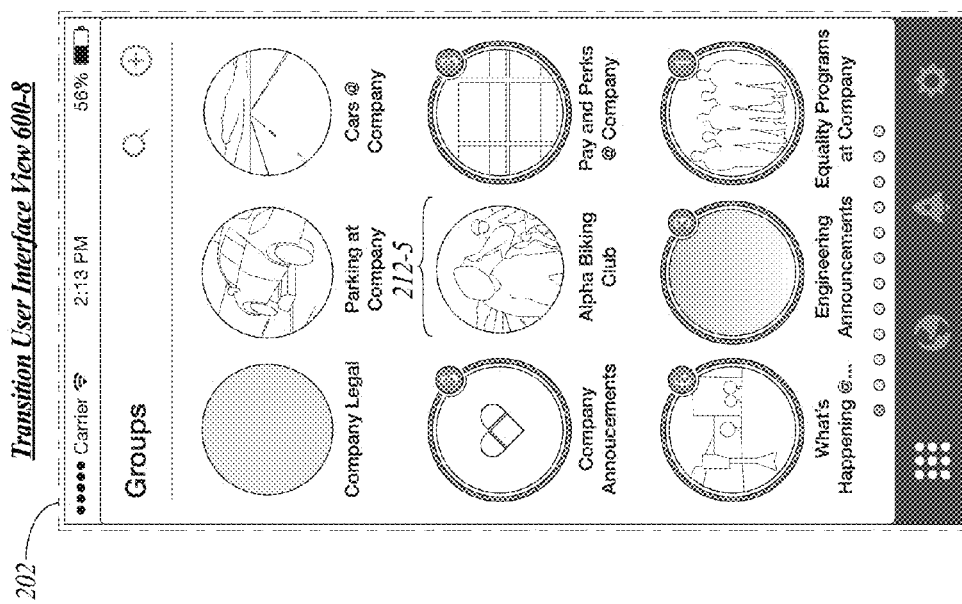

As illustrated in FIG. 7A, the group creation UI view 700-1 for creating or starting a group may include, among other UI elements, a navigation bar UI element 712 for navigating between and among one or more UI views (e.g., navigating back to groups UI views 200-1, 200-2, and/or 200-3, etc.). The group creation UI view 700-1 for creating or starting a group may further include, among other UI elements, one or more selectable suggested group UI elements 706 representative of one or more suggested groups (e.g., "Family," "Project Planning," "Support," "Project," "Class," "Neighbors," etc.), where each suggested group may be associated with suggested creation group information, so that user may quickly create, with minimal additional input, a group having a group name, group description, group privacy type, and/or groups members as provided in the suggested creation group information. Additionally, the group creation UI view 700-1 may further include, among other UI elements, a selectable custom group purpose UI element 708. The selection of any of the one or more selectable default group purpose UI elements 706 and/or selectable custom group purpose UI element 708, may navigate to the group creation UI view 700-2 illustrated in FIG. 7B.

Figures 7B, 7C:
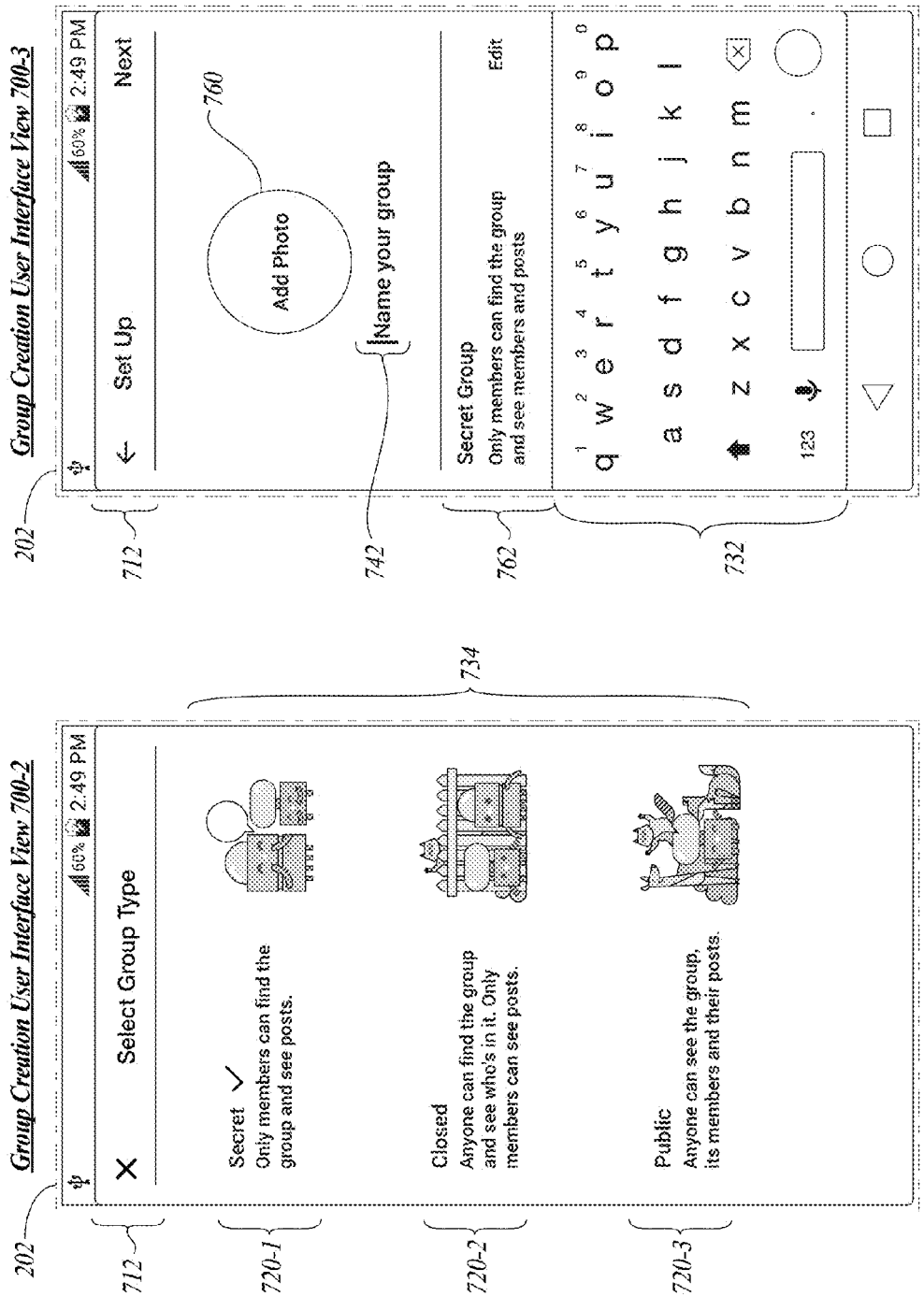

As illustrated in FIG. 7B, the group creation UI view 700-2 for selecting group type for the new group may include, among other UI elements, a navigation bar UI element 712 for navigating between and among the group creation UI views 700-*s* (e.g., navigating back to group creation UI view 700-1) group discussion UI views 800-1, 800-2, 800-3, and/or 800-4. The group creation UI view 700-1 may further include a create group type UI element 734. The create group type UI element may further include, among other UI elements, a selectable group type UI element 720-1 for selecting the secret group type, a selectable group type UI element 720-2 for selecting closed group type, and a selectable group type UI element 720-3 for selecting the open group type. The selection of any of the one or more a selectable group type UI element, may navigate to the group creation UI view 700-3 illustrated in FIG. 7C.

As illustrated in FIG. 7C, the group creation UI view 700-3 for naming and selecting a group cover image for the new group may include, among other UI elements, a navigation bar UI element 712 for navigating between and among the group creation UI views 700-*s* (e.g., navigating back to group creation UI view 700-2, navigating forward to group creation UI view 700-9, etc.). The group creation UI view 700-3 may further include, among other UI elements, the create group name input UI element 742 to input a group name information for the new group via on-screen keyboard UI element 732 including an on-screen keyboard. The group creation UI view 700-3 may also include, among other UI elements, the add group cover image UI element 760 for navigating to group UI view 700-4 as illustrated in FIG. 7D. The group creation UI view 700-3 may further include, among other UI elements, selectable selected group type UI element 762 for indicating the currently selected group type and enable a user to modify the group type utilizing for example, group creation UI view 700-2 as illustrated in FIG. 7B.

As illustrated in FIG. 7D, the group creation UI view 700-4 for selecting a group cover image for the new group may include, among other UI elements, a navigation bar UI element 712 for navigating between and among the group creation UI views 700-*s* (e.g., navigating back to group creation UI view 700-3, etc.). The group creation UI view 700-4 may further include, among other UI elements, the selectable group cover photo input UI element 730 to enable a user to provide at least a portion of the group cover image information, such as, for example, enable user to input one or more search terms via on-screen keyboard UI element 732 to search a resource (e.g., internet, etc.) for a group cover image for the new group. To enable user to search for an image, the selection of the selectable group cover photo input UI element 730 may navigate to the group creation UI view 700-5 as illustrated in FIG. 7E. The group creation UI view 700-4 may further include, among other elements, selectable image gallery UI element 750 to enable a user to select an image associated with the imaging application 124-1-3 on mobile device 102-1 as the group cover image for the new group and/or to select an image associated with social networking system 101 as the group cover image. Additionally, the group creation UI view 700-4 may also include, among other elements, selectable capture image UI element 752 to enable a user to capture a new image utilizing the image capture component 154 of the mobile device 102-1 and use the captured new image as the group cover image. Selection of the selectable capture image UI element 752 and/or selectable image gallery UI element 750 (after an image has been selected) may navigate to the group creation UI view 700-6 as illustrated in FIG. 7F.

As illustrated in FIG. 7E, the group creation UI view 700-5 for searching for a group cover image for the new group may include, among other UI elements, a navigation bar UI element 712 for navigating between and among the group creation UI views 700-s (e.g., navigating back to group creation UI view 700-4, etc.). The group creation UI view 700-5 may further include, among other UI elements, image search result UI element 768 comprising one or more selectable image search result UI elements representative of one or more images determined based at least partially on search query inputted by a user in the search query input UI element 766 for inputting one or more search results. To update or view more search results, the group creation UI view 700-5 may further include, among other UI elements, selectable load more results UI element 764 to visually present one or more selectable image search result UI elements in the image search result element 768. The group creation UI view 700-5 may also include, among other UI elements, selectable capture image UI element 752 and selectable image gallery UI element 750. The selection of any selectable image search result UI elements may navigate to group creation UI view 700-6 as illustrated in FIG. 7F.

As illustrated in FIG. 7F, the group creation UI view 700-6 for creating a focused group cover image by cropping a selected group cover image for the new group may include, among other UI elements, selected group cover image UI element 782 to visually present the selected group cover image. The group creation UI view 700-5 may also include, among other elements, a selectable and movable image focus UI element 770 to enable a user to select a geometric region (e.g., circular region, square region, rectangular etc.) of the selected group cover image for use as a focused group cover image for the new group. It may be appreciated that while not illustrated, the region defined by the selectable and movable image focus UI element 770 may also be expanded or contracted in size by using one or more gestures (e.g., pinch gesture (not shown)). To enable a user to select the geometric region as a focused group cover image, the group creation UI view 700-6 may also include, among other UI elements, selectable accept region UI element 772 to enable a user to select the geometric region as a focused group cover image, and navigate to the group creation UI view 700-7 as illustrated in FIG. 7G. Additionally, the group creation UI view 700-6 may also include, among other UI elements, reject region UI element 774 to enable a user to navigate back to the previous UI view such as, for example, back to the group creation UI view 700-5 to select a new group cover image.

As illustrated in FIG. 7G, the group creation UI view 700-7 may be an updated UI view of the group creation UI view 700-3 after a group cover image has been selected. Moreover, the add group cover image UI element 760 for navigating to group UI view 700-7 as illustrated in FIG. 7G, may be substantially updated to visually present the focused group cover image of the selected group cover image. Additionally, the group creation UI view 700-7 may also include, among other UI elements, navigation bar UI element 712 to enable a user to navigate between and among the group creation UI views 700-s (e.g., navigate to the group creation UI view 700-8, navigate back to the group creation UI view 700-2, etc.).

Figures 7H, 7I:
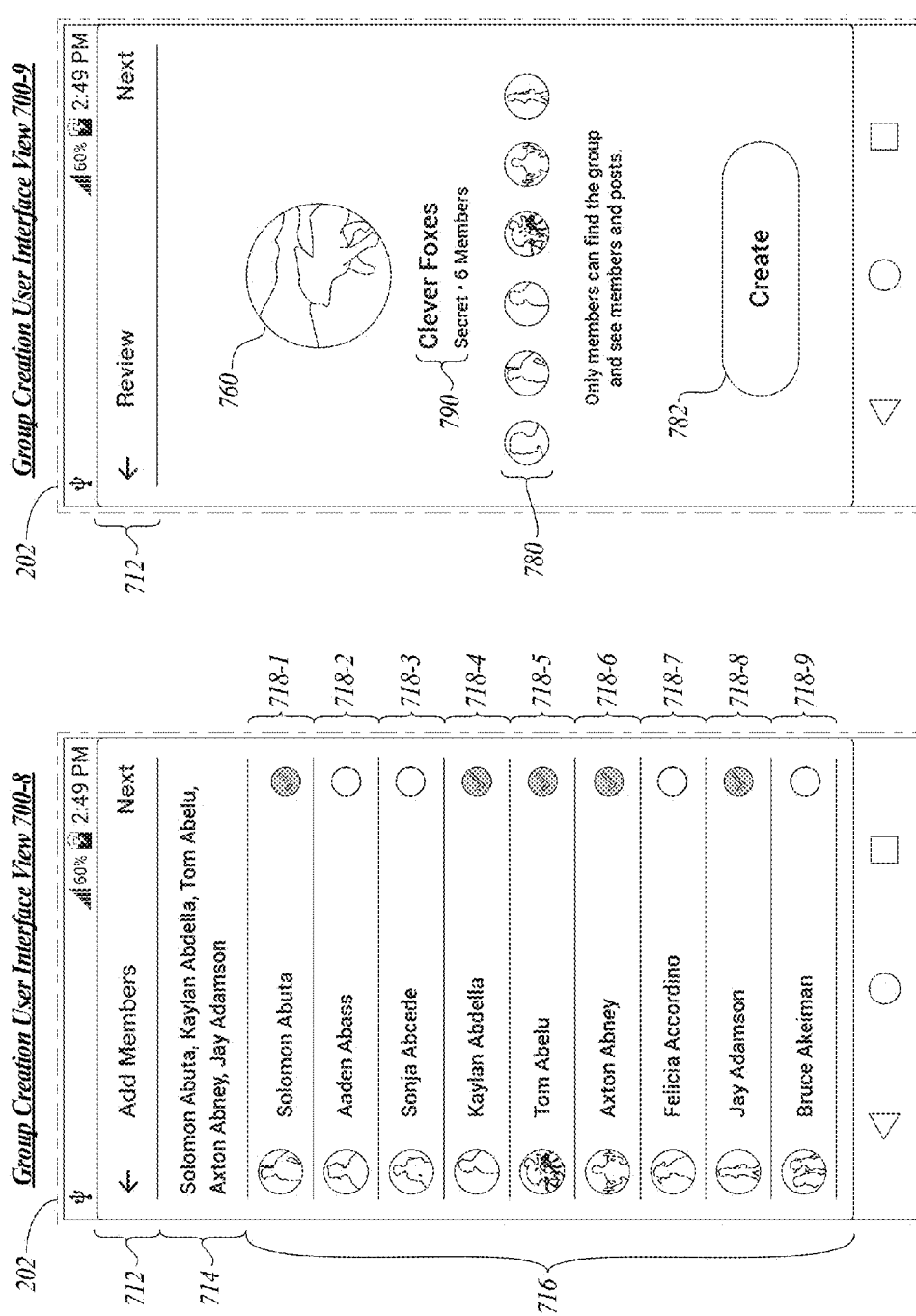

As illustrated in FIG. 7H, the group creation UI view 700-8 for adding group members to the new group, may include, among other UI elements, a navigation bar UI element 712 for navigating between and among the group creation UI views 700-s (e.g., navigate to the group creation UI view 700-9, navigate back to the group creation UI view 700-7, etc.). The group creation UI view 700-2 may also include a scrollable contacts collection UI element 716 for inputting group membership information. Furthermore, the scrollable contacts collection UI element 716 may include, among other UI elements, one or more selectable contact UI elements 718-t representative of user social connection information including, but is not limited to, a list of one or more friends, family members, etc., of the user. Additionally or alternatively, the one or more selectable contact UI elements 718-t may also be representative of mobile device contact information including one or more individual contact information associated with contacts application 124-4.

Each selectable contact UI element (e.g., selectable contact UI element 718-1) may include, among other UI elements, a selection UI element for visually indicating (e.g., a checkmark surrounded by a circle in any color or gradient) that the associated contact UI element is currently selected and consequently, the contact, friend, family member, etc., will be added to the new group. Each contact UI element may also include, among other UI elements, a focused user profile UI element including, a focused user profile image, or a default image if the focused user profile image is not available. The user profile UI element may be visually presented as a circular shape, a square shape, or any other polygon shape having a predetermined size (e.g., radius of 25 pixels). Each contact UI element may further include, among other UI elements, a group name in proximity with the focused group cover UI element. It may be appreciated the one or more selectable contact UI elements 718-t contained in the scrollable contacts collection UI element 716 may also be sorted alphabetically based at least partially on the last name of the contact, friend, family member, etc.

The group creation UI view 700-8 may further include, among other UI elements, a selected group members UI element 714 to visually present the names of one or more contacts, friends, family members, etc. represented by the one or more selectable contact UI elements 718-t that have been selected to be added as group members in the new group.

The group creation UI view 700-8 may optionally include, among other UI elements, a selectable index UI element (not shown) to enable users to quickly index or scroll through the scrollable contacts collection UI element 716 based at least partially on the last name of the contact, friend, family member, etc. For example, by selecting the "B" character in the selectable index UI element, the scrollable contacts collection UI element 716 may scroll to selectable contact UI elements 718-t representative of contacts, friends, family members, etc., having the last name that starts with the character "B". The example is not limited in this context.

As illustrated in FIG. 7I, the group creation UI view 700-9 for searching for a group cover image for the new group may include, among other UI elements, a navigation bar UI element 712 for navigating between and among the group creation UI views 700-s (e.g., navigating back to one or more previous group creation UI views 700-s for review or navigate to create the new group, etc.). The group creation UI view 700-9, may also include, among other UI elements, new group information UI element 790 which may visually present, among other information, a focused group cover image of the selected group cover image, the title of the group, the group type, the number of members or any other group creation configuration information. Additionally, the group creation UI view 700-9 may further include, among other UI elements, a new group member face piles UI element 780 comprising one or more focused user profile UI elements, where each focused user profile UI element includes a focused user profile image for a new group member of the new group. To enable the user to create the new group, the group creation UI view 700-9 may further include a selectable create group UI element 782 to enable a user to create the new group.

It may be appreciated that while a limited set of group creation UI views 700-s have been illustrated and/or discussed, other group creation UI views 700-s may also be utilities to provide additional group creation configuration information, such as, for example, a group creation UI view for inputting a group description information for the new group via on-screen keyboard UI element including an on-screen keyboard.

FIGS. 8A-8D exemplary embodiments of group discussion UI views 800-1, 800-2, 800-3, and/or 800-4, and/or 800-4 for one or more groups. The group discussion UI views 800-1, 800-2, 800-3, and/or 800-4, and/or 800-4 which may be scrollable group discussion UI views 800-1, 800-2, 800-3, and/or 800-4, and/or 800-4 illustrated in FIGS. 8A-8D may be visually presented by the groups rendering component 190-2 on the touch sensitive display screen 202 based at least partially on social group information and group discussion information associated with each group and/or user profile information associated with users that are group members of each group.

In some embodiments, the group discussion UI views 800-1, 800-2, 800-3, and/or 800-4 may include, among other UI elements, a group cover UI element 810 for visually presenting the group cover image information (e.g., the group cover image) for the group, a group type UI element 816 for visually presenting the group type information (e.g., secret group type, open group type, or closed group type), a group name UI element 818 for visually presenting the group name information, a group membership count UI element 814 for visually presenting the group membership count information, a selectable group options UI element 838 for enabling the user to perform one or more group management functions, group administrative functions and/or navigate to the group options UI views 1400-1 further illustrated in FIGS. 14A-14D, a selectable group creation UI element 808 for creating one or more groups as previously discussed by navigating to the group creation UI views 700-s, a group activity image input UI element 822 for selecting an image associated with the imaging application 124-1-3 on mobile device 102-1 to post to the group discussion UI views 800-1, 800-2, 800-3, and/or 800-4.

In some embodiments, the scrollable group discussion UI views 800-1, 800-2, 800-3, and/or 800-4 may further include, among other UI elements, a group activity input UI element 820 for inputting at least a portion of the group activity information (e.g., a group post, a group poll, etc.). Furthermore, the group activity input UI element 820 may enable a user to publish, create, or post a new group activity via an on-screen keyboard UI element including an on-screen keyboard (not shown) and post the group activity by selecting the selectable activity post UI element 834. Additionally or alternatively, the scrollable group discussion UI views 800-1, 800-2, 800-3, and/or 800-4 may further include, among other UI elements, a group activity image input UI element 822 for selecting an image associated with the imaging application 124-1-3 on the mobile device 102-1 to post to the group discussion UI views 800-1, 800-2, 800-3, and/or 800-4 and/or group options UI views 1400-1 and/or 1400-2. The scrollable group discussion UI views 800-1, 800-2, 800-3, and/or 800-4 may further include, among other UI elements, a selectable pinned activity UI element 840 to enable a user to select the pinned activity UI element 840 and view pinned activities (e.g., posts, polls, etc.) in the group.

In some embodiments, the scrollable group discussion UI views 800-1, 800-2, 800-3, and/or 800-4 may further include, among other UI elements, a selectable group activity input select UI element 850 for visually presenting a group activity input UI element such as, for example, the group activity input UI element 820 to input at least a portion of the group activity information, when the select group activity input select UI element 850 is selected.

In some embodiments, the scrollable group discussion UI views 800-1, 800-2, 800-3, and/or 800-4 may further include, among other UI elements, a group face piles UI element 812 representative of the face piles information. The group face piles UI element 812 may include, among other UI elements, a row of predetermined number (e.g., five, six, seven, etc.) of focused user profile UI elements. Each of the focused user profile UI elements may be visually presented as a circular shape, a square shape, or any other polygon shape having a predetermined size (e.g., a radius of 25 pixels). Each of the focused user profile UI element may also include a focused user profile image of one or more users that are group members listed and/or ordered in the face piles information.

In some embodiments, the scrollable group discussion UI views 800-1, 800-2, 800-3, and/or 800-4 may further include, among other UI elements, a selectable group close UI element 804. Moreover, in some embodiments, the groups rendering component 192-2 may visually present the transition UI views 600-r to transition back to the groups UI views 200-1, 200-2, and/or 200-3, when the selectable group close UI element 804 is selected.

In some embodiments, the scrollable group discussion UI views 800-1, 800-2, 800-3, and/or 800-4 may further include, among other UI elements, one or more group activity UI elements 824-u, visually presented in an order based at least partially on the group activity creation time information associated with the one or more group activity UI elements 824-u. In some embodiments, the group activity UI elements 824-u may include, among other UI elements, a group activity information UI element 826 for visually presenting at least a portion of the user profile information and/or group activity information, a group activity message UI element 828 for visually presenting the group activity message information, a group activity media UI element 836 for visually presenting a group activity media information (e.g., a group activity image, video, illustrated graphical objects, animated images, etc.), a selectable group activity options UI element 842 for performing management functions (e.g., pinning, sharing, deleting, modifying, hiding, etc. the group activity represented by the selectable group activity options UI element) associated with the particular group activity, a selectable group activity approval UI element 832 for indicating approval of the particular group activity, and a group activity approvals and comments UI element 846 for visually presenting the group activity approval information (e.g., number of "likes", a list of users that "likes" the group activity, etc.) and group activity comment information (e.g., number of comments, etc.).

In some embodiments, the group activity information UI element 826 may include, among other elements, a focused user profile UI element associated with the user that posted the group activity. The focused user profile UI element may be visually presented as a circular shape, a square shape, or any other polygon shape having a predetermined size (e.g., a radius of 25 pixels). The group activity information UI element 826 may further include, among other UI elements, a user name information associated with a user, which may be a group member or former group member, that posted the group activity, the group activity creation time information (e.g., the time or approximate time when the group activity was posted or created), group activity creation location information (e.g., the location of the user when the group activity was posted or created), group activity visibility information (e.g., the number of group members who viewed the group activity).

It may be appreciated that the scrollable group discussion UI views 800-1, 800-2, 800-3, and/or 800-4 illustrated in FIGS. 8A-8D, may be representative of the top most portion of scrollable group discussion UI views 800-1, 800-2, 800-3, and/or 800-4. To view additional group activities, a user of mobile group's application 124-1-1 may scroll the scrollable group discussion UI views 800-1, 800-2, 800-3, and/or 800-4 by making finger contact with the touch sensitive display screen 202 in an upward direction. The groups rendering component 190-2 may visually present additional portions of the scrollable group discussion UI views 800-1, 800-2, 800-3, and/or 800-4, which may include additional group activity UI elements 824-$u$ representative of the additional group activities, in response to the groups input component 190-4 detecting a scroll finger gesture in the upward direction.

Figures 9A, 9B:
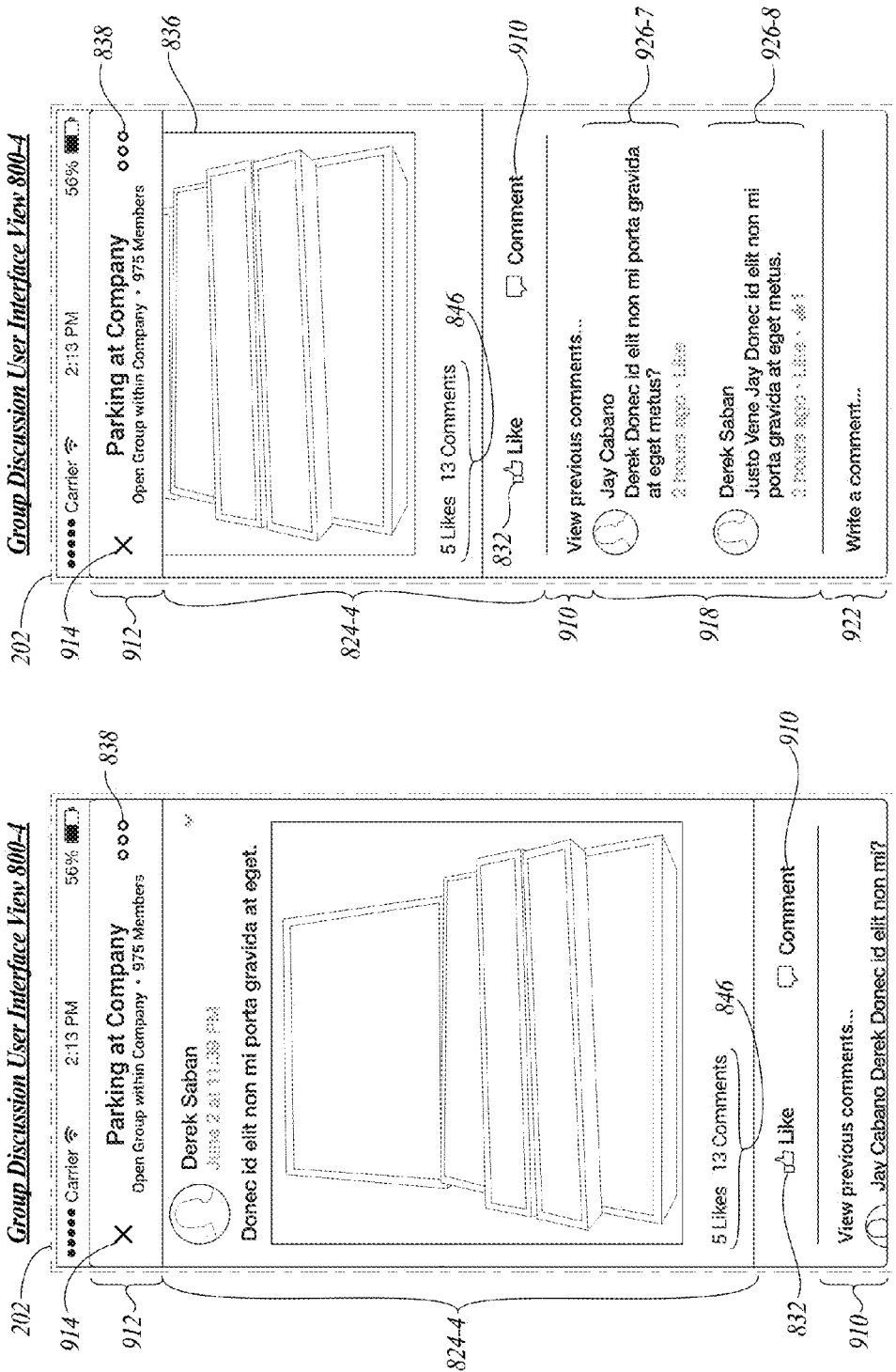

FIGS. 9A-9D illustrates a continuation of exemplary embodiments of a group discussion UI view 800-4 of FIG. 8D for a group. The group discussion UI view 800-4 as illustrated in FIGS. 9A-9B, may include, among other UI elements, a selectable group information banner UI element 912 which may display the current group name (e.g., "Parking @ Company"), group type (e.g., "open group within Company"), and number of group members (e.g., "975 Members"), after the group cover UI element 810 at the top most portion is no longer visually presented. In some embodiments, the groups rendering component 192-2 may further visually present the top most portion of the group discussion UI view 800-4 as illustrated in FIG. 8D, when the selectable group information banner UI element 912 is selected.

In some embodiments, the selectable group information banner UI element 912 may also include, among other UI elements, a selectable close UI element 914. In some embodiments, the groups rendering component 192-2 may hide the selectable group information banner UI element 912 from visually presentation, when the selectable close UI element 914 is selected. In other embodiments, the groups rendering component 192-2 may visually present the transition UI views 600-$r$ to transition back to the groups UI views 200-1, 200-2, and/or 200-3, when the selectable close UI element 914 is selected. Additionally, the group information banner UI element 912 may further include, among other UI elements, a selectable group options UI element 838 for enabling the user to perform one or more group management functions, group administrative functions and/or navigate to the group options UI views 1400-1 further illustrated in FIGS. 14A-14D.

The group discussion UI view 800-4 as illustrated in FIG. 9B, may further include, among other UI elements, a teaser comments UI element 918 associated with the group activity UI element 824-4. The teaser comments UI element 918 may include among other UI elements, a predefined or limited number (e.g., two, three, four, etc.) of visible comment UI elements 926-$v$ representative of comment information for comments associated with a group activity.

In some embodiments, each comment UI element (e.g., comment UI element 926-8) may include, among other UI elements, a focused user profile UI element that includes a focused user profile image associated with the user identified by the comment source identifier information (e.g., the user that posted or created the comment). The focused user profile UI element may be visually presented as a circular shape, a square shape, or any other polygon shape having a predetermined size (e.g., a radius of 25 pixels). The comment UI element may further include, among other UI elements, a comment source name information (e.g., name of the user that posted the group activity comment), comment creation time information (e.g., the time or approximate time when the group activity was posted or created), comment approval information (e.g., the number of users liking the comment), and a selectable comment approval UI element for expressing approval of the comment (e.g., selectable "Like" text).

In some embodiments, the teaser comments UI element 918 may include one or more visible comment UI elements 926-$v$ representative of the latest predefined number comments associated with the group activity based at least partially on comment creation time information associated with each comment (e.g., two of the latest comments). Additionally, the one or more comment UI elements 926-$v$ (e.g., comment UI elements 926-7 and 926-8) representative of the latest predefined number comments associated with the group activity may be ordered in reverse chronological order or chronological order.

The group discussion UI view 800-4 as illustrated in FIG. 9B, may further include, among other UI elements, a selectable comment expansion UI element 910 for expanding the predefined number of comment UI elements 926-$v$ associated with the teaser comment UI element 918. In some embodiments, the groups rendering component 190-2 may increase or expand the predefined number of visible comment UI elements 926-$v$ to a new predefined number (e.g., eight comments) of comment UI element based at least partially on a predefined increment (e.g., six comment increment).

The group discussion UI view 800-4 as illustrated in FIGS. 9C-9D, may further include, among other UI elements, an expanded comment UI element 916-1 which may include, among other UI elements, the new predefined number (e.g., eight comments) of comment UI elements 926-$v$ (e.g., comment UI elements 926-1, 926-2, 926-3, 926-4, 926-5, 926-6, 926-7). It may be appreciated that the groups rendering component 192 may visually present the expanded comment UI element 916-1 to substantially replace or expand the teaser comment UI element 918 in the same scrollable group discussion UI view 800-2 without transitioning to any new UI view in order to provide in-place expansion of the comment teaser comment UI element 918 and/or the expanded comment UI element 916-1. It may be further appreciated that when the new predefined number (e.g., eight comments) of comment UI elements 926-$v$ is sufficient to display all the comments associated with a group activity, then the groups rendering component 192-2 may hide the selectable comment expansion UI element 910 from visual presentation. Conversely, when the new predefined number (e.g., eight comments) of comment UI elements 926-$v$ is insufficient to display all the comments associated with a group activity, then the groups rendering component 192-2 may continue to visually present the comment expansion UI element 918, where the selection of the comment expansion UI element 918 may further increase the predefined number of comment UI elements 926-v based at least partially on the predefined increment, so that additional comment UI elements 926-v associated with the group activity UI element 824-4 may be visually presented.

In some embodiments, the group discussion UI view 800-4 as illustrated in FIG. 9D, may further include, among other elements, a comment input UI element 922 for inputting a comment via an on-screen keyboard UI element 950 including an on-screen keyboard and a selectable activity post UI element 920 to post the comment. It may be appreciated that the groups rendering component 192-2 may visually present the comment input UI element 922 and the on-screen keyboard UI element 950 in the same scrollable group discussion UI view 800-2 without transitioning to any new UI views to in order to provide in-place comment to a user of the mobile groups application 124-1-1.

In some embodiments, the group discussion UI view 800-4 as illustrated in FIG. 9A-9E, may further include, among other elements, a selectable input comment UI element 940 for visually presenting or navigating in the scrollable group discussion UI views 800-1, 800-2, 800-3, and/or 800-4 to the comment input UI element 922 and enable a user to input comment via an on-screen keyboard UI element 950 including an on-screen keyboard.

In some embodiments, the group discussion UI view 800-4 as illustrated in FIG. 9D, may further include, among other elements, a comment banner UI element 930 comprising at least a comment cancel UI element 904 to cancel or stop from commenting and hide the on-screen keyboard UI element 950 including the on-screen keyboard from being visually presented on the touch sensitive display screen 202. FIGS. 9E-9F illustrate another continuation of exemplary embodiments of a group discussion UI view 800-3 for a group. As illustrated in FIGS. 9E-9F, in some embodiments, the groups rendering component 190-2 may hide the one or more comment UI elements 926-v associated with group activity UI element, such as, for example, group activity UI element 824-3 by visually presenting substantially the group activity UI elements 824-u without teaser comments UI element 916 or visible comment UI elements 926-v. In those embodiments, a user may select the selectable input comment UI element 940 to expand comments in the same group discussion UI view 800-3 similar to those illustrated and discussed in FIGS. 9C-9D (e.g., in-place expansion of comments) and visually presenting or navigating in the scrollable group discussion UI views 800-1, 800-2, 800-3, and/or 800-4 to the comment input UI element 922.

In other embodiments, as illustrated in group discussion UI view 800-3 of FIG. 9F, the one or more comments associated with the group activity represented by group activity UI element 824-3 may be visually presented in a comment UI view. Furthermore, the groups rendering component 190-2 may navigate to and visually present the comment UI view, in response to a user selecting the selectable comment expansion UI element 910 as illustrated in FIG. 9F.

In some embodiments, the comment UI view, as illustrated by group discussion UI view 800-3 of FIG. 9F, may include, among other UI elements, expanded comment UI element 916-2. The expanded comment UI element 916-2 may further include, among other UI elements, one or more comment UI elements 926-v (e.g., comment UI elements 926-9, 926-10, 926-11, 926-12, etc.). The comment UI view may further comprise a group activity approvals UI element 948 to visually present the group activity approval information, and a navigation UI element 952 to navigate back to the group discussion UI view 800-3.

In some embodiments, the comment input UI element 922, may further include, among other UI elements, a comment image input UI element 822 for selecting an image associated with the imaging application 124-1-3 on mobile device 102-1 to post to the comments associated with the group activity represented by group activity UI element 824-3.

FIGS. 10A-10B illustrate an exemplary embodiment of group notifications UI views 1000-1 and/or 1000-2 for viewing at least one notification. The group notifications UI views 1000-1 and/or 1000-2, which may be scrollable group notifications UI views 1000-1 and 1000-2, may be visually presented by the groups rendering component 190-2 on the touch sensitive display screen 202 based at least partially on user notification information. The group notifications UI views 1000-1 and/or 1000-2 as illustrated in FIGS. 10A-10B, may include a scrollable notifications collection UI element 1008 to visually present one or more selectable notification UI elements 1010-w representative of one or more user group notifications.

Each of the one or more selectable notification UI elements 1010-w may include, among other UI elements, a focused user profile UI element including a focused user profile image or a default image, representative of the user who is a group member of a group that created the notification or caused the notification to be created via one or more group activities. It may be appreciated that the focused user profile UI element may be visually presented as a circular shape, a square shape, or any other polygon shape having a predetermined size (e.g., radius of 25 pixels).

Each of the one or more selectable notification UI elements 1010-w may further include, among other UI elements, notification text UI element indicating the user(s) or group member(s) that created or caused the creation of the notification, the type of activity (e.g., posts, shared a document, posted an event, etc.), a group name identifying which group the activity occurred in, and the elapsed time since the creation of the notification or the time (e.g., "3 minutes ago," "1 hour ago," etc.)

Each of the one or more selectable notification UI elements 1010-w may further include, among other UI elements, an unread notification UI element which may be visually presented as a circular shape, a square shape, or any other polygon shape having a predetermined size (e.g., radius of 5 pixels) in a contrasting color to indicate that the user group notification has not yet been viewed. It may be appreciated that a user may select the selectable notification UI elements 1010-w (e.g., selectable notification UI elements 1010-1) to view that particular group activity (e.g., group activity UI element 824-4 representative of a post by Derek Saban) associated with the user group notification in a group discussion UI view (e.g., group discussion view 800-2 of FIG. 9A). It may be further appreciated that once user has viewed the group activity, an unread notification UI element which may no longer be visually presented.

It may still be further be appreciated that in some embodiments, such as, for example, groups notifications UI view 1000-1 and/or 1000-2, the selectable group notifications view UI element 288 may also visually present a total unviewed notification UI element comprising an integer value (e.g., "1", "2," "3", etc.) to indicate the total number of unread or unviewed notifications for all groups the user of the mobile groups application 124-1-1 is a group member of based at least partially on user notification information for one or more groups the user is a group member of. Additionally, once group activity for all groups has been viewed, the total unviewed notification UI element comprising the integer value indicating the total number of unread or unviewed notifications may no longer be visually presented.

FIG. 11 illustrates an exemplary embodiment of a groups discovery UI view 1100 for discovering at least one group to join. The groups discovery UI view 1100 illustrated in FIG. 11 may be visually presented by the groups rendering component 190-2 on the touch sensitive display screen 202 based at least partially on discovery results information. The groups discovery UI view 1100 as illustrated in FIG. 11 may include, among other UI elements, a scrollable discovery results UI element 1120, which may include, among other UI elements, selectable discovery result UI elements 1124-$x$ for visually presenting one or more discovery results and a selectable search UI element 1114 for searching the one or more discovery results. Additionally or alternatively, the selectable search UI element 1114 may also enable a user to search for one or more groups by navigating to the group search UI view 400 of FIG. 4A, when the selectable search UI element 1114 is selected.

Each selectable discovery result UI element 1124-$x$ may include, among other UI elements, a focused group cover UI element, which may include a focused group cover image, representative of a group in one or more discovery results. It may be appreciated the focused group cover UI element and/or the focused group cover image may be visually presented as a circular shape, a square shape, or any other polygon shape having a predetermined size (e.g., radius of 50 pixels).

Each selectable discovery result UI element may further include, among other UI elements, a selectable join group UI element 1112 to join the group represented by the selectable discovery result UI element, a selectable not interested group UI element 1130 to remove the group from being visually presented and/or modify the discovered or suggested groups received from social networking system 101 based at least partially on the social group information for the group (e.g., the group with group name "Aenean Tortor Grads") represented by selectable discovery result UI element (e.g., selectable discovery result UI element 1124-1), a group face piles UI element 1110 similar to the group face piles UI element 812 previously discussed with respect to FIGS. 8A-8D, a group configuration information UI element 1122 indicating the total number of group members in the group represented by the selectable discovery result UI element and the group type of the group represented by the selectable discovery result UI element.

Each selectable discovery result UI element may further include, among other UI elements, group name, group description, and/or any other graphical and/or textual information (e.g., text indicating whether your friends has also joined the group) with a group in one or more discovery results.

FIGS. 12A-12D illustrates exemplary embodiments of groups settings UI views 1200-1 and/or 1200-2 for modifying settings associated with at least one group. The groups settings UI views 1200-1 and/or 1200-2 illustrated in FIGS. 12A-12D, which may be configured as scrollable settings UI views 1200-1 and/or 1200-2, may be visually presented by the groups rendering component 190-2 on the touch sensitive display screen 202 based at least partially user mobile groups application preferences information, user groups membership information, and/or user profile information.

The groups settings UI views 1200-1 and/or 1200-2 illustrated in FIGS. 12A-12D may include, among other UI elements, a user group information UI element 1210. The user group information UI element 1210 may include, among other UI elements, a focused user profile UI element that includes a focused user profile image associated with the authenticated user of the mobile groups application 124-1-1. The focused user profile UI element may be visually presented as a circular shape, a square shape, or any other polygon shape having a predetermined size (e.g., a radius of 100 pixels). The user group information UI element 1210 may further include, among other UI elements, user name, a number of groups the user is a member of, a number of groups the user is an administrator of, or any other user groups membership information and/or user profile information.

The groups settings UI views 1200-1 and/or 1200-2 illustrated in FIGS. 12A-12D may further include, among other UI elements, a selectable auditory setting UI element 1220 for globally enabling or disabling auditory cues for the entire mobile device application 124-1-1, a selectable push notification setting UI element 1218 for globally enabling or disabling push notification services for the entire mobile device application 124-1-1, and optionally, a selectable haptic feedback setting UI element (not shown) for globally enabling or disabling haptic feedback for the entire mobile device application 124-1-1.

The groups settings UI views 1200-1 and/or 1200-2 illustrated in FIGS. 12A-12D may further include among other UI elements, a scrollable group settings collection UI element 1208, which may include, among other UI elements, selectable group setting UI elements 1214-$y$. Each selectable group setting UI element may include, among other UI elements, a focused group cover UI element, which may include a focused group cover image, cover color, and/or color gradient, representative of a group. It may be appreciated the focused group cover UI element and/or the focused group cover image may be visually presented as a circular shape, a square shape, or any other polygon shape having a predetermined size (e.g., radius of 25 pixels). Each selectable group setting UI element may also include the current group preference information to indicate whether user group notifications for a specific group represented by the selectable group setting UI element includes all activities in specific group, friends' activities in the specific group, or no activities in the specific group. A user may further select a selectable group setting UI element representative of a particular group to modify the current group preference information for the particular group as further discussed with respect to groups notifications UI view 1300

Figures 12D, 13A:
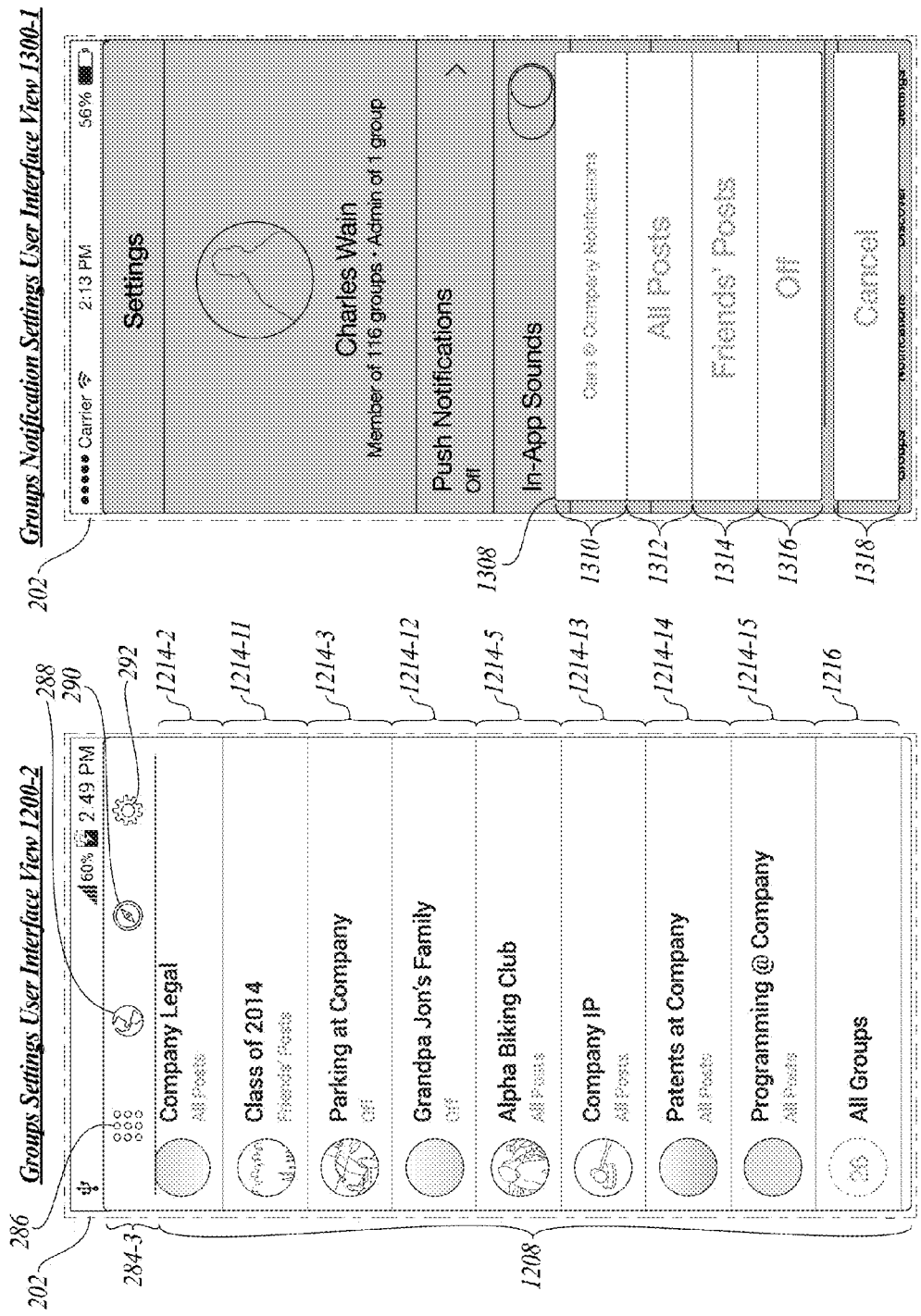
Figure 14A:
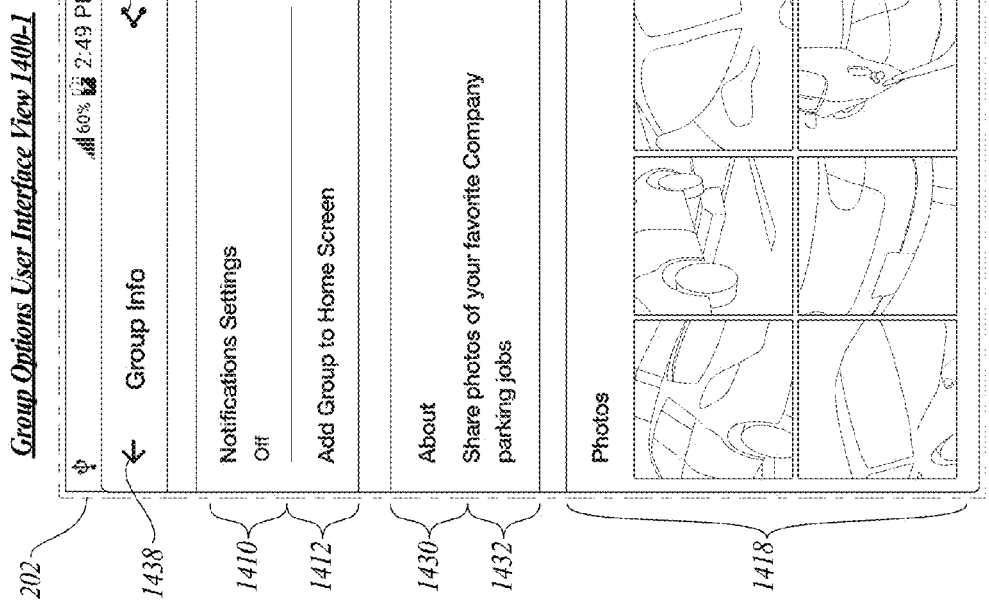
FIGS. 14A-14D illustrates exemplary embodiments of groups options UI view for modifying settings and/or visually presenting at least a portion of social group information associated with at least one group.

It may be appreciated that the scrollable group settings collection UI element 1208 may initially include a predetermined or limited number of selectable group setting UI elements 1214-$y$ (e.g., nine selectable group setting UI elements 1214-$y$ as illustrated in FIGS. 12A and 12C), where the selectable group setting UI elements 1214-$y$ may be ranked or ordered based on group order information as similarly discussed with respect to groups UI views 200-1, 200-2, and/or 200-3 illustrated in FIGS. 2A-2E and FIGS. 3A-3B. To expand the scrollable group settings collection UI element 1208 to include all groups for which the user is a member of, the group setting UI view 1200-1 and/or 1200-2 illustrated in FIGS. 12C-12D, may include, among other UI elements, a selectable group settings collection expansion UI element 1216 which may indicate the total number of groups the user is a group member of. Furthermore, user may select the selectable group settings collection expansion UI element 1216 to expand the predetermined or limited number of selectable group setting UI elements 1214-$y$ to include all groups the user is a group member of.

Figure 13B:
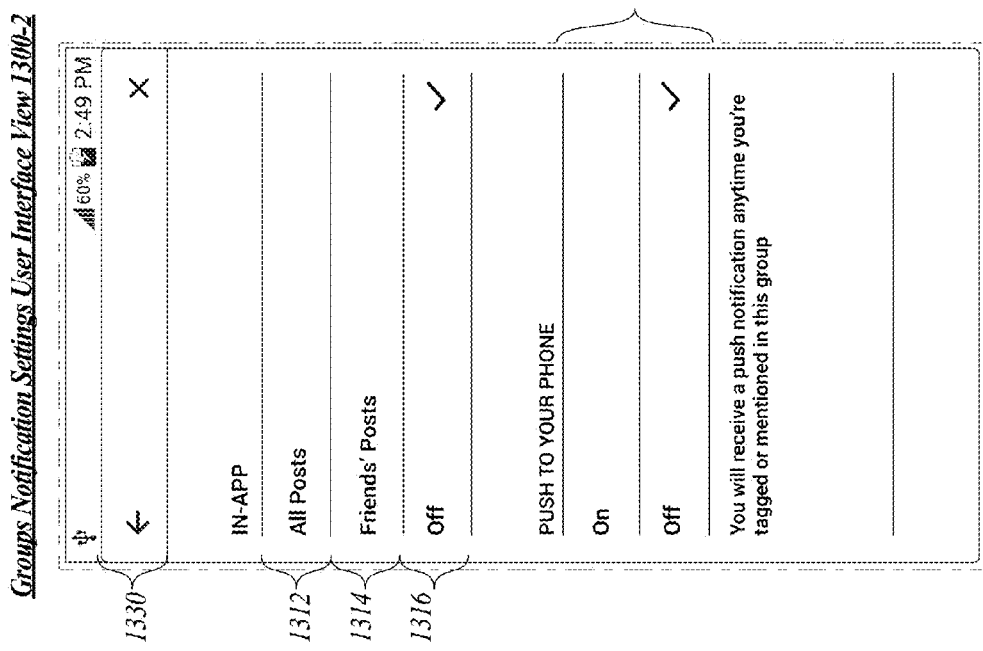
Figures 14B, 14C:
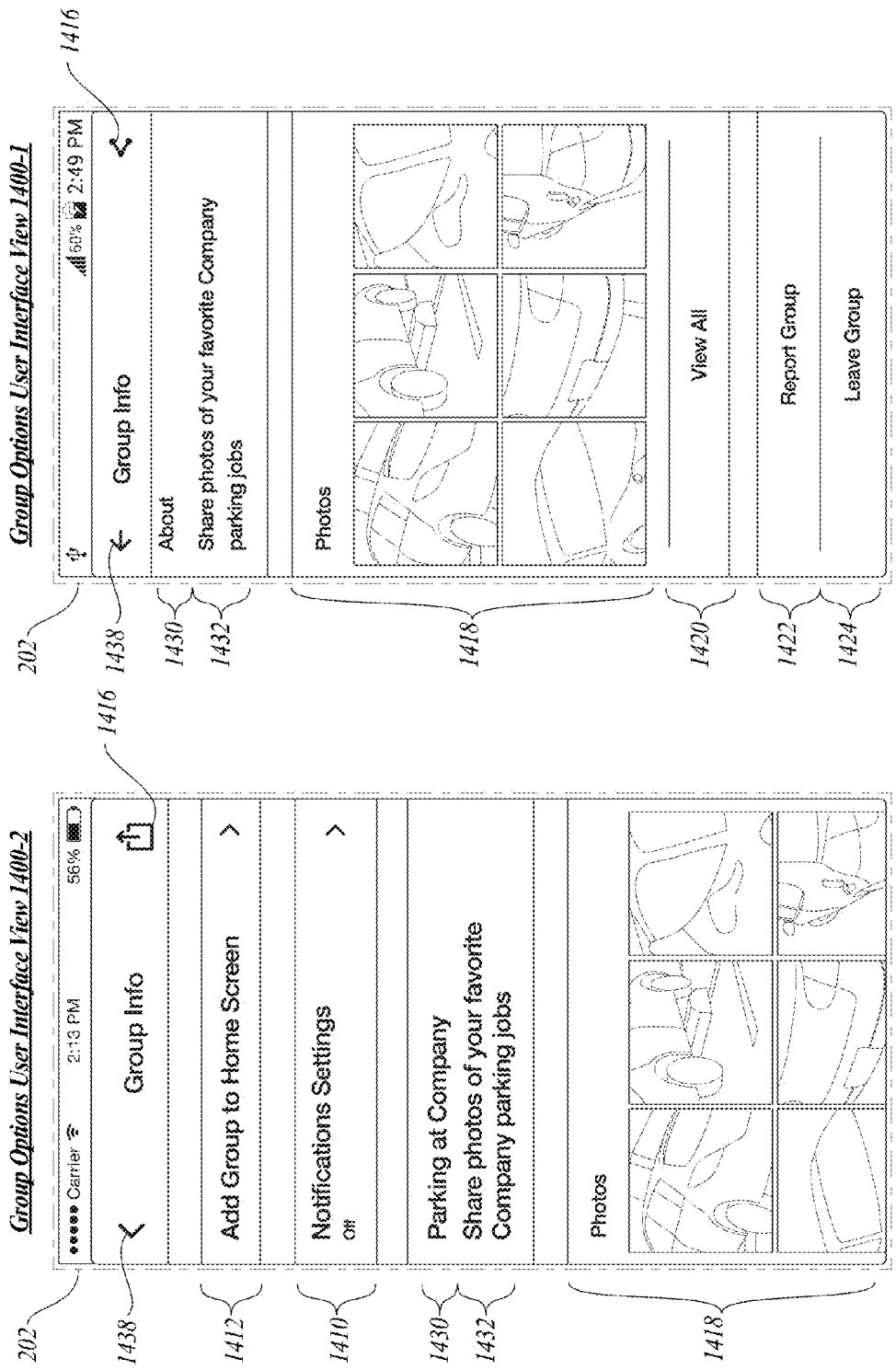
Figure 14D:
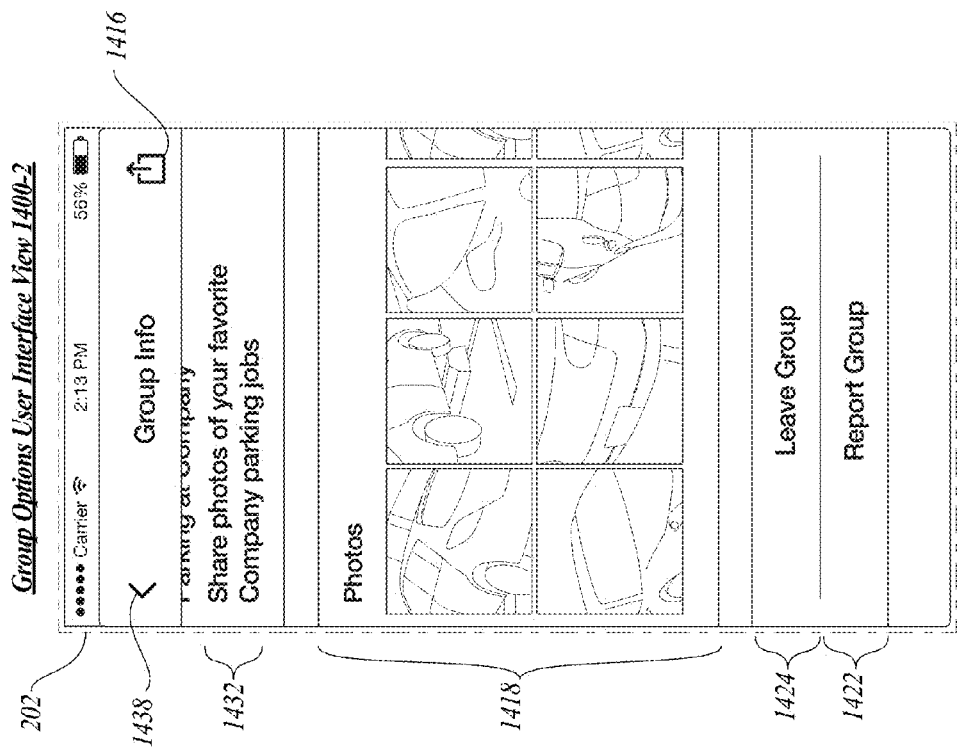

FIGS. 13A-13B illustrates exemplary embodiments of groups notifications settings UI view for modifying notifications settings associated with at least one group. The groups notifications settings UI views 1300-1 and/or 1300-2 illustrated in FIGS. 13A-13B, may be visually presented by the groups rendering component 190-2 on the touch sensitive display screen 202 based at least partially on group preference information.

In some embodiments, the groups notifications settings UI views 1300-1 and/or 1300-2 illustrated in FIGS. 13A-13B may include, among other UI elements, a user group information UI element 1210. The user group information UI element 1210 may include, among other UI elements, a groups notification settings overlay UI element 1308 which may overlay the groups settings UI views 1200-1 and/or 1200-2 when the user selects the selectable group setting UI elements 1214-y (e.g., selectable group setting UI element 1214-1). The groups notification settings overlay UI element 1308 may further include, among other UI elements, a group name UI element 1310 for visually presenting the group name of the group where the current group preference information is being modified.

In some embodiments, the groups notifications settings UI views 1300-1 and/or 1300-2 illustrated in FIGS. 13A-13B may include, among other UI elements, a navigation bar UI element 1330 for navigating between and among one or more UI views (e.g., navigating back to groups settings UI views 1200-1, 1200-2, etc.).

In some embodiments, the settings UI views 1300-1 and/or 1300-2 may include, among other UI elements, a plurality of selectable option UI elements 1312, 1314, 1316, for selecting whether user group notifications for the group identified by the group name UI element 1310 includes all activities in specific group (e.g., option UI element 1312), friends' activities in the specific group (e.g., option UI element 1314), or no activities in the specific group (e.g., option UI element 1316).

In some embodiments, the settings UI views 1300-1 and/or 1300-2 may further include a cancellation UI element 1318 to return to the group setting UI views 1200-1 and/or 1200-2 illustrated in FIGS. 12A-12D. In some embodiments, the settings UI views 1300-1 and/or 1300-2 may include, among other UI elements, a selectable group push notification setting UI element 1320 comprising at least two selectable option UI elements for enabling or disabling push notifications services for a particular group.

FIGS. 14A-14D illustrates exemplary embodiments of groups options UI views for modifying notifications settings and/or visually presenting at least a portion of social group information associated with at least one group. The groups notifications settings UI views 1400-1 and/or 1400-2 illustrated in FIG. 14A-14D, may be visually presented by the groups rendering component 190-2 on the touch sensitive display screen 202 based at least partially on group preference information and/or social group information for the associated group.

In some embodiments, the groups options UI views 1400-1 and/or 1400-2 illustrated in FIGS. 14A-14D may include, among other UI elements, a selectable groups notification settings UI element 1410 to enable a user to modify notification settings for a group by navigating to the groups notification settings UI views 1300-1 and/or 1300-2, when the user selects the selectable groups notification settings UI element 1410. It may be appreciated that in some embodiments, selecting selectable groups notification settings UI element 1410 in the groups options UI views 1400-1 and/or 1400-2, the groups notification settings overlay UI element 1308 illustrated in FIG. 13A may overlay the groups options UI views 1400-1 and/or 1400-2.

In some embodiments, the groups notifications settings UI views 1400-1 and/or 1400-2 illustrated in FIGS. 14A-14D may include, among other UI elements, a selectable navigation UI element 1438 for navigating between and among one or more UI views (e.g., navigating back to group discussion UI views 800-1, 800-2, 800-3, 800-4, etc.).

In some embodiments, the group option UI views 1400-1 and/or 1400-2 may include, among other UI elements, selectable group options UI element 1416 to enable a user to share the group with others by composing a share group message as previously discussed, when selectable group options UI element 1416 is selected. Additionally or alternatively, the group options UI element 1416 may enable a user to perform management and/or administrative functions for the group.

In some embodiments, the group option UI views 1400-1 and/or 1400-2 may include, among other UI elements, selectable group description UI element 1430 to enable a user to view group description information for the group in one or more UI views (not shown), when the selectable group description UI element 1430 is selected.

In some embodiments, the group option UI views 1400-1 and/or 1400-2 may include, among other UI elements, selectable a group activity image input UI element 1432 to enable a user to select an image associated with the imaging application 124-1-3 on the mobile device 102-1 and post or share the selected image with the group which may be visually presented in group discussion UI views 800-1, 800-2, 800-3, and/or 800-4 and/or group options UI views 1400-1 and/or 1400-2.

In some embodiments, the group option UI views 1400-1 and/or 1400-2 may include, among other UI elements, selectable add group UI element 1412 to enable a user to join the group and consequently, adding the group to the groups UI views 200-1, 200-2, and/or 200-3, which may be represented by, a selectable and movable group UI element visually presented in the scrollable groups collection UI element 208. Additionally or alternatively, in some embodiments, the group may added to the groups UI views 200-1, 200-2, and/or 200-3 as a selectable and movable group UI element in the scrollable groups collection UI element 208 without joining the group.

In some embodiments, the settings UI views 1400-1 and/or 1400-2 may further include, among other UI elements, scrollable group images collection UI element 1418 (e.g., scrolling between left and right or up and down) comprising one or more selectable group image UI elements to visually present group images information comprising a list of group images cropped or reduced to a square shape, a circular shape, or any other polygon shape having a predetermined size (e.g., radius of 25 pixels). Moreover, each selectable group image UI element may be representative of a group image and may visually present the group image in the cropped or reduced square shape, a circular shape, or any other polygon shape having a predetermined size (e.g., radius of 25 pixels). Additionally, in some embodiments, each selectable group image UI element may also enable a user to select the selectable group image UI element to view the full image in one or more UI views (not shown). Additionally, in some embodiments, the scrollable group images collection UI element 1418 may further include a selectable group image expansion UI element 1420 to expand, in place, the number of visually presented selectable group image UI elements and enable a user to scroll through expanded scrollable group images collection UI element (not shown).

In some embodiments, the settings UI views 1400-1 and/or 1400-2 may further include, among other UI elements, selectable leave group UI element 1424 to enable a user to leave a group and/or remove the group from being visually presented in groups UI views 200-1, 200-2, and/or 200-3, when the selectable leave group UI element 1424 is selected.

In some embodiments, the settings UI views 1400-1 and/or 1400-2 may further include, among other UI elements, selectable report group UI element 1422 to enable a user to report a group as offensive or otherwise inappropriate to the social networking system 101 for pending decision and/or removal of the group, when the selectable leave group UI element 1424 is selected.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Furthermore, not all acts illustrated in a methodology may be needed for a novel implementation.

Figure 15A:
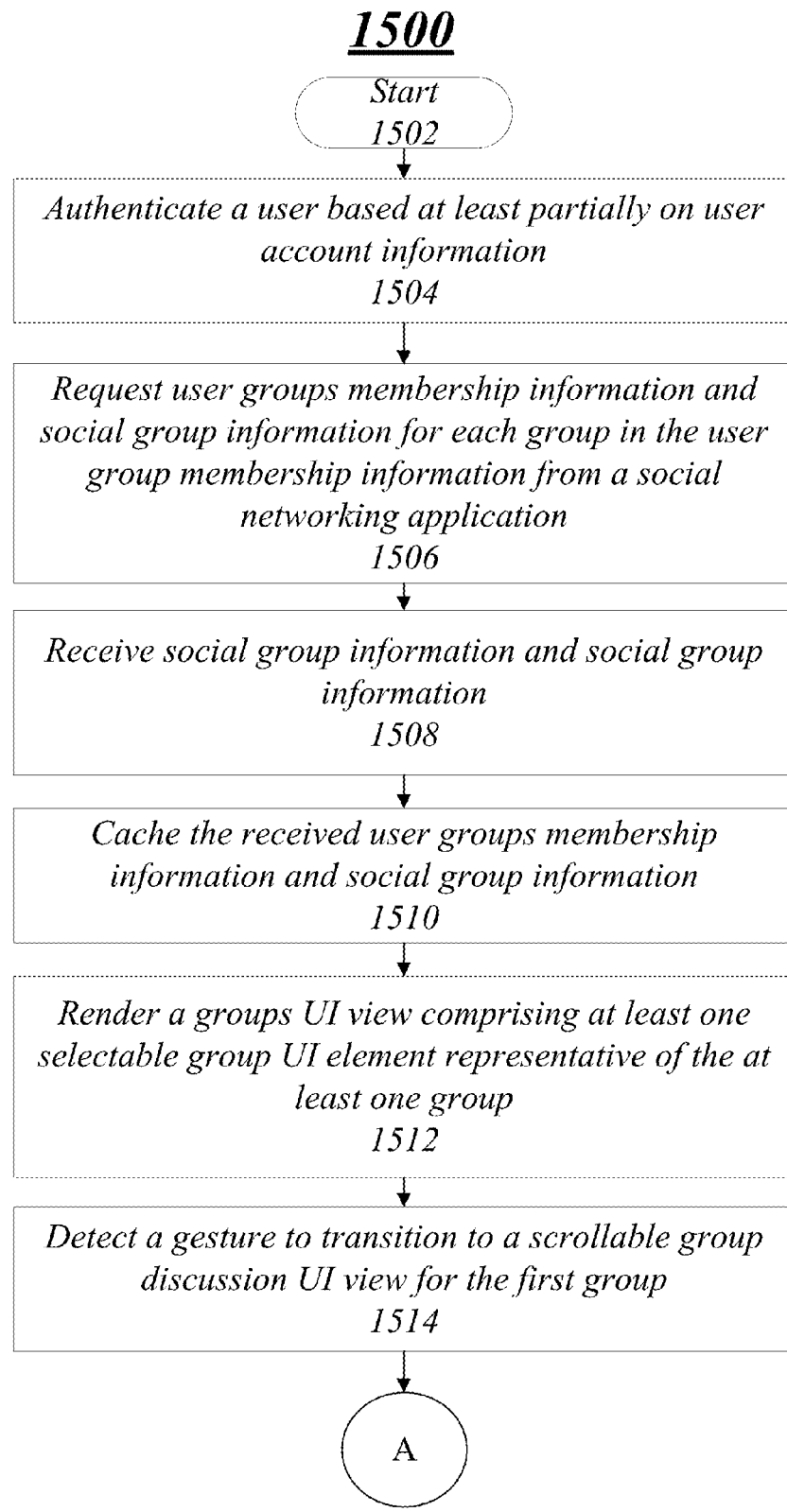

FIG. 15A illustrates one embodiment of a logic flow 1500. The logic flow 1400 may be representative of some or all of the operations executed by one or more embodiments described herein.

In the illustrated embodiment shown in FIG. 15A, the logic flow 1500 may start at block 1502 and may authenticate a user based at least partially on user account information at 1504. For example, mobile groups application 124-1-1 may authenticate a user based at least partially on the user's email address and password, or the user's phone number and password.

The logic flow 1500 may request user groups membership information and social group information for each group in the user group membership information from a social networking application at 1506. For example, the mobile groups application 124-1-1 may request user groups membership information from a social networking application 108, which may include a list of groups the user is a group member of, each group may be represented by a group identifier. The mobile groups application 124-1-1 may also request group cover image information for each group in the list of groups the user is a group member of based on the group identifier.

The logic flow 1500 may receive user groups membership information from the social networking application at 1508. For example, mobile groups application 124-1-1 may receive user groups membership information including the list of groups and social group information including group cover image information for each group in the list of groups.

The logic flow 1500 may cache the social group information and user group membership information at 1510. For example, the mobile groups application 124-1-1 store or cache the social group information and user group membership information in system memory 120 and/or storage component 150.

The logic flow 1500 may render a groups UI view comprising at least one selectable group UI element representative of the at least one group at 1512. For example, the mobile groups application 124-1-1 may render groups UI view 200-1 as illustrated in FIG. 2A including, among other UI elements, selectable group UI element 212-5 representative of the group having the group name information of "Alpha Biking Club" and group cover image information. The logic flow 1500 may detect a gesture to transition to a scrollable group discussion UI view for the first group at 1514. For example, the mobile groups application 124-1-1 may detect a selection finger gesture for the group "Alpha Biking Club" represented by selectable group UI element 212-5 based on finger contact and termination of finger contact 510-1, 510-2, and 510-3 as illustrated in FIG. 7A. The embodiments are not limited to these examples.

Figure 15B:
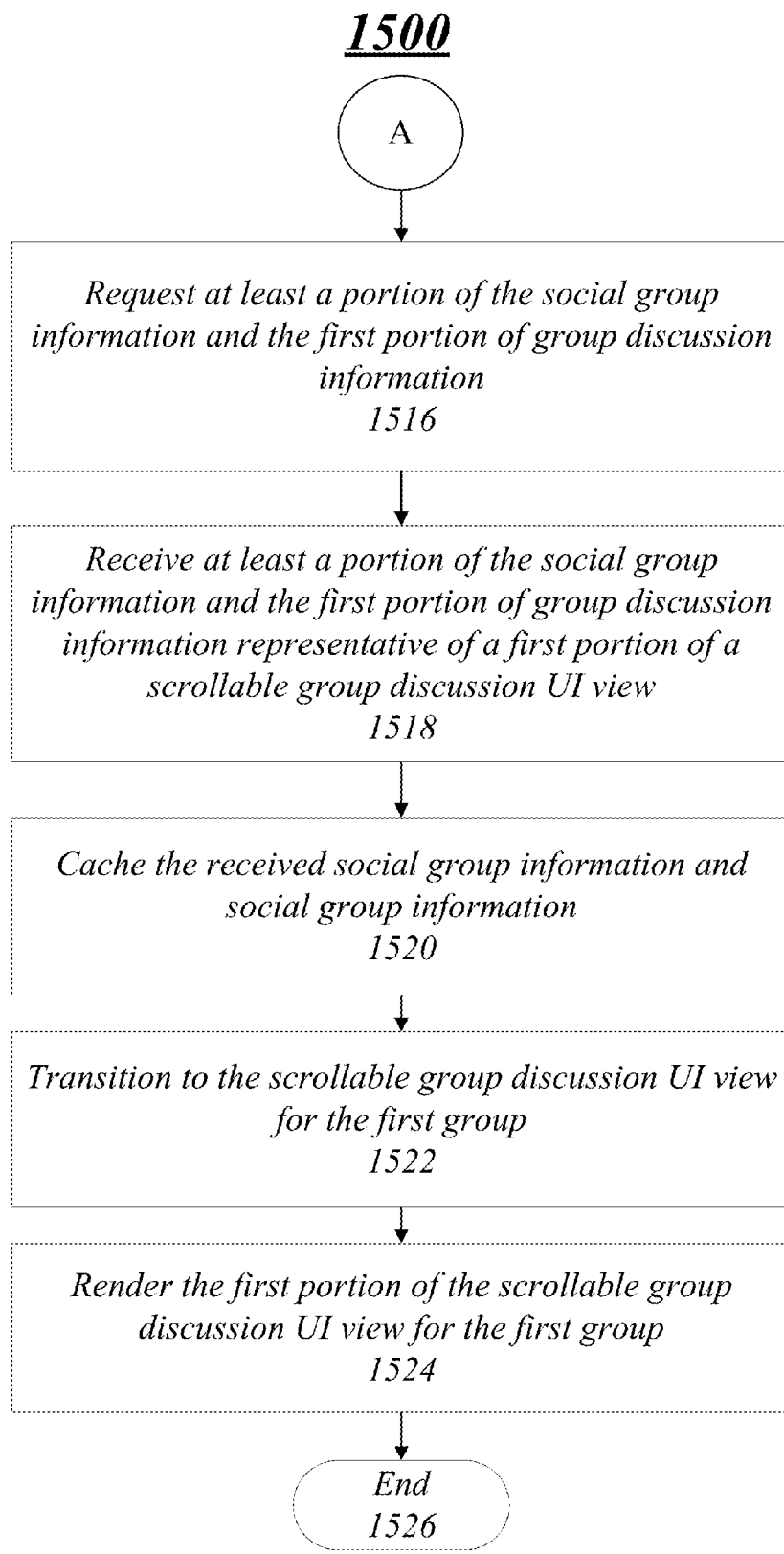

FIG. 15B illustrates a continuation of the one embodiment of a logic flow 1500 discussed above. The logic flow 1500 may be representative of some or all of the operations executed by one or more embodiments described herein.

The logic flow 1500 may continue from 1414 in FIG. 15A and may request at least a portion of the social group information and the first portion of group discussion information at 1516. For example, the mobile groups application 124-1-1 may request from the social networking application 108, social group information including group privacy information, group membership information, face piles information and a first portion of group discussion information including at least one group activity information representative of at least one group activity.

The logic flow 1500 may receive at least a portion of the social group information and the first portion of group discussion information representative of a first portion of a scrollable group discussion UI view at 1518. For example the mobile groups application 14-1-1 may receive the at least a portion of the social group information and the first portion of group discussion information from the social networking application 108, which may include information to render a first portion of the group discussion UI view 800-1.

The logic flow 1500 may cache at least a portion of the social group information and the first portion of group discussion information at 1520. For example, the mobile groups application 124-1-1 store or cache t at least a portion of the social group information and the first portion of group discussion information in system memory 120 and/or storage component 150.

The logic flow 1500 may transition to the scrollable groups discussion UI view for the first group at 1522. For example, the mobile groups application 124-1-1 may transition via animated sequence as illustrated in FIGS. 5A-5H from the groups UI view 200-1 illustrated in FIG. 2A to the group discussion UI view 800-1 illustrated in FIG. 8A for the group having the group name information of "Alpha Biking Club".

The logic flow 1500 may render the first portion of the scrollable group discussion UI view for the first group at 1524 and end at 1526. For example, the mobile groups application 124-1-1 may render group discussion UI view 800-1 as illustrated in FIG. 8A including, among other UI elements, the group cover UI element 810 for visually presenting the group cover image, the group face piles UI element 812 and group activity UI element 824-1 representative of a group activity. The embodiments are not limited to these examples.

Figure 16:
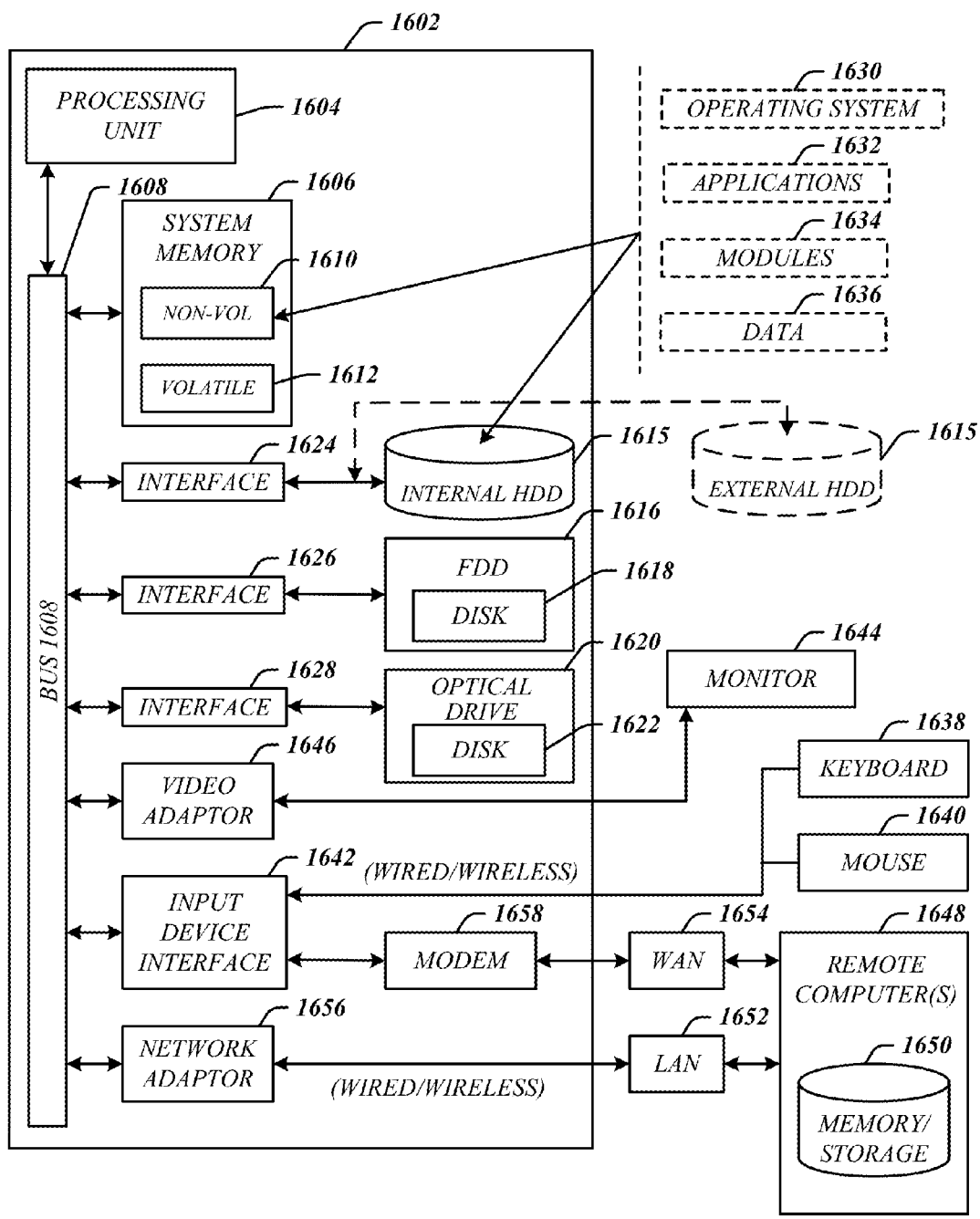
FIG. 16 illustrates an exemplary embodiment of a computing architecture.

FIG. 16 illustrates an embodiment of an exemplary computing architecture 1600 suitable for implementing various embodiments as previously described, such as, for example server device 106 and/or one or more devices 102-a. In one embodiment, the computing architecture 1600 may comprise or be implemented as part of an electronic device. The embodiments are not limited in this context.

As used in this application, the terms "system" and "component" are intended to refer to a computer-related entity, either hardware, a combination of hardware and software, software, or software in execution, examples of which are provided by the exemplary computing architecture 1600. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the unidirectional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1600 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1600.

As shown in FIG. 16, the computing architecture 1600 comprises a processing unit 1604, a system memory 1606 and a system bus 1608. The processing unit 1604 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1604.

The system bus 1608 provides an interface for system components including, but not limited to, the system memory 1606 to the processing unit 1604. The system bus 1608 can be any of several types of bus structure that may further interconnect to a memory bus (with or without a memory controller), a peripheral bus, and a local bus using any of a variety of commercially available bus architectures. Interface adapters may connect to the system bus 1608 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1600 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1606 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 16, the system memory 1606 can include non-volatile memory 1610 and/or volatile memory 1612. A basic input/output system (BIOS) can be stored in the non-volatile memory 1610.

The computer 1602 may include various types of computer-readable storage media in the form of one or more lower speed memory units, including an internal (or external) hard disk drive (HDD) 1614, a magnetic floppy disk drive (FDD) 1616 to read from or write to a removable magnetic disk 1618, and an optical disk drive 1620 to read from or write to a removable optical disk 1622 (e.g., a CD-ROM or DVD). The HDD 1614, FDD 1616 and optical disk drive 1620 can be connected to the system bus 1608 by a HDD interface 1624, an FDD interface 1626 and an optical drive interface 1628, respectively. The HDD interface 1624 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1610, 1612, including an operating system 1630, one or more application programs 1632, other program modules 1634, and program data 1636. In one embodiment, the one or more application programs 1632, other program modules 1634, and program data 1636 can include, for example, the various applications and/or components of the system 100.

A user can enter commands and information into the computer 1602 through one or more wire/wireless input devices, for example, a keyboard 1638 and a pointing device, such as a mouse 1640. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1604 through an input device interface 1642 that is coupled to the system bus 1608, but can be connected by other interfaces such as a parallel port, IEEE 1394 serial port, a game port, a USB port, an IR interface, and so forth.

A monitor 1644 or other type of display device is also connected to the system bus 1608 via an interface, such as a video adaptor 1646. The monitor 1644 may be internal or external to the computer 1602. In addition to the monitor 1644, a computer typically includes other peripheral output devices, such as speakers, printers, and so forth.

The computer 1602 may operate in a networked environment using logical connections via wire and/or wireless communications to one or more remote computers, such as a remote computer 1648. The remote computer 1648 can be a workstation, a server computer, a router, a personal computer, portable computer, microprocessor-based entertainment appliance, a peer device or other common network node, and typically includes many or all of the elements described relative to the computer 1602, although, for purposes of brevity, only a memory/storage device 1650 is illustrated. The logical connections depicted include wire/wireless connectivity to a local area network (LAN) 1652 and/or larger networks, for example, a wide area network (WAN) 1654. Such LAN and WAN networking environments are commonplace in offices and companies, and facilitate enterprise-wide computer networks, such as intranets, all of which may connect to a global communications network, for example, the Internet.

When used in a LAN networking environment, the computer 1602 is connected to the LAN 1652 through a wire and/or wireless communication network interface or adaptor 1656. The adaptor 1656 can facilitate wire and/or wireless communications to the LAN 1652, which may also include a wireless access point disposed thereon for communicating with the wireless functionality of the adaptor 1656.

When used in a WAN networking environment, the computer 1602 can include a modem 1658, or is connected to a communications server on the WAN 1654, or has other means for establishing communications over the WAN 1654, such as by way of the Internet. The modem 1658, which can be internal or external and a wire and/or wireless device, connects to the system bus 1608 via the input device interface 1642. In a networked environment, program modules depicted relative to the computer 1602, or portions thereof, can be stored in the remote memory/storage device 1650. It will be appreciated that the network connections shown are exemplary and other means of establishing a communications link between the computers can be used.

The computer 1602 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Included herein is a set of non-limiting exemplary embodiments that is representative of at least some of the novel aspects of the disclosed architecture. It may be appreciated that not all exemplary embodiments are necessary for a novel implementation and in at least some of the non-limiting exemplary embodiments, the one or more components, instructions, steps, elements including, but are not limited to, UI elements, and/or features may vary based at least partially on one or more implementations.

In some embodiments, the mobile groups application may comprise a groups management component may manage at least one group for a corresponding social networking application of a social networking system; and the groups rendering component may render a groups user interface (UI) view comprising at least one selectable group user interface element representative of the at least one group, the at least one selectable group UI element comprising a first selectable group UI element, wherein the first selectable group UI element is representative of a first group of the at least one group and the first group comprises at least one group member.

In some embodiments, the mobile groups application further comprises a groups authentication component to authenticate a user based at least partially on user account information representative of a user account for a user, the user account information comprising at least a user account identifier.

In some embodiments, the groups management component may receive user groups membership information from the social networking application, the user groups membership information comprising a list of user group information associated with a user profile and the groups rendering component may render the groups UI view after authentication of user account information.

In some embodiments, the at least one selectable group UI element may comprise a second selectable group UI element representative of a second group, the second group having an associated group color selected from a range of colors within at least a portion of a red-green-blue (RGB) color space.

In some embodiments, the at least one selectable group UI element may comprise a third selectable group UI element representative of a third group, the third group having an associated group color gradient selected from a range of colors within at least a portion of a RGB color space.

In some embodiments, the portion of the RGB color space may be determined based at least partially on at least one group image associated with the third group.

In some embodiments, the groups management component may enable creation of the first group based at least partially on group creation configuration information for the first group, the group creation configuration information to include a group privacy type, a group name, a group cover image, a group description, or any combination thereof, and the group privacy type comprises a secret group, an open group, or a closed group.

In some embodiments, the groups rendering component may render group create UI views to enable input of the group creation configuration information.

In some embodiments the groups management component may receive a focused group cover image from the social networking system for the at least one selectable group UI element, the focused group cover image may comprise a portion of the group cover image representative of at least one social networking object of the social networking system, and the rendering component may render the at least one selectable group UI element representative of the at least one group comprising the focused group cover image.

In some embodiments, the groups management component may transmit the group creation configuration information associated with the first group to the social networking system to create the first group.

In some embodiments, the groups management component may transmit the group creation configuration information via the groups communications component.

In some embodiments, the groups rendering component may render at least one view comprising at least one UI element on a touch sensitive display component.

In some embodiments, the groups UI view may comprise a plurality of pages, each page of the plurality of pages comprising at least one selectable group UI element, and the groups rendering component may render the groups UI view comprising a page indicator UI element to indicate a current page displayed on the touch sensitive display component and a total number of pages.

In some embodiments the groups rendering component may render a scrollable group discussion UI view for the first group, in response to receiving a gesture to transition to the scrollable group discussion UI view for the first group, the gesture may comprise a detection of a contact in a predefined region associated with the first selectable group UI element in the groups UI view on a touch sensitive display component.

In some embodiments, the scrollable group discussion UI view may comprise at least one group cover image UI element associated with the first group, a group face piles UI element comprising at least one group member profile image UI element associated with the at least one group member of the first group, a group membership count UI element to indicate a number of group members within the first group, and at least one group activity UI element.

In some embodiments, the group face piles UI element of the scrollable group discussion UI view may be ordered based at least partially on a number of group activities of the at least one group members within the first group.

In some embodiments, the groups rendering component may render a transition from the scrollable group discussion UI view for the first group to the groups UI view, in response to a groups input component detecting a gesture to return to the groups UI view, wherein the gesture may comprise detecting a contact in a predefined region associated with the at least one group cover image UI element for the first group and a continuous movement of the contact in one direction on a touch sensitive display component.

In some embodiments the groups management component to enable a user identified by user identifier information to join the first group as a group member when the first group is an open group.

In some embodiments, the groups management component may enable the at least one group member of the first group to invite a non-mobile groups application contact to join the first group, wherein the non-mobile groups application contact is a contact associated with a contacts application on the mobile device.

In some embodiments, the groups management component may enable a group member of the first group to archive the first group by disabling all notifications associated with the archived first group while the archived first group remains searchable and the group member maintains membership in the archived first group.

In some embodiments, the groups management component may receive a deep link reference information comprising group identifier information associated with the first group to enable a non-mobile groups application associated with the mobile device to transition directly to the scrollable group discussion UI view for the first group in the mobile groups application from the non-mobile groups application.

In some embodiments, the groups management component may further enable the creation of at least one group activity in the scrollable group discussion UI view of the first group, the scrollable discussion view comprising a first group activity UI element representative of a first group post, the first group activity UI element comprising a group activity information UI element associated with the first group activity for visually presenting at least a portion of user profile information.

In some embodiments, the first group activity UI element may be associated with a teaser comment UI element comprising up to a predefined number of visible comment UI elements and a comment expansion UI element to enable the increase of the predefined number of visible comment UI elements for the first group post in the scrollable group discussion UI view.

In some embodiments, the predefined number of visible comment UI elements may be ordered in chronological sequence based at least partially on comment creation time information associated with each comment.

In some embodiments, the first group activity UI element may further comprise comment input UI element to receive at least one comment from at least one group member, the comment input UI element is displayed in the scrollable group discussion UI view to enable the at least one group member to input the comment via an onscreen keyboard while at least a portion of scrollable group discussion UI view and the onscreen keyboard are displayed.

In some embodiments, the first group activity UI element may further be associated with a comment input UI element to receive a comment from at least one group member, the comment having an associated comment information, the comment information comprising comment message information, comment media information, or any combination thereof.

In some embodiments, the groups management component may further enable creation of at least one group activity in the scrollable group discussion UI view of the first group, the scrollable group discussion UI view comprising a first group activity UI element representative of a group poll.

In some embodiments, the at least one selectable group UI element of the groups UI view may be ordered based on a group interest information associated with each group a user is a group member of.

In some embodiments the group interest information may be determined based at least partially on user group last visit information associated with each group, user location information associated with the user, group location information associated with each group, user group search information, or any combination thereof.

In some embodiments, the groups management component may update the order of the at least one group by detecting a first gesture to move the first selectable group UI element representative of the first group, detecting a second gesture to fix the first selectable group UI element representative of the first group, and notifying the social networking system of the updated order of the at least one group, and the groups rendering component may render the groups UI view comprising the updated order of the at least one group on the touch sensitive display component.

In some embodiments the first gesture may comprise detecting continuous contact at a predefined region associated with the first selectable group UI element in a first position for a predefined period of time, the second gesture comprises detecting movement of the continuous contact at the predefined region associated with the first selectable group UI element to a second position and termination of any contact on the touch sensitive display component, and the first group is fixed at the second position and excluded from reordering after the first group is moved to the second position.

In some embodiments, the mobile groups application may further comprise a groups alert component to output a first audio cue to indicate the movement of the first selectable group UI element from the first position after detecting the first gesture and output a second audio cue to indicate the placement of the first selectable group UI element at the second position.

In some embodiments, the groups communication component may transmit the manual group ordering information to the social networking system via a cellular communication network.

In some embodiments, the groups management component to transmit an invitation message to a non-social networking system contact to join the first group as a group member by providing at least a selectable reference to the first group.

In some embodiments the mobile groups application may further comprise a groups notification component to receive user notification information comprising at least one user group notification from the social networking system and update cached notification information for at least one group, and the groups rendering component may render of a groups notifications UI view based on the received user notification information.

In some embodiments, the first selectable group UI element may be associated with a first group notification UI element, and the rendering component may update the first group notification UI element based on the at least one notification to indicate a number of new and unread group activities within the first group.

In some embodiments, the mobile groups application may further comprise a groups alert component to output an audio cue, in response to receiving the at least one group notification and a haptic component to provide haptic feedback, in response to receiving the at least one group notification.

In some embodiments, the groups rendering component may render a groups search UI view comprising a search query input UI element and search result UI element, wherein the mobile groups application may further comprise a groups search component to receive search query information from a search query input UI element, transmit the search query information to the social networking system, receive search results information comprising at least one group, in response to the transmitted search query information, and providing the search results information to the groups rendering component for display in the search result UI element on a touch screen display component.

In some embodiments, the groups rendering component may further render a groups search UI view comprising an scrollable search results UI element before receiving a search query information from the user, the scrollable search results UI element comprising at least one selectable search result UI element representative of at least one group, each selectable search result UI element comprising a focused group cover image associated with the at least one group.

In some embodiments, the groups rendering component may render a groups discovery UI view comprising at least one discovery group UI element and a join group UI element to enable the user to join the at least one discovered group, wherein the mobile groups application further comprises a groups discovery component to receive at least one discovered group from the social networking system, the at least one discovered group is determined based at least partially on user interest information.

In some embodiments, the groups management component may provide suggested creation group information comprising suggested group privacy information, suggested group name information, a suggested group description information, and suggested group description information comprising at least two suggested group members based at least partially on social proximity and social relationship between the user and different users to enable the user to create the at least one suggested group.

In some embodiments, the groups rendering component may render a groups settings UI view comprising at least one setting UI element for enabling or disabling the notification audio cues associated with the at least one group, wherein the mobile groups application further comprises a groups settings component to update the group preference information associated with the at least one group.

In some embodiments, the mobile groups application may be configured to perform a computer-implemented method comprising authenticating a user based at least partially on user account information, the user account information comprising at least a user account identifier; requesting user groups membership information from a social networking application of a social networking system; receiving the user groups membership information from the social networking application, the user groups membership information comprising at least one group associated with the user account information; caching the received user groups membership information; rendering a groups UI view comprising at least one selectable group user interface (UI) element representative of the at least one group based on the user groups membership information, the at least one selectable group UI element comprising a first selectable group UI element, wherein the first selectable group UI element represents a first group and the first group comprises at least one group member In some embodiments, the computer-implemented method may further comprise detecting a gesture to transition to a scrollable group discussion UI view for the first group, the gesture comprising a contact detected in a predefined region associated with the first selectable group UI element in the groups UI view on a touch screen display component; requesting at least a portion of social group information and a first portion of group discussion information representative of a first portion of the group discussion UI view; receiving at least a portion of the social group information and the first portion of group discussion information from the social networking application; transitioning to the scrollable group discussion UI view for the first group represented by the first selectable group UI element; and rendering the first portion of the scrollable group discussion UI view for the first group based at least partially on the received group discussion information and social group information for the first group.

In some embodiments, the computer-implemented method may further comprise detecting a gesture to transition to the groups UI view, the gesture comprising a detection of a contact in a predefined region associated with a group cover image UI element for the first group and a continuous movement of the contact in one direction on a touch screen display component; transitioning to the groups UI view comprising the first selectable group UI element representative of the first group; and rendering the groups UI view comprising at least the first selectable group UI element representative of the first group based at least partially on cached groups view information and groups notification information.

In some embodiments of the computer-implemented method, the first portion of the scrollable group discussion UI view may comprise at least one group cover image UI element associated with the first group, a group face piles UI element comprising at least one group member profile image UI element associated with the at least one group member of the first group, a group membership count UI element to indicate a number of group members within the first group, and at least one group activity UI element representative of at least one group activity, the at least one group activity UI element.

In some embodiments, the computer-implemented method may further comprise updating group unread notifications information for the first group, in response to transitioning to the group discussion UI view for the first group; and notifying the social networking system to update group unread notifications information for the first group.

In some embodiments of the computer-implemented method, the at least one group activity UI element may comprise at least a first group activity UI element representative of at least a first group post, the first group activity UI element is associated with a teaser comment UI element comprising up to a predefined number of visible comment UI elements and a comment expansion UI element to enable increase of the predefined number of visible comment UI elements for the first group post in the scrollable group discussion UI view.

In some embodiments, the computer-implemented method may further comprise receiving a gesture to scroll the scrollable group discussion UI view, the gesture comprising a detection of a contact at a predefined region associated with the scrollable group discussion UI view and continuous movement of the contact in one direction to scroll the first portion of the scrollable group discussion UI view; requesting at least a portion of group discussion information representative of a second portion of the group discussion UI view; rendering the second portion of the group discussion UI view for the first group based on the received group discussion information.

In some embodiments, the computer-implemented method may further comprise receiving a contact by a groups input component at a predefined region associated with a group comment expansion UI element of the first group activity UI element in the scrollable group discussion view; requesting a first portion of group activity comment information associated with the first group post; receiving the first portion of the group post comment information; and rendering the comment UI elements for the first group activity based on the requested group activity comment information to increase the pre-defined number of visible comment UI elements in the scrollable group discussion view.

In some embodiments, the computer-implemented method may further comprise receiving user group unread notifications information from the social networking application for the first group; updating the user group unread notifications information based on the received user group unread notifications information; and rendering a notification indicator UI element associated with the first selectable group UI element to indicating a number of new and unread group activities for the first group based on the received user group unread notifications information.

In some embodiments, the computer-implemented method may further comprise receiving deep link reference information from a non-mobile groups application, the notification comprising a group identifier information associated with the first group; requesting at least a portion of social group information and a first portion of group discussion information representative of a first portion of the group discussion UI view; receiving at least a portion of the social group information and the first portion of group discussion information from the social networking application; navigating to the scrollable group discussion UI view for the first group; and rendering the first portion of the scrollable group discussion UI view for the first group based at least partially on the received group discussion information and social group information for the first group.

In some embodiments, the computer-implemented method may further comprise receiving touching input information indicating a contact associated with a gesture to move the first group from a first position to a second position, the gesture comprising a detection of a contact at a predefined region associated with the first selectable group UI element for a predefined period of time and movement of the contact at the predefined region associated with the first selectable group UI element to the second position; outputting a first audio cue to indicate the movement of the first group from the first position; receiving touch input information indicating termination of the contact to fix the first group at a second position; outputting a second audio cue to indicate the placement of the first group at the second position; updating the cached groups view position information of the first group; rendering the groups UI view comprising the first group at the second position; and notifying the social networking system the updated position of the first group, wherein the first group is fixed at the second position and excluded from reordering.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments need more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Furthermore, the terms 'first," "second," 'third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. An apparatus, comprising:
   a processor circuit;
   memory operatively coupled to the processor circuit, the memory to store a mobile groups application for execution by the processor circuit, the mobile groups application comprising:
   a groups management component to manage at least one group for a corresponding social networking application of a social networking system, to request and receive user groups membership information from the social networking application for one or more groups in the social networking system that a user of mobile groups application is a member of, a group comprising at least one member of the social networking system, the user groups membership information comprising at least one group, and to cache the received user groups membership information locally to the mobile groups application,; and
   a groups rendering component to render a groups user interface (UI) view based on the cached user groups membership information comprising at least one selectable group user interface element representative of the at least one group, the at least one selectable group UI element comprising a first selectable group UI element, wherein the first selectable group UI element is representative of a first group of the at least one group and the first group comprises at least one group member.

2. The apparatus of claim 1, wherein the mobile groups application further comprises a groups authentication component to authenticate a user based at least partially on user account information representative of a user account for a user, the user account information comprising at least a user authentication identifier.

3. The apparatus of claim 1, the groups management component to receive user groups membership information from the social networking application, the user groups membership information comprising a list of user group information associated with a user profile of the user.

4. The apparatus of claim 1, the groups rendering component to render the groups UI view, in response to a successful authentication of user account information.

5. The apparatus of claim 1, wherein the at least one selectable group UI element comprises a second selectable group UI element representative of a second group, the second group having an associated group color selected from a range of colors within at least a portion of a red-green-blue (RGB) color space.

6. The apparatus of claim 1, wherein the at least one selectable group UI element comprises a second selectable group UI element representative of a second group, the second group having an associated group color gradient selected from a range of colors within at least a portion of a RGB color space.

7. The apparatus of claim 6, wherein the portion of the RGB color space is determined based at least partially on at least one group image associated with the second group.

8. A computer-implemented method comprising:
   requesting, by a mobile groups application executing on a client device, user groups membership information from a social networking application of a social networking system for one or more groups in the social networking system that a user of the client device is a member of, a group comprising at least one member of the social networking system;
   receiving the user groups membership information from the social networking application, the user groups membership information comprising at least one group;
   caching the received user groups membership information on the client device; and
   rendering a groups UI view comprising at least one selectable group user interface (UI) element representative of the at least one group based on the cached user groups membership information, the at least one selectable group UI element comprising a first selectable group UI element, wherein the first selectable group UI element represents a first group and the first group comprises at least one group member.

9. The computer-implemented method of claim 8, further comprising authenticating the user based at least partially on user account information, the user account information comprising at least a user account identifier.

10. The computer-implemented method of claim 9, wherein the groups UI view is rendered, in response to a successful authentication of user account information.

11. The computer-implemented method of claim 8, wherein the at least one selectable group UI element comprises a second selectable group UI element representative of a second group, the second group having an associated group color selected from a range of colors within at least a portion of a red-green-blue (RGB) color space.

12. The computer-implemented method of claim 8, wherein the at least one selectable group UI element comprises a second selectable group UI element representative of a third group, the second group having an associated group color gradient selected from a range of colors within an entire RGB color space.

13. The computer-implemented method of claim 12, wherein the associated group color gradient is selected from a range of colors within at least a portion of the RGB color space.

14. The computer-implemented method of claim 13, wherein the portion of the RGB color space is determined based at least partially on at least one group image associated with the second group.

15. At least one non-transitory computer-readable storage medium comprising instructions that, when executed, cause a system to:
- request, by a mobile groups application executing on a client device, user groups membership information from a social networking application of a social networking system for one or more groups in the social networking system that a user of the client device is a member of, a group comprising at least one member of the social networking system;
- receive the user groups membership information from the social networking application, the user groups membership information comprising at least one group;
- cache the received user groups membership information on the client device; and
- render a groups UI view comprising at least one selectable group user interface (UI) element representative of the at least one group based on the cached user groups membership information, the at least one selectable group UI element comprising a first selectable group UI element, wherein the first selectable group UI element represents a first group and the first group comprises at least one group member.

16. The computer-readable storage medium of claim 15, comprising instructions that, when executed, cause the system to authenticate a user based at least partially on user account information, the user account information comprising at least a user account identifier, wherein the groups UI view is rendered, in response to a successful authentication of user account information.

17. The computer-readable storage medium of claim 15, wherein the at least one selectable group UI element comprises a second selectable group UI element representative of a second group, the second group having an associated group color selected from a range of colors within at least a portion of a red-green-blue (RGB) color space.

18. The computer-readable storage medium of claim 15, wherein the at least one selectable group UI element comprises a second selectable group UI element representative of a second group, the second group having an associated group color gradient selected from a range of colors within an entire a RGB color space.

19. The computer-readable storage medium of claim 18, wherein the associated group color gradient is selected from a range of colors within at least a portion of the RGB color space.

20. The computer-readable storage medium of claim 19, wherein the portion of the RGB color space is determined based at least partially on at least one group image associated with the second group.

* * * * *